US012505137B1

(12) United States Patent
Liu et al.

(10) Patent No.: US 12,505,137 B1
(45) Date of Patent: Dec. 23, 2025

(54) DIGITAL CONTENT GENERATION WITH IN-PROMPT HALLUCINATION MANAGEMENT FOR CONVERSATIONAL AGENT

(71) Applicant: Microsoft Technology Licensing, LLC, Redmond, WA (US)

(72) Inventors: Wenqiong Liu, Santa Clara, CA (US); Anshu Basia, Fremont, CA (US); Joseph Michael Esposito, Sunnyvale, CA (US); Faezeh Hajiaghajani Memar, San Francisco, CA (US); Alice Hing-Yee Leung, Sunnyvale, CA (US); Pierre Y. Monestie, Half Moon Bay, CA (US); Rohan Rajiv, Danville, CA (US); Sameer Ulhas Shenai, San Jose, CA (US); Haichao Wei, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/751,159

(22) Filed: Jun. 21, 2024

(51) Int. Cl.
  *G06F 16/33* (2025.01)
  *G06F 16/3329* (2025.01)
  *G06F 16/334* (2025.01)
  *G06F 16/338* (2019.01)

(52) U.S. Cl.
  CPC ...... *G06F 16/3344* (2019.01); *G06F 16/3329* (2019.01); *G06F 16/338* (2019.01)

(58) Field of Classification Search
  None
  See application file for complete search history.

(56) References Cited

U.S. PATENT DOCUMENTS

| | | | |
|---|---|---|---|
| 8,275,305 B2 * | 9/2012 | Hutchinson | G09B 7/02 434/350 |
| 10,613,748 B2 * | 4/2020 | Alcorn | G06F 16/248 |
| 11,200,242 B2 * | 12/2021 | Eda | G06F 16/248 |
| 11,803,401 B1 * | 10/2023 | Ferrucci | G06F 9/453 |
| 12,019,663 B1 * | 6/2024 | Zhang | G06F 16/3344 |
| 12,105,746 B1 * | 10/2024 | Wu | G06F 16/3329 |

(Continued)

OTHER PUBLICATIONS

Wei, et al., "Chain-of-Thought Prompting Elicits Reasoning in Large Language Models," In Repository of arXiv:2201.11903v6, Jan. 10, 2023, 43 pages.

*Primary Examiner* — Eliyah S. Harper
(74) *Attorney, Agent, or Firm* — Nicholson De Vos Webster & Elliott LLP

(57) ABSTRACT

A device may provide a prompt to a first machine learning model. The prompt may include at least one instruction to cause the first machine learning model to use at least first natural language input associated with a use of a conversational search system to rank data sources, generate a first search query and reasoning, and use the first search query and the reasoning to generate a second search query. The first search query may include data obtained from at least one of the ranked data sources. The reasoning may include an explanation of how the first machine learning model generated the first search query. A second machine learning model may synthesize a response determined via execution of the second search query. The synthesized response may be provided for presentation via the conversational search system.

20 Claims, 31 Drawing Sheets

(56) References Cited

U.S. PATENT DOCUMENTS

| | | | |
|---|---|---|---|
| 12,210,849 B1* | 1/2025 | Coursey | G06F 40/58 |
| 2007/0048863 A1* | 3/2007 | Rodgers | G16B 50/20 |
| | | | 435/325 |
| 2009/0177652 A1* | 7/2009 | Markham | G06F 16/951 |
| | | | 707/999.005 |
| 2018/0268022 A1* | 9/2018 | Rose | G06F 16/2477 |
| 2021/0303636 A1* | 9/2021 | Dua | G06F 16/9038 |
| 2022/0004718 A1* | 1/2022 | Quamar | G06F 40/35 |
| 2023/0237271 A1* | 7/2023 | Ferrucci | G16H 70/60 |
| | | | 707/726 |
| 2023/0297398 A1* | 9/2023 | Ferrucci | G06F 16/248 |
| 2024/0202221 A1* | 6/2024 | Siebel | G06N 3/092 |
| 2024/0281487 A1* | 8/2024 | Bathwal | G06F 16/24575 |
| 2024/0378636 A1* | 11/2024 | Boyd | G06Q 30/0201 |
| 2024/0428008 A1* | 12/2024 | Abraham | G06F 16/3329 |
| 2024/0430216 A1* | 12/2024 | Abraham | H04L 51/04 |

* cited by examiner

400

402     404

| N | 🔍 Search by title, skill, or com... | 📍 City, state, or zip code |

Top job picks for you
251 results

| A | Company Product Manager, Private Pricing Product Management (3PM) ✓   ✕
Company1 - Anytown1, USA
$155K/yr - $288K/yr ☐ Top applicant    👥 18 connections Viewed - promoted |

| T | Product Manager, Integrity and Authenticity - Trust and Safety - Anytown ✓   ✕
Company2 - Anytown2, USA
$149K/yr - $312K/yr - Medical, 401(k), +1 benefit ☐ 224 Company alumni   👥 4 connections Promoted - 18 applicants |

406

| H | Principal Product Manager   ✕
Company3 - Anytown3, USA (Hybrid)
$170/yr - $180K/y Promoted   ☐ Easy Apply |

| W | (USA) Principal, Product Manager - Technology Commercialization ✓   ✕
Company4 - Anytown4, USA
$143K/yr - $286K/yr 🌐 1 connections    ☐ 71 school alumni Promoted |

FIG. 4A1

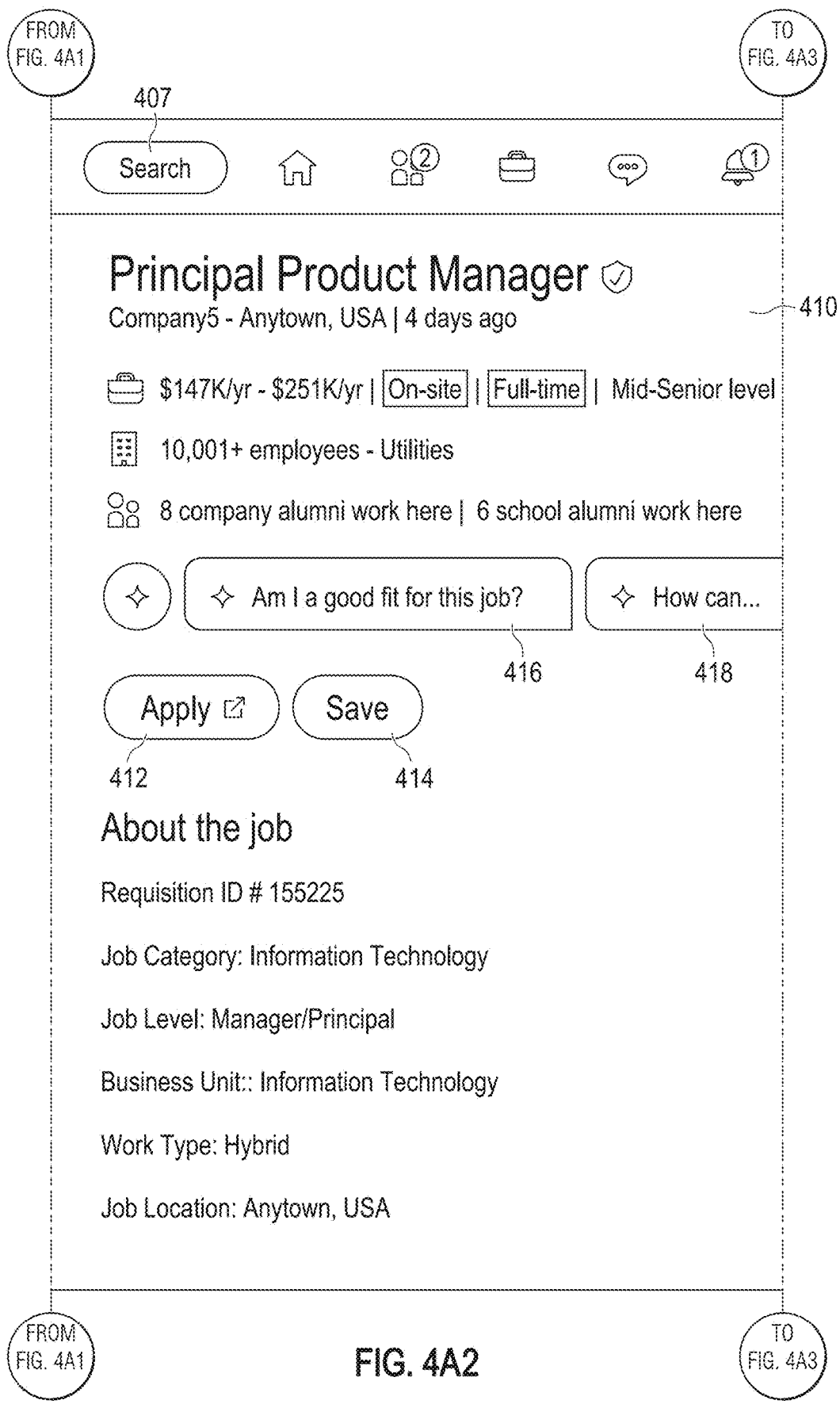
FIG. 4A2

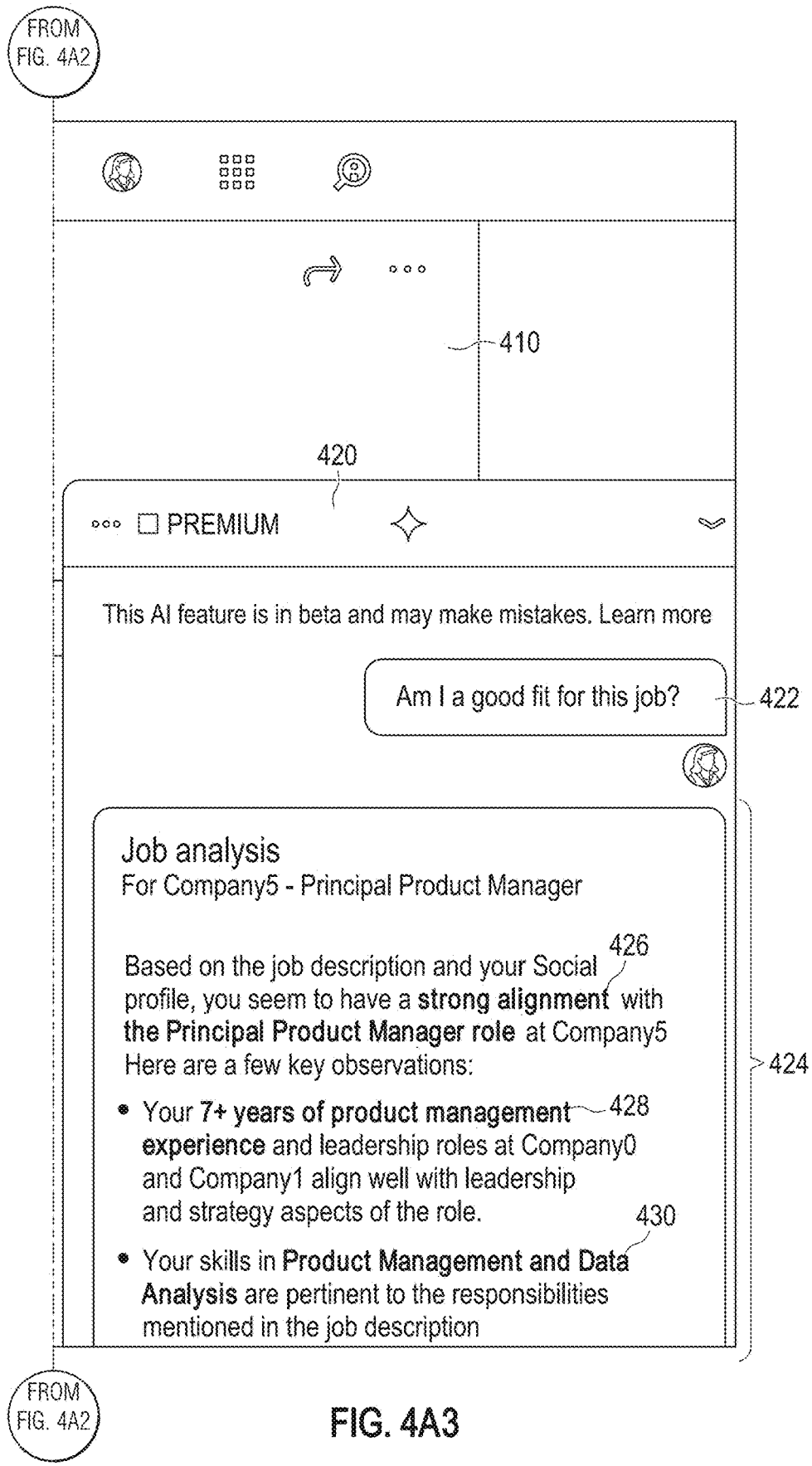
FIG. 4A3

440

402    404

| N | 🔍 Search by title, skill, or com... | 📍 City, state, or zip code |

Top job picks for you
251 results

406

A    Company Product Manager, Private Pricing ✕
Product Management (3PM) ✓
Company1 - Anytown1, USA
$155K/yr - $288K/yr ☐ Top applicant    👥 18 connections Viewed - promoted

T    Product Manager, Integrity and Authenticity - ✕
Trust and Safety - Anytown ✓
Company2 - Anytown2, USA
$149K/yr - $312K/yr - Medical, 401(k), +1 benefit ☐ 224 Company alumni    👥 4 connections Promoted - 18 applicants

H    Principal Product Manager ✕
Company3 - Anytown3, USA (Hybrid)
$170/yr - $180K/y Promoted    ☐ Easy Apply

W    (USA) Principal, Product Manager - ✕
Technology Commercialization ✓
Company4 - Anytown4, USA
$143K/yr - $286K/yr 🌐 1 connections    ☐ 71 school alumni Promoted

FIG. 4B1

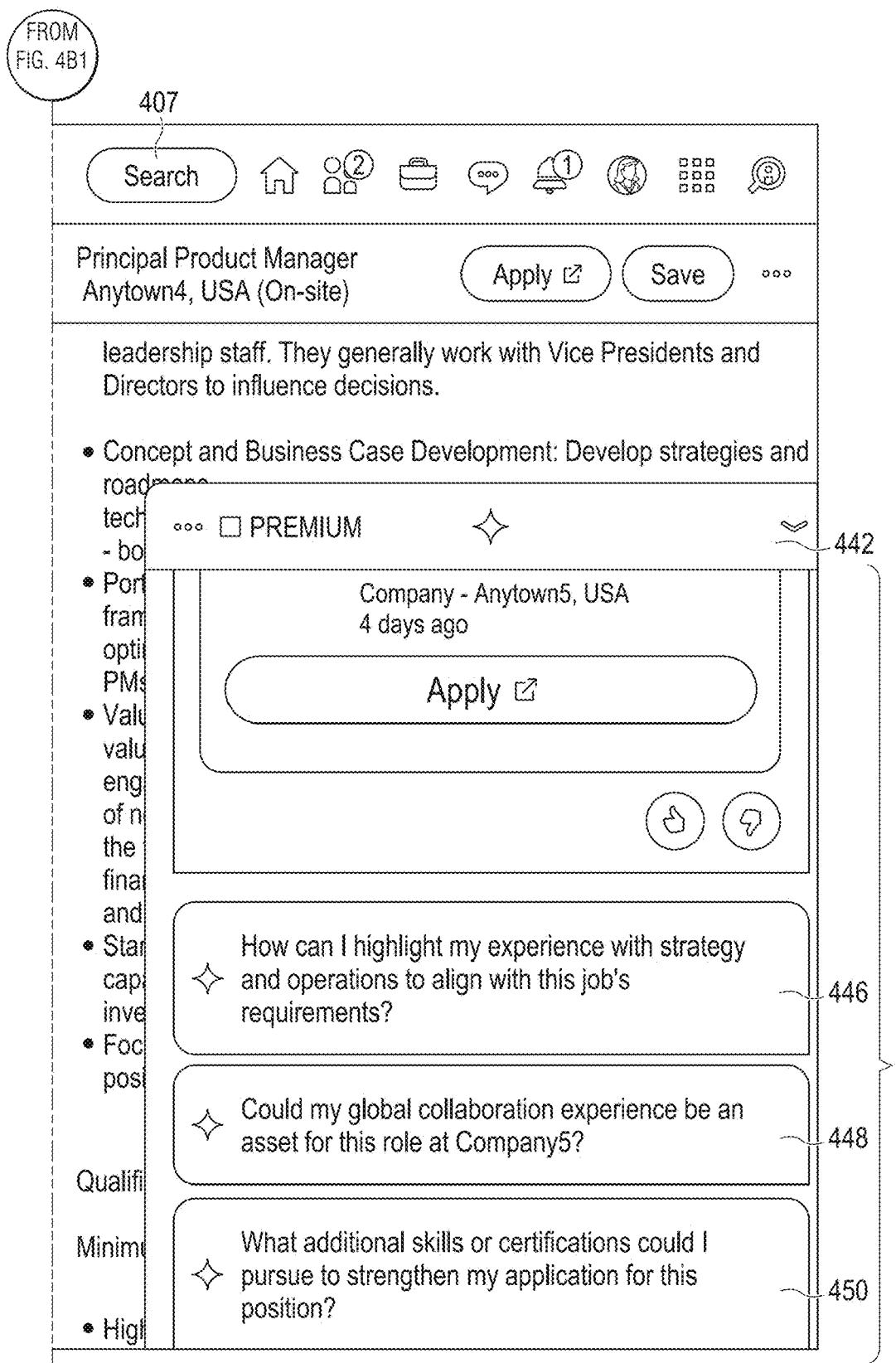
FIG. 4B2

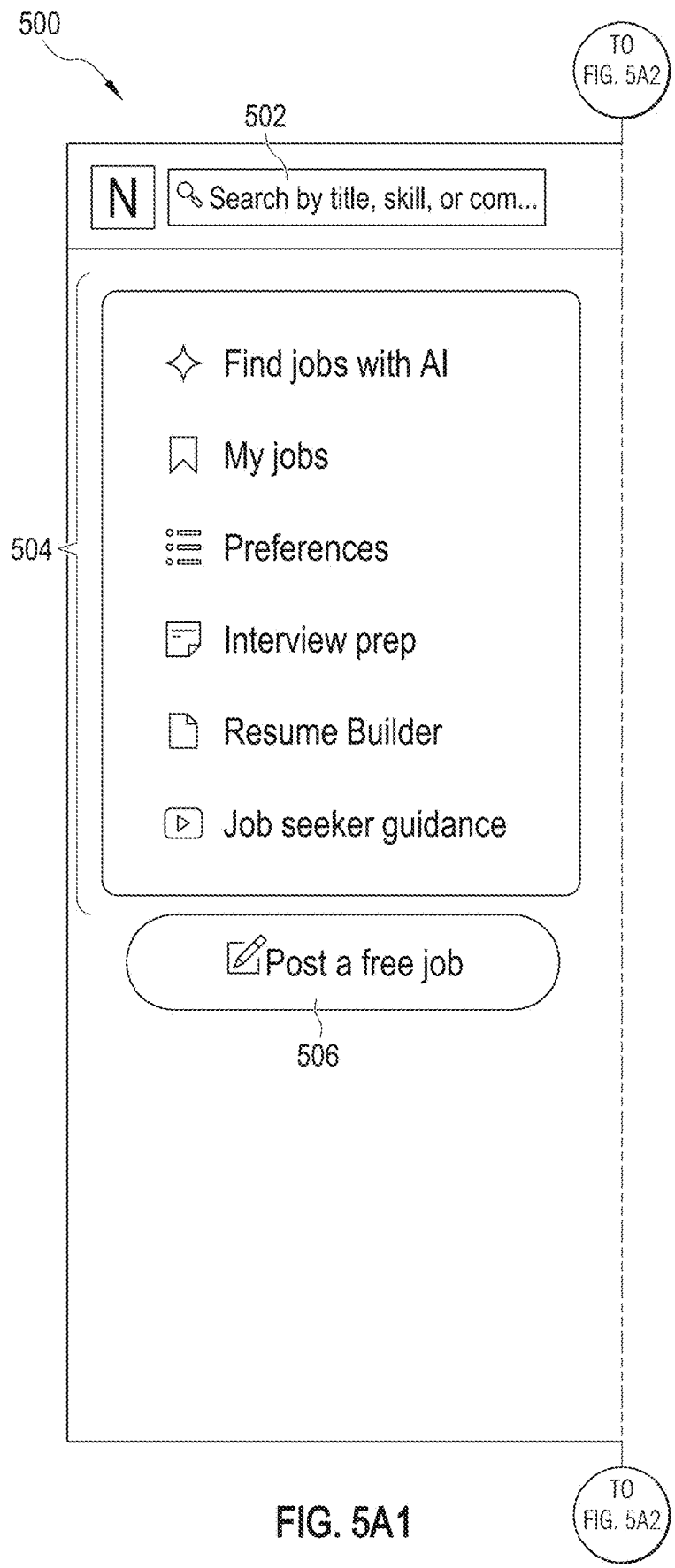
FIG. 5A1

FROM FIG. 5A1  TO FIG. 5A3

W Sr. Product Manager ✕
Company6 - Anytown, USA (On-site)
$115K/yr - $190K/yr ☐ 1 company alum 2 days ago

A Sr. Product Success Manager (for PMs who want to guide other product teams ⬡ ✕
Company7 - Anytown7, USA (remote)
$100K/yr - $170/yr 15 hours ago Show all ⇒

508

Hiring in your network
Explore relevant jobs in your network

W Sr. Product Manager - Climate Change ✕
Company8 - Anytown8, USA (On-site)
401(k) benefit 👥 2 mutual connections with the hiring team Promoted ☐ Easy Apply

510

A Principal Product Manager, Studio ✕

FROM FIG. 5A1  FIG. 5A2  TO FIG. 5A3

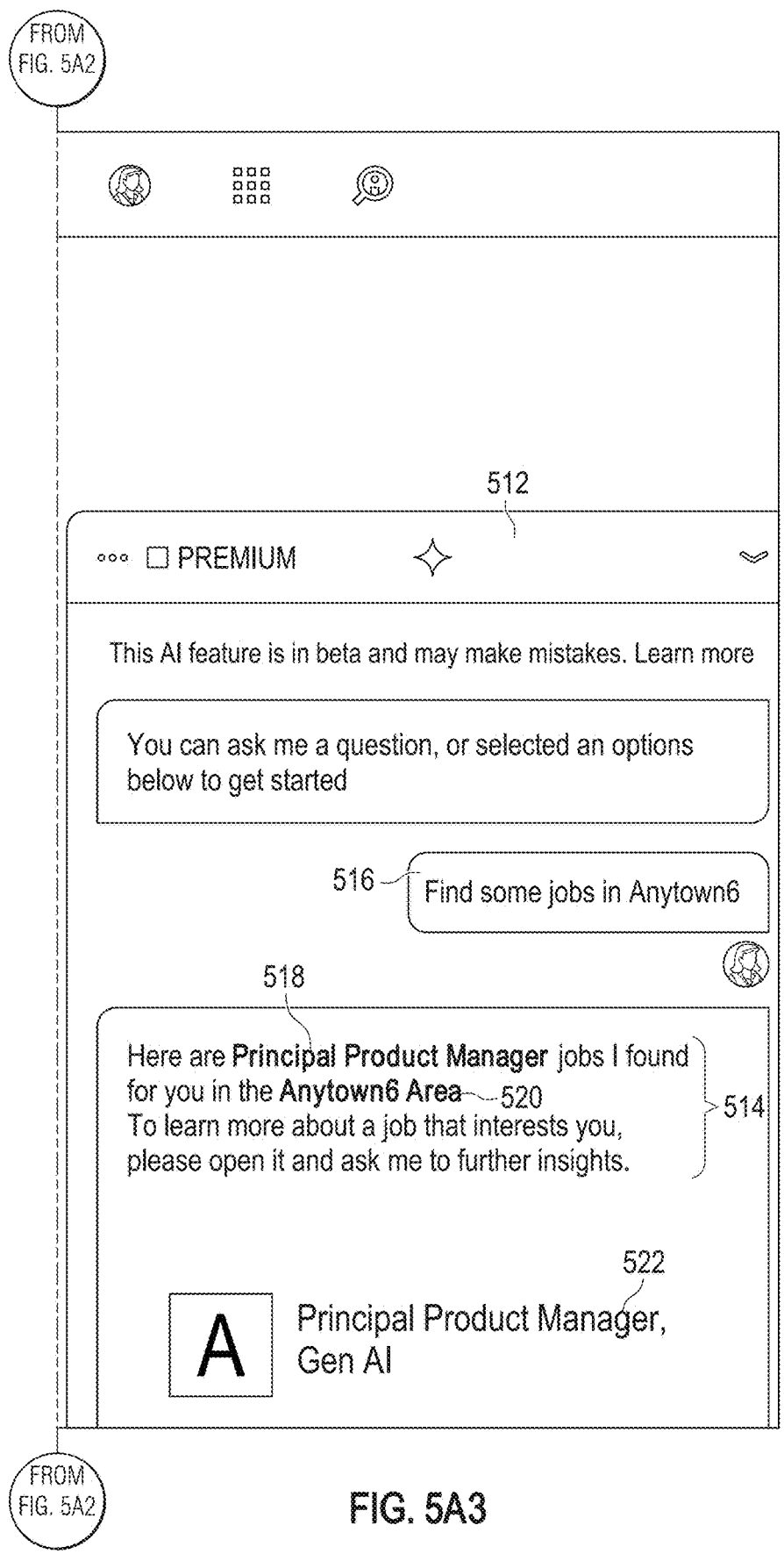
FIG. 5A3

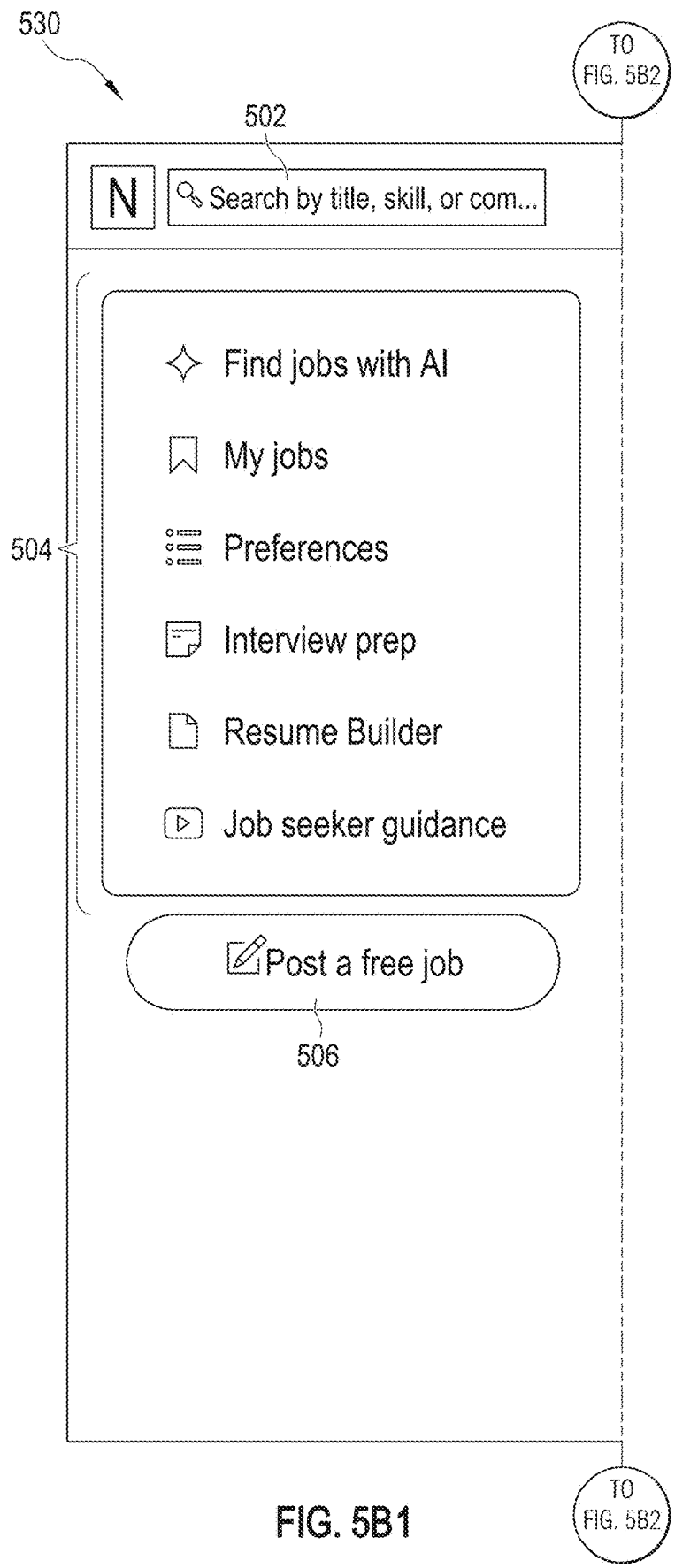
FIG. 5B1

FROM FIG. 5B1

TO FIG. 5B3

W | Sr. Product Manager ✕
Company6 - Anytown6, USA (On-site)
$115K/yr - $190K/yr ☐ 1 company alum 2 days ago

A | Sr. Product Success Manager (for PMs who want to guide other product teams ◎
Company7 - Anytown7, USA (remote)
$100K/yr - $170/yr 15 hours ago Show all →

⎬ 508

Hiring in your network
Explore relevant jobs in your network

W | Sr. Product Manager - Climate Change ✕
Company8 - Anytown8, USA (On-site)
401(k) benefit 👥 2 mutual connections with the hiring team Promoted ☐ Easy Apply

A | Principal Product Manager, Studio ✕

⎬ 510

FROM FIG. 5B1

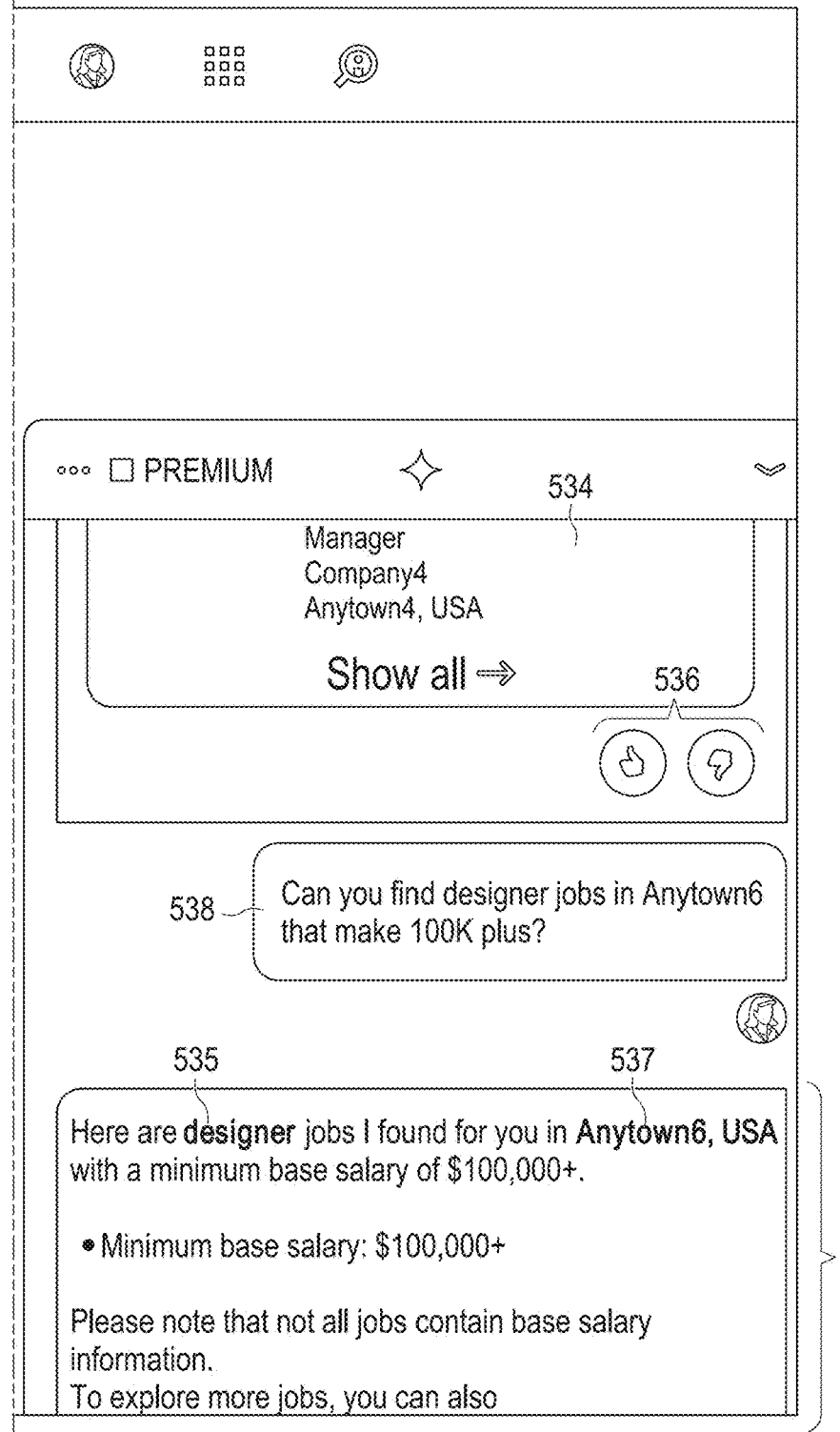
FIG. 5B3

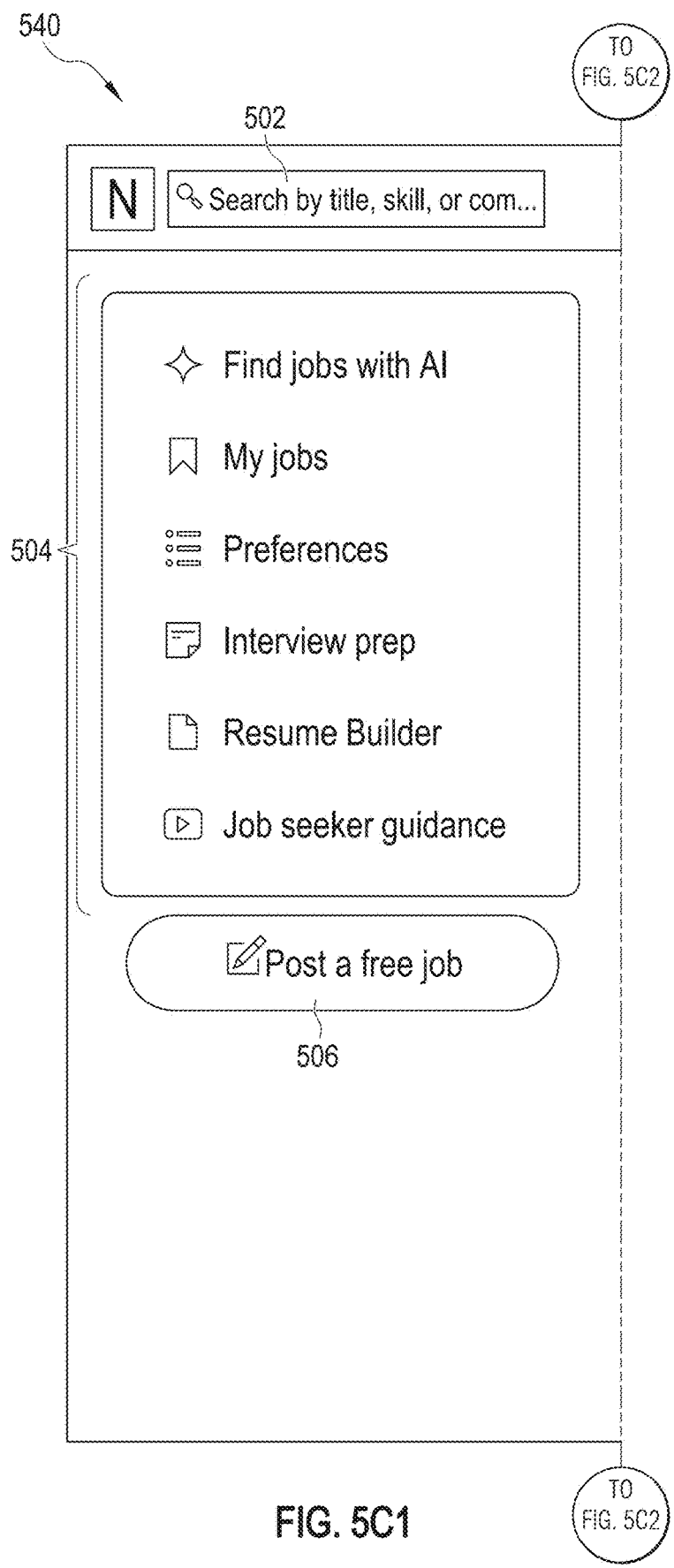
FIG. 5C1

FROM FIG. 5C1  TO FIG. 5C3

| W | Sr. Product Manager ✕ |
|---|---|
|   | Company6 - Anytown6, USA (On-site) |
|   | $115K/yr - $190K/yr |
|   | ☐ 1 company alum |
|   | 2 days ago |

| A | Sr. Product Success Manager (for PMs who want to guide other product teams) ✕ |
|---|---|
|   | Company7 - Anytown7, USA (remote) |
|   | $100K/yr - $170/yr |
|   | 15 hours ago |

Show all ⇒

⟩ 508

Hiring in your network
Explore relevant jobs in your network

| W | Sr. Product Manager - Climate Change ✕ |
|---|---|
|   | Company8 - Anytown8, USA (On-site) |
|   | 401(k) benefit |
|   | 👥 2 mutual connections with the hiring team |
|   | Promoted ☐ Easy Apply |

| A | Principal Product Manager, Studio ✕ |

⟩ 510

FROM FIG. 5C1   FIG. 5C2   TO FIG. 5C3

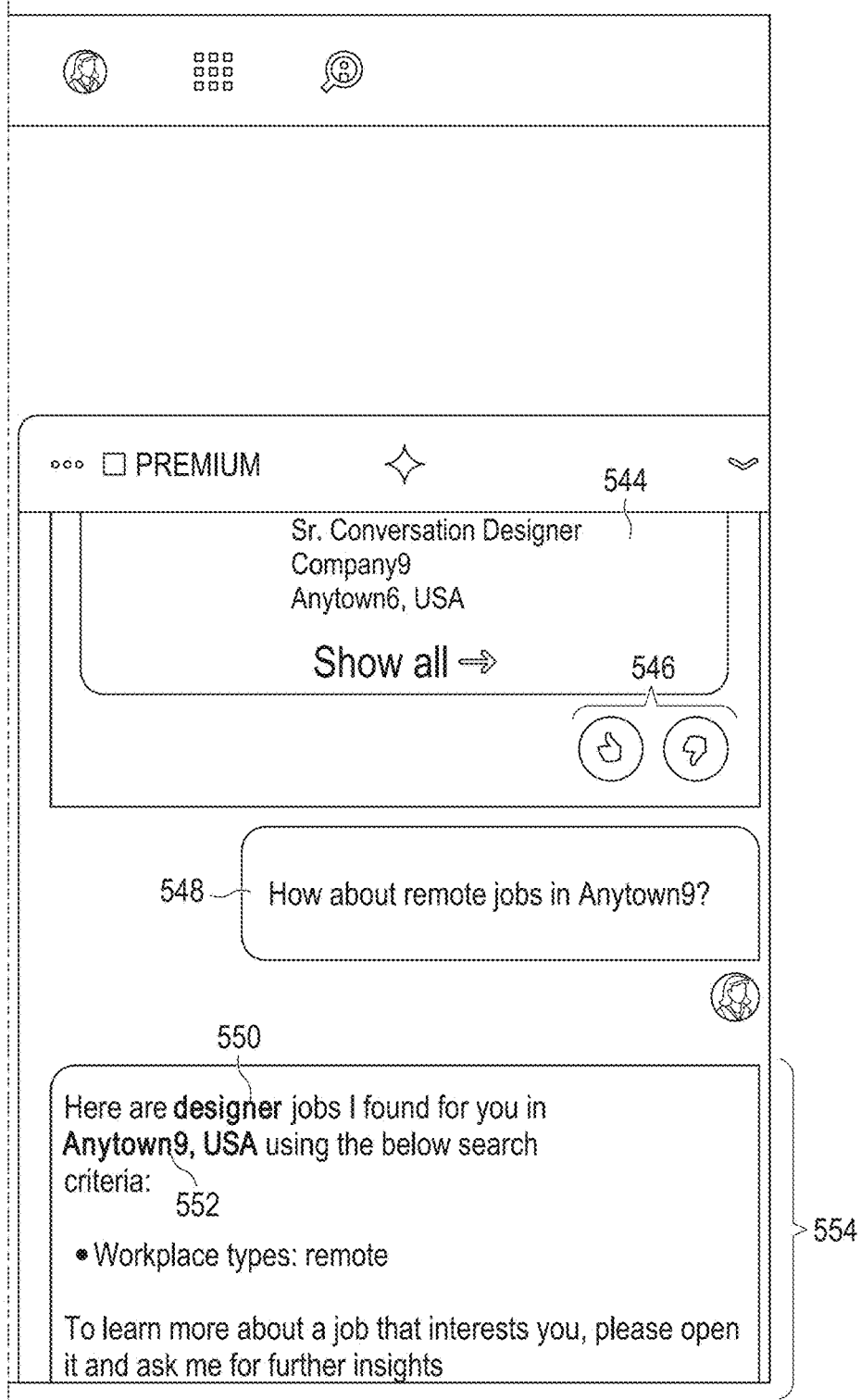
FIG. 5C3

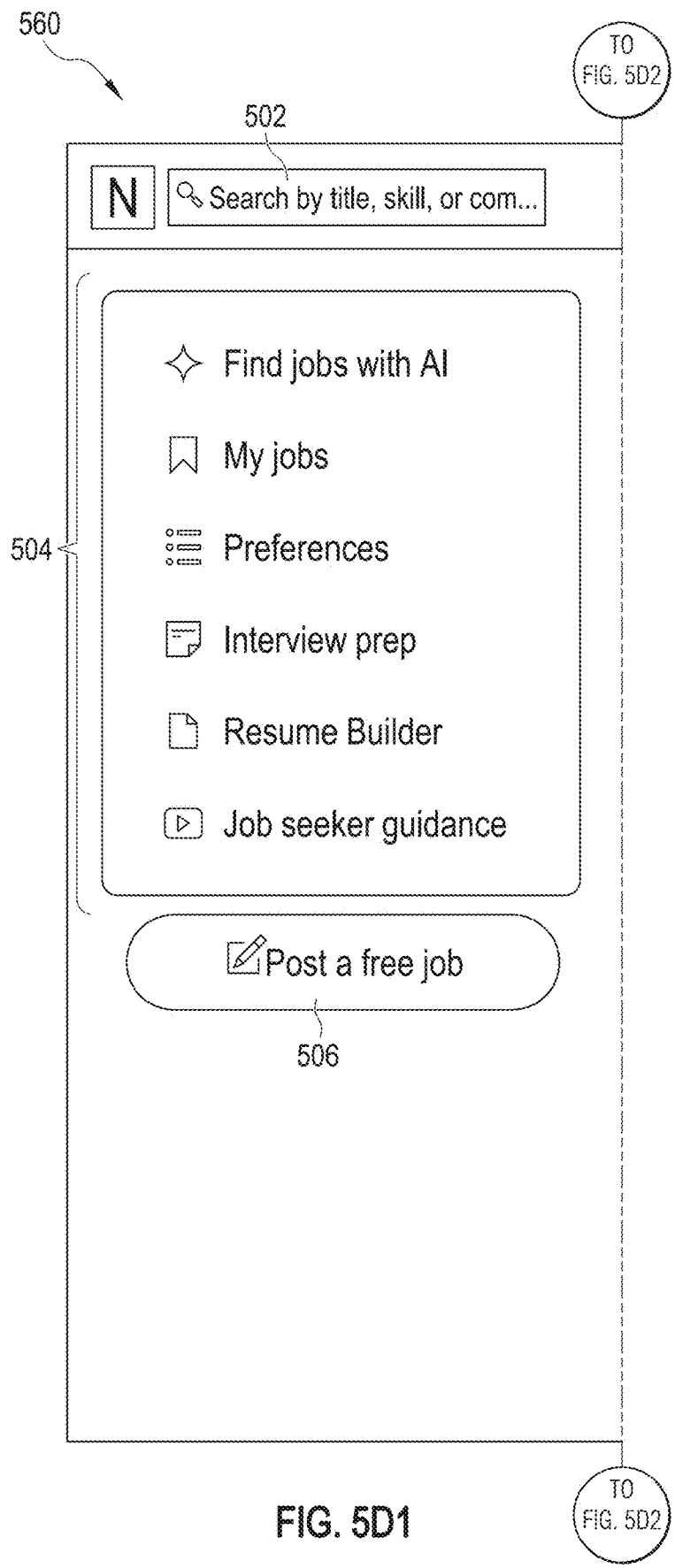
FIG. 5D1

FROM FIG. 5D1

TO FIG. 5D3

Sr. Product Manager ✕
W Company6 - Anytown6, USA (On-site)
$115K/yr - $190K/yr ☐ 1 company alum 2 days ago

Sr. Product Success Manager (for PMs who want to guide other product teams) ✕
A Company7 - Anytown7, USA (remote)
$100K/yr - $170/yr 15 hours ago Show all ⇒

⎱ 508

Hiring in your network
Explore relevant jobs in your network

Sr. Product Manager - Climate Change ✕
W Company8 - Anytown8, USA (On-site)
401(k) benefit 👥 2 mutual connections with the hiring team Promoted  ☐ Easy Apply

⎱ 510

Principal Product Manager, Studio ✕
A

FROM FIG. 5D1

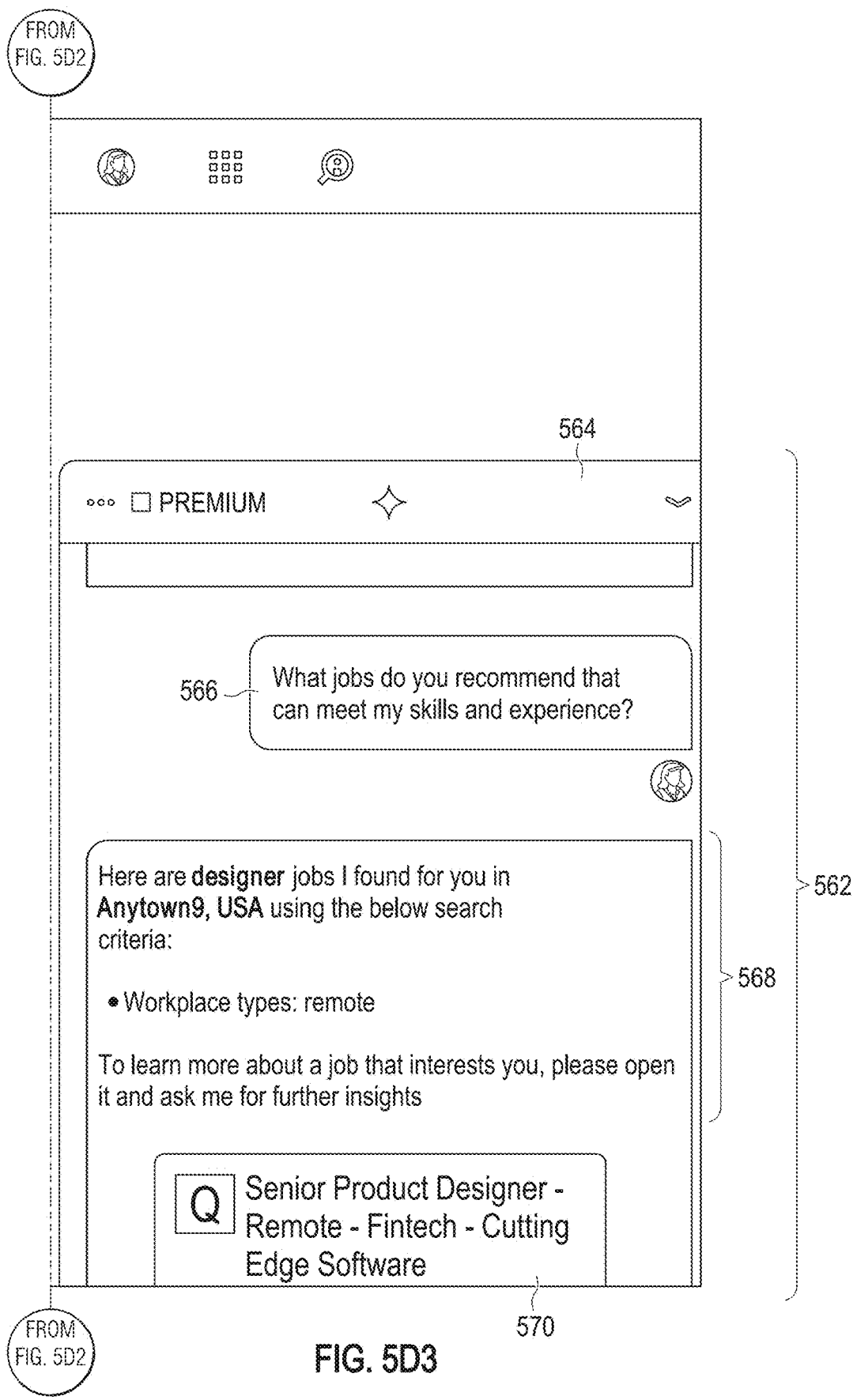
FIG. 5D3

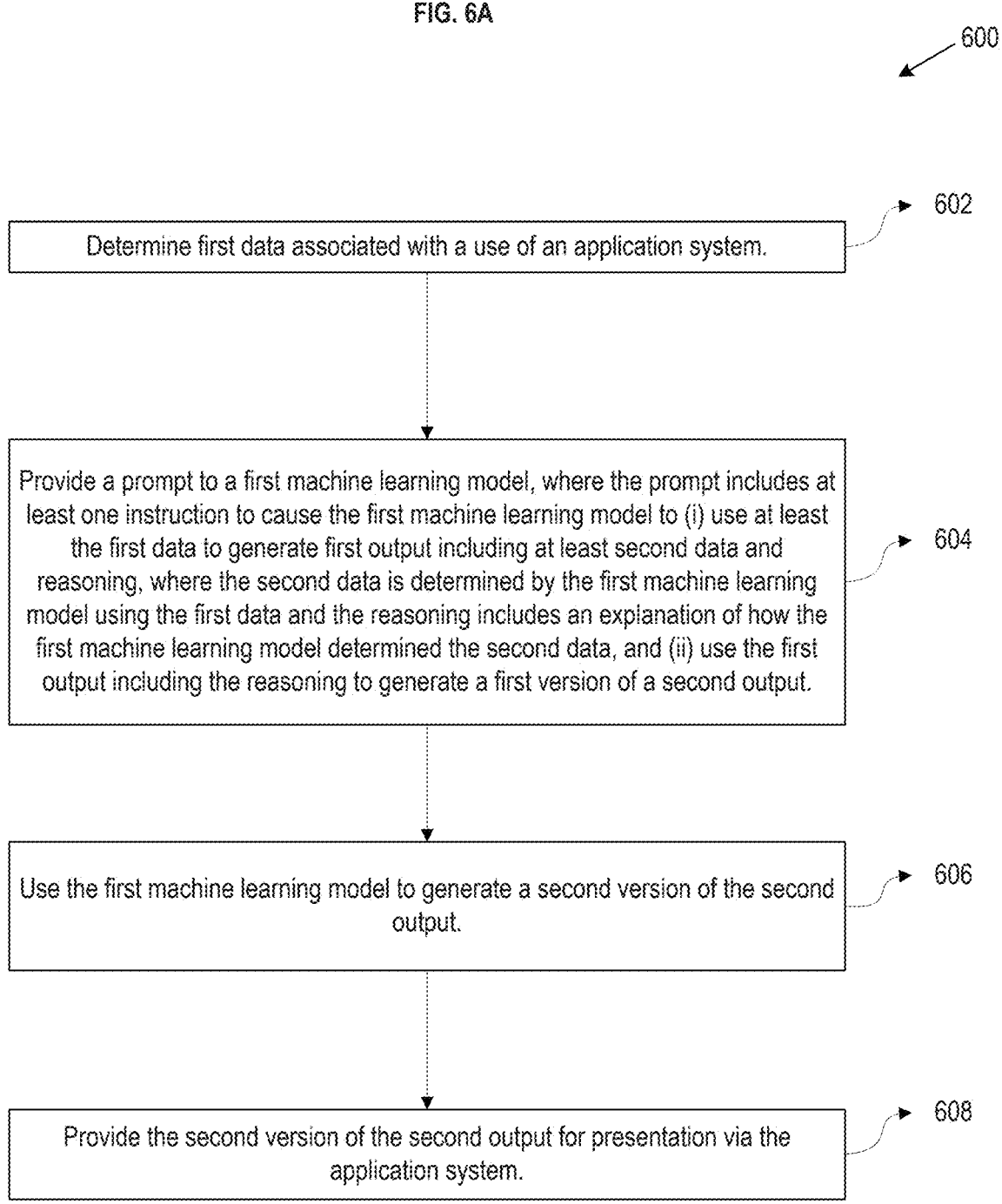

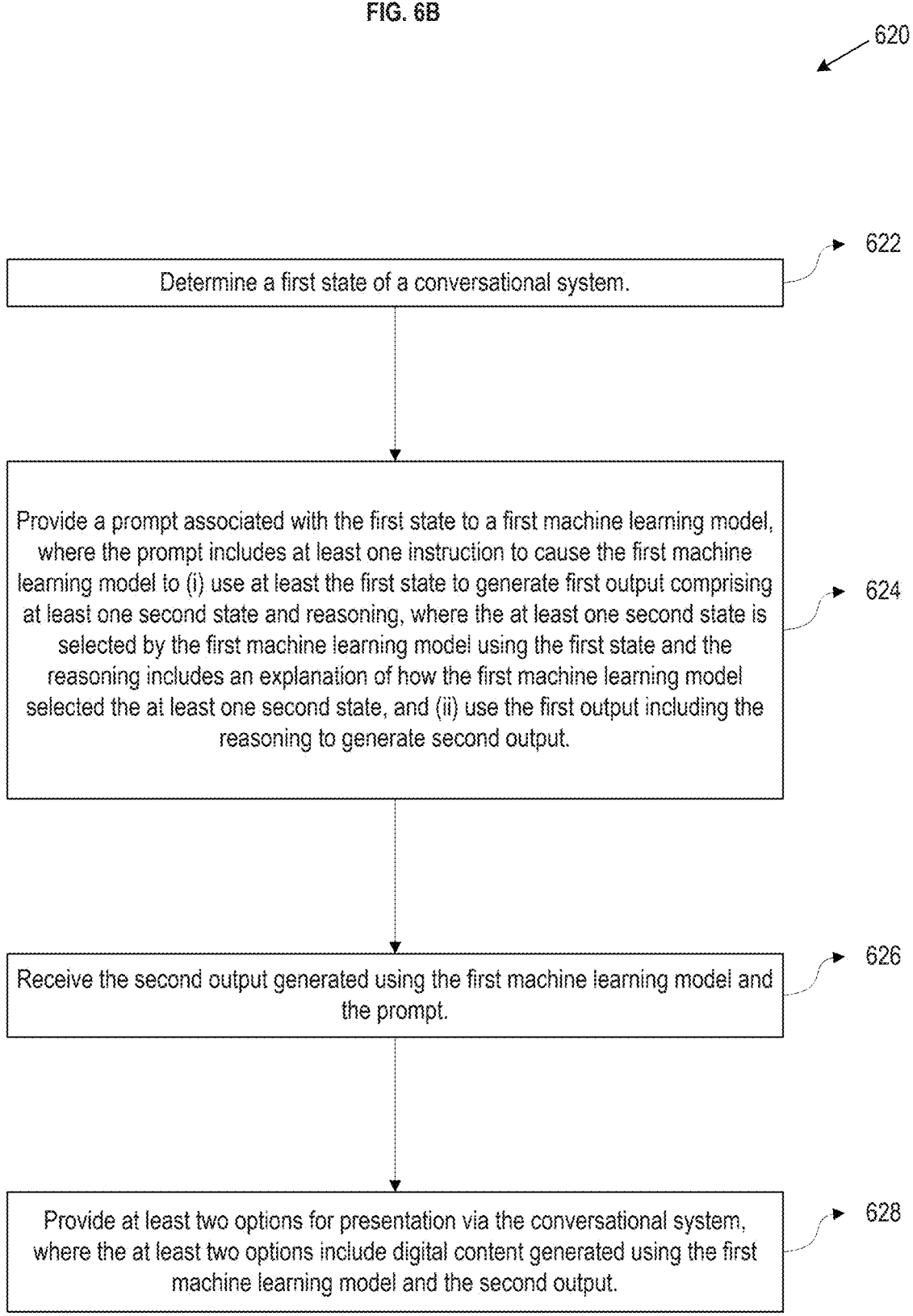

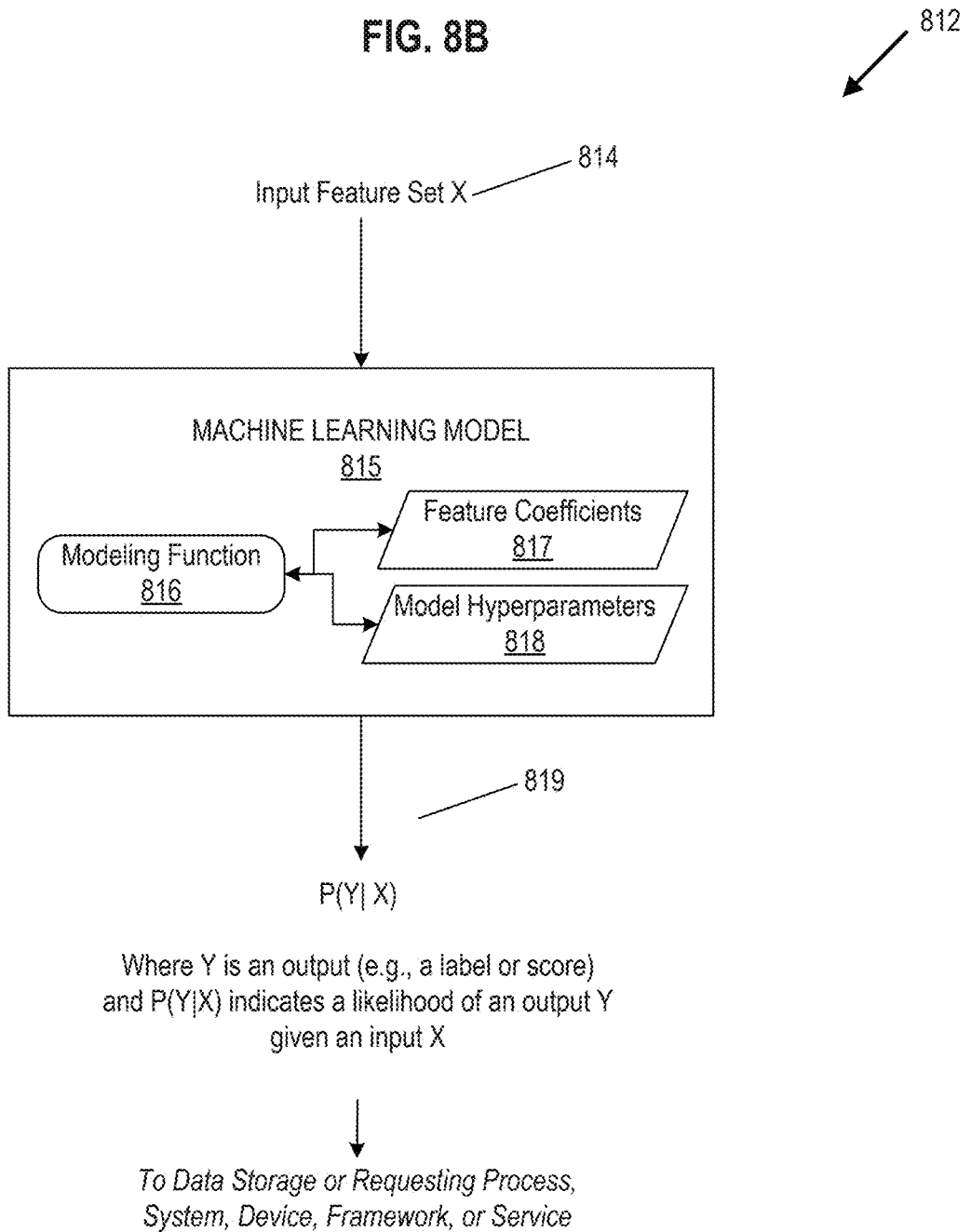

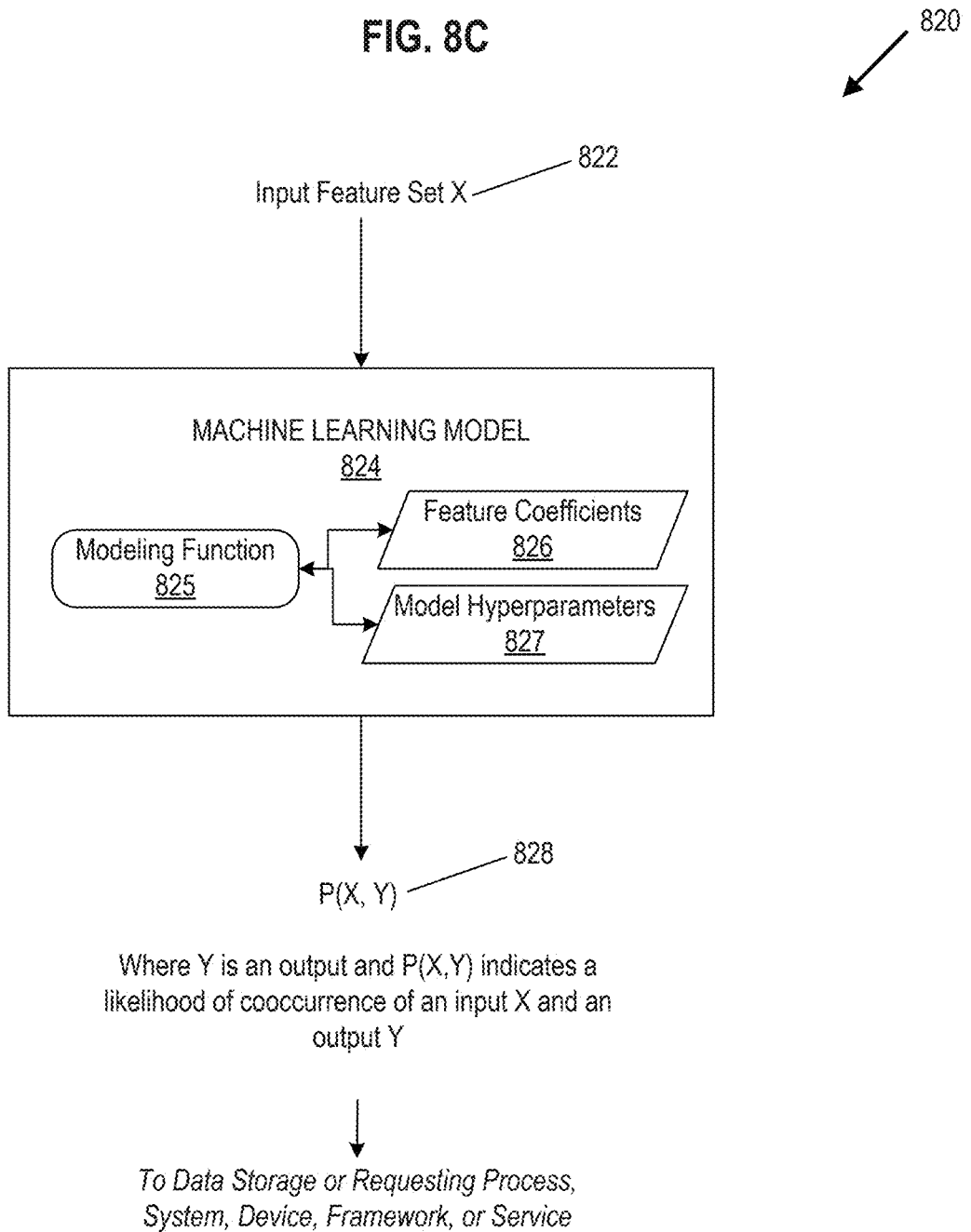

DIGITAL CONTENT GENERATION WITH IN-PROMPT HALLUCINATION MANAGEMENT FOR CONVERSATIONAL AGENT

TECHNICAL FIELD

Technical fields to which this disclosure relates include information search and assessment systems. Other technical fields to which this disclosure relates include applications of machine learning models to digital content generation tasks.

COPYRIGHT NOTICE

This patent document, including the accompanying drawings, contains material that is subject to copyright protection. The copyright owner has no objection to the facsimile reproduction of this patent document, as it appears in the publicly accessible records of the United States Patent and Trademark Office, consistent with the fair use principles of the United States copyright laws, but otherwise reserves all copyright rights whatsoever.

BACKGROUND

A search engine is a software program that helps users retrieve information. A user provides query terms through a search interface. When the user is finished providing the search query terms, the user inputs a signal that tells the search engine to initiate the search. In response to the initiate search signal, the search engine formulates a search based on the input search query terms, executes the search to retrieve information corresponding to the search query terms, and provides the retrieved information to the search interface.

Entity matching systems are computer systems that generate predictive output indicating the extent to which digital entities match each other according to one or more criteria. For example, entity matching systems can be used to predict a likelihood that a job seeker's resume matches the qualifications listed in a job posting, or to predict whether a user is likely to interact with a certain content item if the content item is presented to the user.

Agents can include hardware and/or software components that are capable of performing tasks without direct human instruction. Agents differ from daemons and other computer programs that run as background processes in the level of complexity of the tasks they can execute and the degree to which the agents are capable of interacting with human users.

BRIEF DESCRIPTION OF THE DRAWINGS

The disclosure will be understood more fully from the detailed description given below and from the accompanying drawings of various embodiments of the disclosure. The drawings are for explanation and understanding only and should not be taken to limit the disclosure to the specific embodiments shown.

FIG. 4A1, FIG. 4A2, FIG. 4A3 is a screen capture of an example user interface for a conversational agent in accordance with some embodiments of the present disclosure.

FIG. 4B1, FIG. 4B2 is a screen capture of an example user interface for a conversational agent in accordance with some embodiments of the present disclosure.

FIG. 5A1, FIG. 5A2, FIG. 5A3 is a screen capture of an example user interface for a conversational agent in accordance with some embodiments of the present disclosure.

FIG. 5B1, FIG. 5B2, FIG. 5B3 is a screen capture of an example user interface for a conversational agent in accordance with some embodiments of the present disclosure.

FIG. 5C1, FIG. 5C2, FIG. 5C3 is a screen capture of an example user interface for a conversational agent in accordance with some embodiments of the present disclosure.

FIG. 5D1, FIG. 5D2, FIG. 5D3 is a screen capture of an example user interface for a conversational agent in accordance with some embodiments of the present disclosure.

FIG. 6A is a flow diagram of an example method for generating digital content using a prompt in accordance with some embodiments of the present disclosure.

FIG. 6B is a flow diagram of an example method for generating digital content using a prompt in accordance with some embodiments of the present disclosure.

FIG. 8B is a block diagram of a machine learning model that can be used by and/or included in an agent system in accordance with some embodiments of the present disclosure.

FIG. 8C is a block diagram of a machine learning model that can be used by and/or included in an agent system in accordance with some embodiments of the present disclosure.

DETAILED DESCRIPTION

Figure 1A:
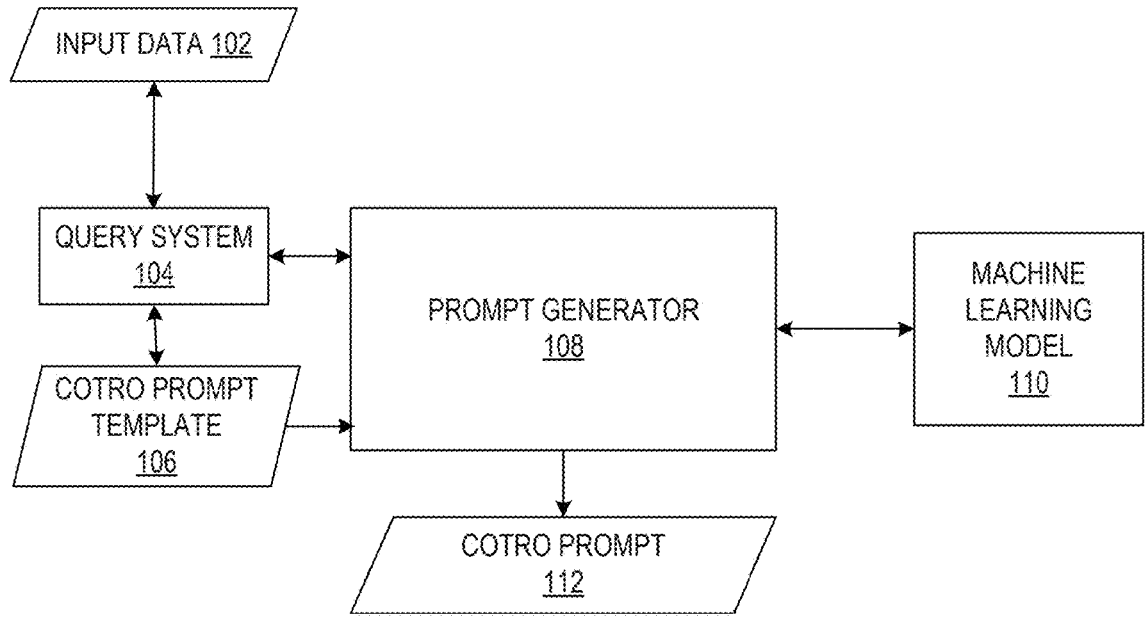
FIG. 1A is a flow diagram of an example method for configuring a prompt in accordance with some embodiments of the present disclosure.

A generative artificial intelligence model, generative machine learning model, or generative model uses artificial intelligence technology to machine-generate digital content based on model inputs and data with which the model has been trained. A generative language model is a particular type of generative model that is capable of generating and outputting digital content in response to model input including a task description, also referred to as a prompt.

Generative models, such as large language models (LLMs), have demonstrated the ability to respond to questions in a conversational natural language format. However, it has proven challenging to ensure that responses generated by the LLMs are accurate, relevant to the questions presented, and consistently reliable. This is because the inherent nature of LLMs is that the output of the LLMs can be unpredictable due to a phenomenon known as artificial intelligence (AI) hallucination.

AI hallucination refers to the tendency of LLMs to produce false, inaccurate, or nonsensical information with high confidence. LLM hallucinations can undermine the trust and reliability of an application system. Thus, the risk of unpredictable output by LLMs can be a deterrent to the widespread use of LLMs to build applications.

Incorporating human corrective feedback into the process of LLM-based content generation can help reduce hallucination. However, conventional approaches for updating models based on user feedback can suffer from latency and other technical issues.

Prompt engineering is a technique used to optimize the structure and/or content of the input to a generative model, e.g., the prompt. Chain of thought prompting is a prompt engineering technique that causes a machine learning model to output reasoning, e.g., an explanation of how the model performed a task, such as a description of intermediate steps performed by the model to accomplish the task.

Conventionally, chain of thought reasoning has been applied to the model input (COTRI). For example, a COTRI prompt can include one or more examples of a specific of steps that can be used to perform a task, instructions to perform the task, and instructions to output reasoning related to the model's performance of the task, e.g., instructions to output the actual set of steps the model executed to perform the task.

Additionally, the COTRI approach focuses on evaluating the process the model applies to the input, in order to adjust the model input. For example, the COTRI approach can be used to change or clarify the examples provided in the model input (e.g., by modifying the prompt) to improve the model's reasoning.

The need to provide and refine examples of the specific steps of task performance (e.g., by modifying the prompt) is a drawback to the COTRI approach because the prompt's usability becomes limited to highly specific tasks for which the prompt has been designed. For instance, significant amounts of re-engineering can be required to refine prompts using COTRI or to adapt COTRI prompts to other tasks. The engineering work needed to make COTRI prompts reliable or adaptable to more generalized tasks can be resource intensive and/or cost prohibitive.

Embodiments address these and/or other technical challenges. Embodiments provide in-prompt hallucination management by applying chain of thought reasoning to preliminary model-generated output. The described approach can be referred to herein as chain of thought reasoning on the output (COTRO). In contrast to COTRI, the described COTRO approach focuses on refining the model-generated output rather than on refining the model input (e.g., the examples included in the prompt). For example, the COTRO approach instructs the model to practice performing a task, provide reasoning related to how the model practiced the task, and use the reasoning from the practice to re-execute the task on the input to produce digital content that can be presented to a user.

The described approach to hallucination management is in-prompt in the sense that the COTRO is built into the prompt structure so that the machine learning model executes steps to reduce the risk of hallucination in the output during performance of the content generation task and before the model-generated output is presented to the user. As such, the described approach does not require human feedback and can be used as an alternative to or in addition to human feedback-based hallucination reduction methods.

Embodiments of the described approach can be used to improve, for example, generative model-based conversational agents. For example, general purpose-, task- and/or domain-specific generative model-based conversational agents can be configured and implemented at scale because the reliability, relevance, and accuracy of the model-generated content can be improved using the described approaches.

Examples of conversational agents include search agents, assessment agents, navigation agents, and combinations of any of these and/or other agents. Search agents can perform information search and retrieval functions using a conversational dialog-based user interface. In the case of search agents, the model-generated content produced using COTRO can include a disambiguated search query. Examples of search agents include job search agents, people search agents, and other entity-based search agents (e.g., product search, content search, company search, etc.).

Assessment agents can evaluate and summarize the similarities and differences between entities using a conversational dialog-based user interface. In the case of assessment agents, the model-generated content produced using COTRO can include an indication (e.g., a narrative summary or visual depiction) of how well-matched two entities are. For example, an assessment agent can evaluate how well a job seeker's online profile, job application, or resume matches a particular job posting or how similar a product description is to a description of a product previously viewed or purchased by a user.

Navigation agents can dynamically generate selectable navigation options to be presented via a user interface, based on the current state of a conversational agent, where each selectable option identifies an action that is statistically or probabilistically ranked as being of likely interest to a user. In the case of navigation agents, the model-generated content produced using COTRO can include descriptions or depictions of actions identified by or associated with the selectable options.

Generative model-based navigation agents can also or alternatively use COTRO to generate a classification of an input or state, where the conversational agent can use the classification to make routing decisions among agents of a multi-agent system. Illustrative examples of search agents, assessment agents, and navigation agents are provided herein; however, the described approaches are applicable to many other types of agents and/or combinations of agents that use generative models to generate digital content.

A large language model (LLM) is a type of generative language model that is trained in an unsupervised way on massive amounts of unlabeled data, such as publicly available texts extracted from the Internet, using deep learning techniques. A language model (LM) can be similar in function and/or architecture to an LLM except that the LM may be trained on a much smaller dataset, e.g., to perform a domain-specific task. A language model or large language model can be configured to perform one or more natural language processing (NLP) tasks, such as generating content, classifying content, answering questions in a conversational manner, and translating content from one language to another.

Prompt as used herein may refer to one or more instructions that are readable by a generative artificial intelligence (GAI) model, such as a large language model. The prompt can also include or refer to the input to which the GAI model is to apply the instructions. The prompt can also include one or more parameter values configured to constrain the operations of the GAI model during the processing of the prompt and generating and outputting a response to the prompt. The input can be specified explicitly in the prompt or as a reference that is processed at execution time. The instructions can include one or more statements, questions, conditions, constraints, or examples. The examples can include examples of the types of output to be produced by the GAI model and/or examples of the types of processing steps the large language model is to perform in order to generate output.

A prompt can include natural language or multimodal instructions such as "please generate a summary of these search results" or a digital image or video recording of a demonstration of how to perform a task, for example. Alternatively or in addition, the prompt can include examples of digital content that demonstrate the type of output that the model is to produce, such as text or multimodal content (e.g., examples of digital images, videos, articles, audio, or other content produced using a particular language, format, writing style, or tone). Portions of the prompt can be in the form of natural language text, such as a question or a statement. Alternatively or in addition, a task description or prompt can include non-text forms of content, such as digital images, video, and/or digital audio. Alternatively or in addition, the prompt can include constraints, such as a specific order in which steps of a task are to be performed, specific tasks that should not be performed, and/or examples of output that should not be generated.

Agent as used herein can refer to an automated agent, a sub-agent, or a group of agents that programmatically execute one or more automated or semi-automated processes via a computer system. An agent system as used here can refer to a system that is capable of being used to create an agent, configure an agent, and/or cause one or more agents to execute one or more actions, tasks, sub-actions, or sub-tasks.

The term entity may be used herein to refer to users and/or to other types of entities, such as companies, organizations, institutions, associations, cohorts, job postings, content items, or groups of entities. Any aspects of any embodiments that are described in the context of users can also be applied to other types of entities. Any entity can have one more associated agents that are dynamically configured for a particular role or task using the approaches described herein.

Terminology such as "real time" or "dynamic" can refer to a time delay introduced by the use of computer technology, e.g., by back end data processing and/or network transmission, where the time delay is the difference in time, as measured, e.g., by a system clock, between the occurrence of an online event and the use of data processed in response to the event, such as for display, feedback, and/or control purposes. For example, real time or dynamic can refer to a time interval between a user input to a computer system and a presentation of output by the computer system. Dynamic can also or alternatively be used herein to indicate that one or more system components, data structures or data stores, e.g., agents, workflows, databases, vector stores, memory layers, etc., are updated, reconfigured, or refreshed within a time interval that is less than the time interval between two different inputs to a computer system.

Learning, machine learning, or training can refer to machine learning-based processes that the agents use to improve their performance of tasks and achievement of goals. Examples of machine learning-based processes include processes used to configure, train, pre-train, or fine tune machine learning models, such as but not limited to supervised machine learning, semi-supervised machine learning, unsupervised machine learning, prompt engineering, reinforcement learning, in context learning, retrieval-augmented generation (RAG), retrieval-augmented fine tuning (RAFT), Chain-of-Thought reasoning, and/or Bayesian-style inference learning. For example, RAG or RAFT can be used to perform domain-specific fine tuning of a pre-trained machine learning model using, e.g., samples of digital content that represent the desired domain-specific knowledge. Using RAG, digital content can be stored in and retrieved from a data store, e.g., a database such as a vector database, using queries that are configured to measure the similarity between the digital content in the vector database and the query, question, or request being asked. For example, embedding-based retrieval can be used to match vector representations of digital content stored in a vector database with a vector representation of a query, question, or request. With in-context learning, the retrieved content is used as input to an LM or LLM, which generates a response to the input including the RAG content. In fine tuning, the RAG content can be paired with an expected output to produce a training input-output pair, which is used to fine tune the LM or LLM. Approaches such as RAFT can be used, for example, to customize an LM or LLM according to a particular entity's preferences for performing a task. Additional examples of machine learning models and machine learning-based processes are described with reference to FIG. 8A, FIG. 8B, FIG. 8C, FIG. 8D, FIG. 8E.

Certain aspects of the disclosed technologies are described in the context of generative artificial intelligence models that receive text input and output text. However, the disclosed technologies are not limited to generative models that receive text input and produce text output. For example, aspects of the disclosed technologies can be used to receive input and/or generate output that includes non-text forms of content, such as digital imagery, videos, multimedia, audio, hyperlinks, and/or platform-independent file formats.

Certain aspects of the disclosed technologies are described in the context of electronic dialogs conducted via a network with at least one application system, such as a message- or chat-based application system or a search interface of an online system such as a social network system. However, aspects of the disclosed technologies are not limited to message- or chat-based systems or social network services, but can be used to improve various types of applications, machines, devices, and systems.

The disclosure will be understood more fully from the detailed description given below, which references the accompanying drawings. The detailed description of the drawings is for explanation and understanding, and should not be taken to limit the disclosure to the specific embodiments described.

In the drawings and the following description, references may be made to components that have the same name but different reference numbers in different figures. The use of different reference numbers in different figures indicates that components having the same name can represent the same embodiment or different embodiments of the same component. For example, components with the same name but different reference numbers in different figures can have the same or similar functionality such that a description of one of those components with respect to one drawing can apply to other components with the same name in other drawings, in some embodiments.

Also, in the drawings and the following description, components shown and described in connection with some embodiments can be used with or incorporated into other embodiments. For example, a component illustrated in a certain drawing is not limited to use in connection with the embodiment to which the drawing pertains, but can be used with or incorporated into other embodiments, including embodiments shown in other drawings.

As used herein, dialog, chat, or conversation may refer to one or more conversational threads involving a user of a computing device and an application. For example, a dialog or conversation can have an associated user identifier, session identifier, conversation identifier, or dialog identifier, and an associated timestamp. Thread as used here may refer to one or more rounds of dialog involving the user and an application. A round of dialog as used herein may refer to a user input and an associated system-generated response, e.g., a reply to the user input that is generated at least in part via a generative artificial intelligence model. Any dialog or thread can include one or more different types of digital content, including natural language text, audio, video, digital imagery, hyperlinks, and/or multimodal content such as web pages.

FIG. 1A is a flow diagram of an example method for configuring a prompt in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of distributed multi-agent system 105, including, in some embodiments, components or flows shown in FIG. 1A that may not be specifically shown in other figures and/or including, in some embodiments, components or flows shown in other figures that may not be specifically shown in FIG. 1A. Although shown in a particular sequence, arrangement, or order, unless otherwise specified, the order and/or arrangement of the components and/or processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 1A, an example computing system 100 is shown, which includes a prompt generator 108. The prompt generator 108 can be implemented, e.g., as a programmable function or tool that is callable by an application system such as a conversational agent. The prompt generator 108 interfaces (e.g., communicates bidirectionally) with a query system 104 and a machine learning model 110.

The query system 104 can be implemented using, e.g., a database query system for, e.g., a vector database or graph database. For example, the query system 104 can use, e.g., embedding-based retrieval or graph queries to retrieve input data 102 from one or more input sources (e.g., user input received via a conversational agent, a log of conversation history or state transitions, dialog context, etc.). The query system 104 can pass the retrieved input to prompt generator 108.

Alternatively or in addition, the query system 104 can retrieve a chain of thought reasoning on the output (COTRO) prompt template 106 from a data store, e.g., a prompt library, and pass the COTRO prompt template 106 to prompt generator 108. The COTRO prompt template 106 includes one or more instructions that are configured to cause a machine learning model to perform chain of thought reasoning on the output as described herein. An example of a COTRO prompt template is described with reference to FIG. 1B. The machine learning model 110 can be implemented using, e.g., a pre-trained generative machine learning model, such as an LLM, an LM, or another type of generative model.

In operation, the prompt generator 108 obtains input data 102 from the one or more input sources via query system 104 and retrieves a COTRO prompt template 106 from memory. The prompt generator 108 passes the input data and the COTRO prompt template 106 to the machine learning model 110 with an instruction to generate a COTRO prompt, e.g., a retrieval-augmented generation (RAG)-style instruction. The machine learning model 110 processes the instruction in combination with the input data 102 and the COTRO prompt template 106 to generate and output the COTRO prompt 112. For example, the machine learning model 110 combines or merges the input data 102 with the COTRO prompt template 106 to create or configure the COTRO prompt 112. The machine learning model 110 passes the COTRO prompt 112 back to prompt generator 108.

The prompt generator 108 outputs the COTRO prompt 112 to, e.g., a process, model, agent, or other component of an application system. For example, the prompt generator 108 can be called by a conversational agent or a sub-agent thereof, e.g., a search agent, an assessment agent, or a navigation agent and return the COTRO prompt 112 to the requesting agent. The requesting agent can then pass the COTRO prompt 112 to a second machine learning model (e.g., the machine learning model 110 or a different machine learning model) to cause the second machine learning model to generate and output digital content for presentation to a user.

The examples shown in FIG. 1A and the accompanying description, above are provided for illustration purposes. This disclosure is not limited to the described examples. Additional or alternative details and implementations are described herein.

Figure 1B:
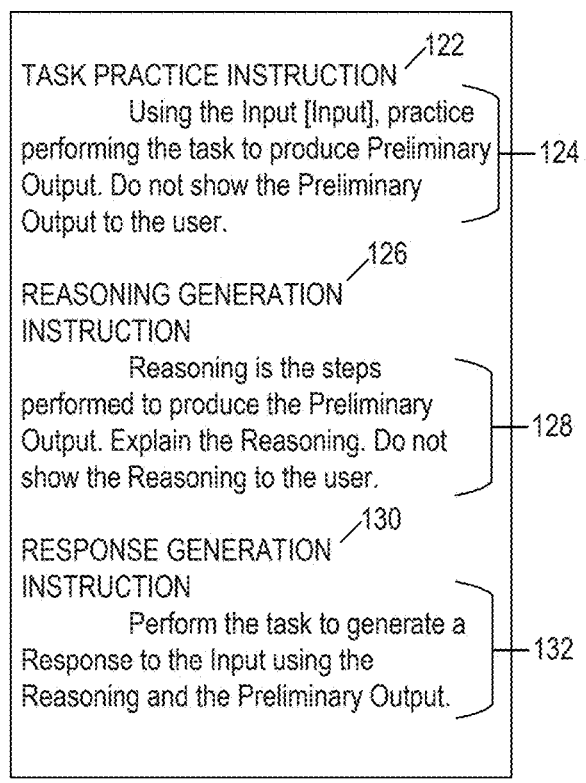
FIG. 1B is an example of a prompt template in accordance with some embodiments of the present disclosure.

FIG. 1B is an example of a prompt template in accordance with some embodiments of the present disclosure. In FIG. 1B, an exemplary prompt template 120 includes a task practice instruction 122, a reasoning generation instruction 126, and a response generation instruction 130. Each of the task practice instruction 122, reasoning generation instruction 126, and response generation instruction 130 includes a respective set of instructions 124, 128, 132. In FIG. 1B, the sets of instructions 124, 128, 132 are in the form of natural language text. In other embodiments, one or more of the sets of instructions 124, 128, 132 can include non-text content or multimodal content, for example.

The task practice instruction 122 includes an instruction configured to cause a machine learning model to practice performing a task using input to generate preliminary output. The task practice instruction 122 includes a placeholder [Input] which can act as a reference to input passed as one or more parameters at execution time. The task practice instruction 122 instructs the machine learning model to use the preliminary output generated by the machine learning model during the task practice as input to the reasoning generation instruction 126 without presenting the preliminary output to the user.

The reasoning generation instruction 126 includes a definition of reasoning, e.g., reasoning is the steps performed by the machine learning model during the task practice to produce the preliminary output. The reasoning generation instruction 126 instructs the machine learning model to explain the reasoning on the output. The reasoning generation instruction 126 instructs the machine learning model to use the reasoning as input to the response generation instruction 130 without showing the reasoning to the user.

The response generation instruction 130 instructs the machine learning model to perform the task and generate a response to the input using the reasoning produced by the machine learning model in response to the reasoning generation instruction 126 and the preliminary output produced by the machine learning model in response to the task practice instruction 122.

The examples shown in FIG. 1B and the accompanying description, above are provided for illustration purposes. This disclosure is not limited to the described examples. Additional or alternative details and implementations are described herein.

Figure 1C:
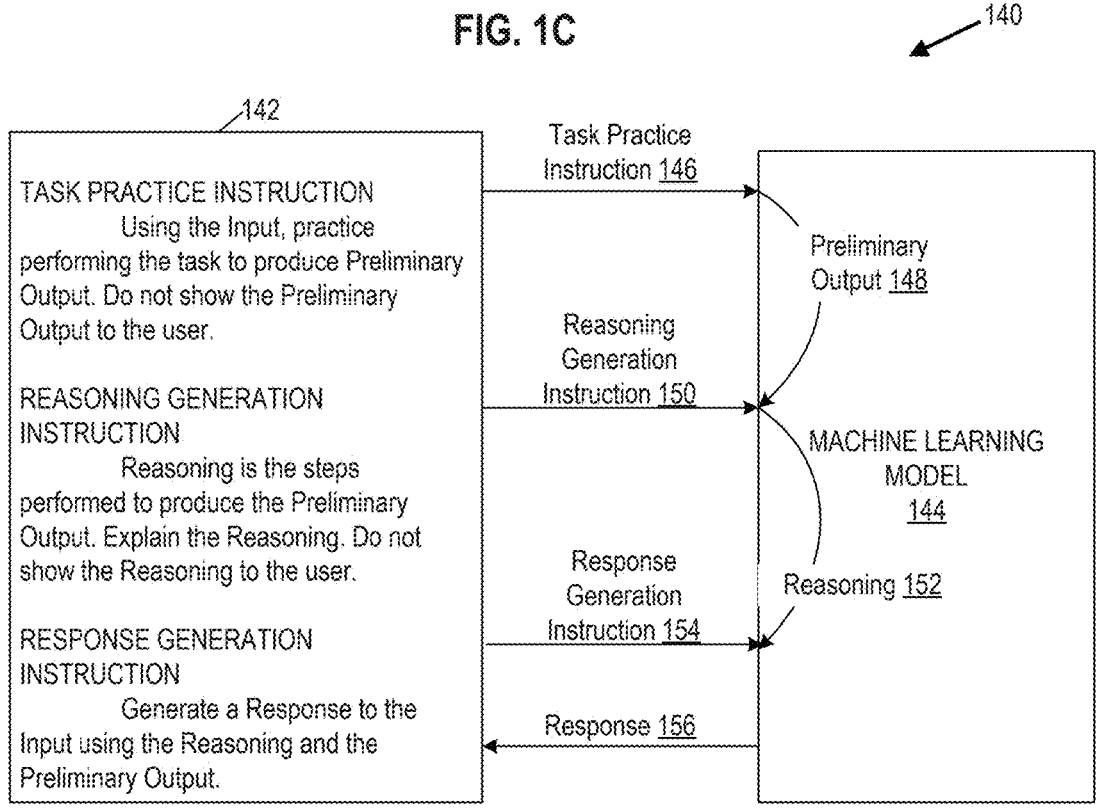
FIG. 1C is a flow diagram of an example method for processing a prompt in accordance with some embodiments of the present disclosure.

FIG. 1C is a flow diagram of an example method for processing a prompt in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of an application system, including, in some embodiments, components or flows shown in FIG. 1C that may not be specifically shown in other figures and/or including, in some embodiments, components or flows shown in other figures that may not be specifically shown in FIG. 1C. Although shown in a particular sequence, arrangement, or order, unless otherwise specified, the order and/or arrangement of the components and/or processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 1C, a method 140 illustrates how a machine learning model 144 can process a COTRO prompt 142. The machine learning model 144 can be implemented using, e.g., a pre-trained or fine-tuned generative machine learning model, such as an LLM, an LM, or another type of generative model.

In some implementations, the COTRO prompt 142 is a multi-step prompt that is input to the machine learning model 144 via a single communication (e.g., a single application programming interface (API) call). The machine learning model 144 processes the COTRO prompt 142 by executing the instructions contained in the COTRO prompt 142. For example, the machine learning model 144 executes task practice instruction 146 to produce preliminary output 148. The machine learning model 144 executes reasoning generation instruction 150 using preliminary output 148 to produce reasoning 152. The machine learning model 144 executes response generation instruction 154 using at least reasoning 152 to produce response 156. The machine learning model 144 returns the response 156 to the calling program, agent, component, service, or system.

The examples shown in FIG. 1C and the accompanying description, above are provided for illustration purposes. This disclosure is not limited to the described examples. Additional or alternative details and implementations are described herein.

Figure 1D:
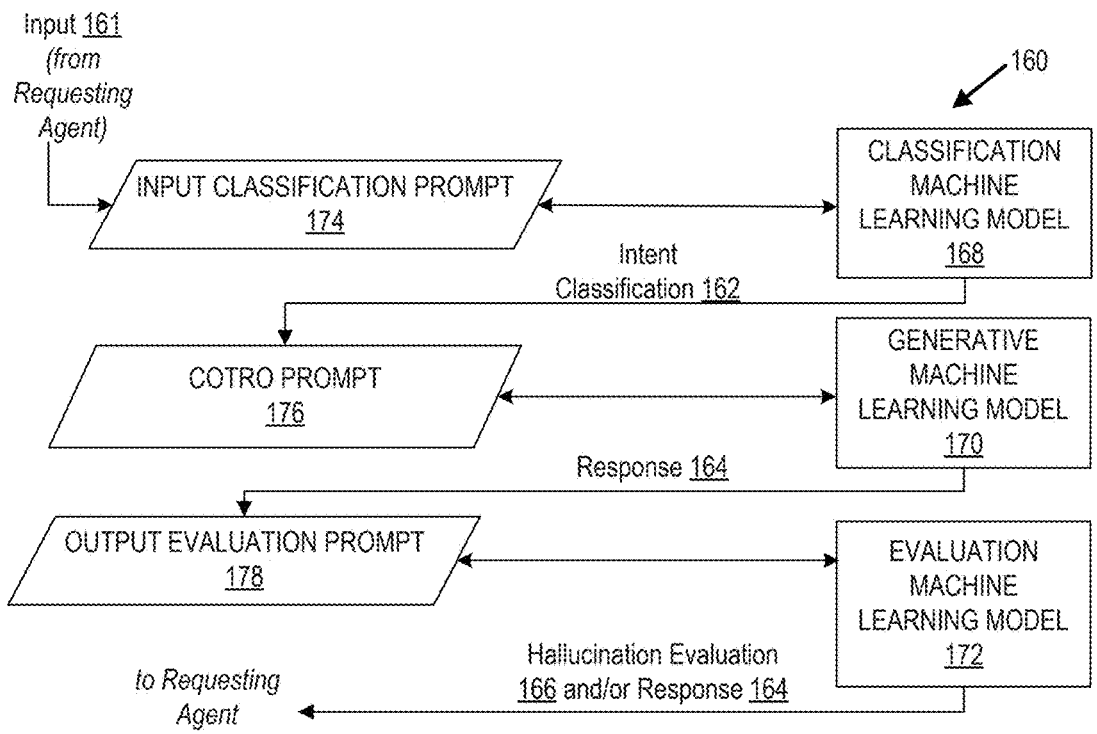
FIG. 1D is a flow diagram of an example method for generating digital content using at least one prompt in accordance with some embodiments of the present disclosure.

FIG. 1D is a flow diagram of an example method for generating digital content using at least one prompt in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of an application system, including, in some embodiments, components or flows shown in FIG. 1D that may not be specifically shown in other figures and/or including, in some embodiments, components or flows shown in other figures that may not be specifically shown in FIG. 1D. Although shown in a particular sequence, arrangement, or order, unless otherwise specified, the order and/or arrangement of the components and/or processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 1D, portions of a method 160 are performed using a classification machine learning model 168, a generative machine learning model 170, and an evaluation machine learning model 172. The classification machine learning model 168 can be implemented, for example, using a discriminative model such as a regression model or a generative model configured to perform a classification task.

The generative machine learning model 170 can be implemented, for example, using a sequence to sequence model, an encoder-decoder model, a transformer model, or another type of generative machine learning model. In some embodiments, the generative machine learning model 170 is implemented using a pre-trained language model, such as a large language model with reasoning capabilities.

The evaluation machine learning model 172 can be implemented, for example, using a discriminative machine learning model or generative machine learning model. For example, the evaluation machine learning model 172 can be the same as the machine learning model used as the classification machine learning model 168 or the machine learning model used as the generative machine learning model 170. In some embodiments, the same machine learning model is used to perform the functions of each of the classification machine learning model 168, the generative machine learning model 170, and the evaluation machine learning model 172.

In operation, input 161 is received from, e.g., a requesting agent, application, process, component, or system, such as a conversational agent. The input 161 can include one or more of user input, such as natural language input and/or option selections received via a conversational user interface, or context data. Context data can include, for example, one or more portions of a log of previously received user input, state history of the conversational agent, conversational dialog history, and/or other information associated with a source of input, such as online profiles and/or online activities (e.g., content posts, social reactions, search histories, content shares, connection requests, etc.) associated with the source of input.

The input 161 is used to configure an input classification prompt 174. For example, the input 161 can be merged or combined with an input classification prompt template to create the input classification prompt 174, where the input classification prompt template contains one or more instructions to cause the classification machine learning model 168 to, e.g., extract one or more entities from the input 161 and use e.g., binary classification, to classify the input 161 based on the extracted one or more entities. The entities can include canonical words or phrases such as names, locations, skills, job titles, nouns, verbs, adjectives, adverbs, etc. In other implementations, the input 161 can include one or more features extracted from the input 161, such as vectors or embeddings. In some implementations, such as where the classification machine learning model 168 is a binary classifier, the input classification prompt 174 can be omitted and the input 161 and/or features extracted from the input 161 can be input directly into the classification machine learning model 168 (e.g., without a classification instruction).

The classification machine learning model 168 processes the input classification prompt 174 and outputs an intent classification 162. The intent classification 162 can include, e.g., a compact representation of the input, such as a canonical representation of an action or user intention contained in the input. For instance, the intent classification 162 can include an action category, such as job search, assess job, update profile, etc.

The intent classification 162 is used to configure a COTRO prompt 176. For example, the intent classification 162 can be merged or combined with a COTRO prompt template, such as the COTRO prompt template described with reference to FIG. 1D, to create the COTRO prompt 176. The COTRO prompt 176 contains one or more instructions to cause the generative machine learning model 170 to generate and output a response 164 using the chain of thought reasoning on the output approach described herein. For example, the COTRO prompt 176 includes an instruction to cause the generative machine learning model 170 to practice performing a task using the intent classification 162 and/or input 161 to generate preliminary output without showing the preliminary output to the user, output reasoning associated with the generation of the preliminary output, and use the preliminary output and the reasoning to generate the response 164.

The response 164 can be configured by generative machine learning model 170 for presentation via a user interface. In some embodiments, a hallucination evaluation can be applied to the response 164 before the response 164 is returned to the requesting agent or presented to the user. Thus, in some embodiments, multiple levels of hallucination management are used: in-prompt COTRO-based hallucination management and a post-output hallucination evaluation.

For instance, a hallucination evaluation can be performed by applying evaluation machine learning model 172 to an output evaluation prompt 178, where the output evaluation prompt 178 is created or configured using the response 164. The output evaluation prompt 178 can include the response 164 and an instruction configured to cause the evaluation machine learning model 172 to classify or score the response 164. Alternatively, such as where the evaluation machine learning model is implemented as a classifier or scoring model, the output evaluation prompt 178 can be omitted and the response 164 and/or features or vector representations of portions of the response 164 can be input directly into evaluation machine learning model 172. The evaluation machine learning model 172 outputs a hallucination evaluation 166 and/or passes the response 164 to the requesting agent in response to the input 161. The hallucination evaluation can include a category label or score. For example, the response 164 can be labeled as severe (e.g., contains content that is very likely to mislead the user or cause the user to misinterpret the response 164 as factually accurate), major (e.g., contains inaccurate content, such as a job assessment that indicates a job is a good fit for a user but in fact is not a good fit for the user, or incorrect information about a job posting or company), or minor (e.g., does not contain content likely to mislead or misinform the user).

The evaluation machine learning model 172 can be trained or fine-tuned to perform the hallucination evaluation task using historical examples of AI hallucinations. For example, training examples of model input-output pairs that have been categorized or scored according to a hallucination classification scheme or scoring rubric can be used to train or fine-tune the evaluation machine learning model 172 for hallucination evaluation.

The examples shown in FIG. 1D and the accompanying description, above are provided for illustration purposes. This disclosure is not limited to the described examples. Additional or alternative details and implementations are described herein.

Figure 2:
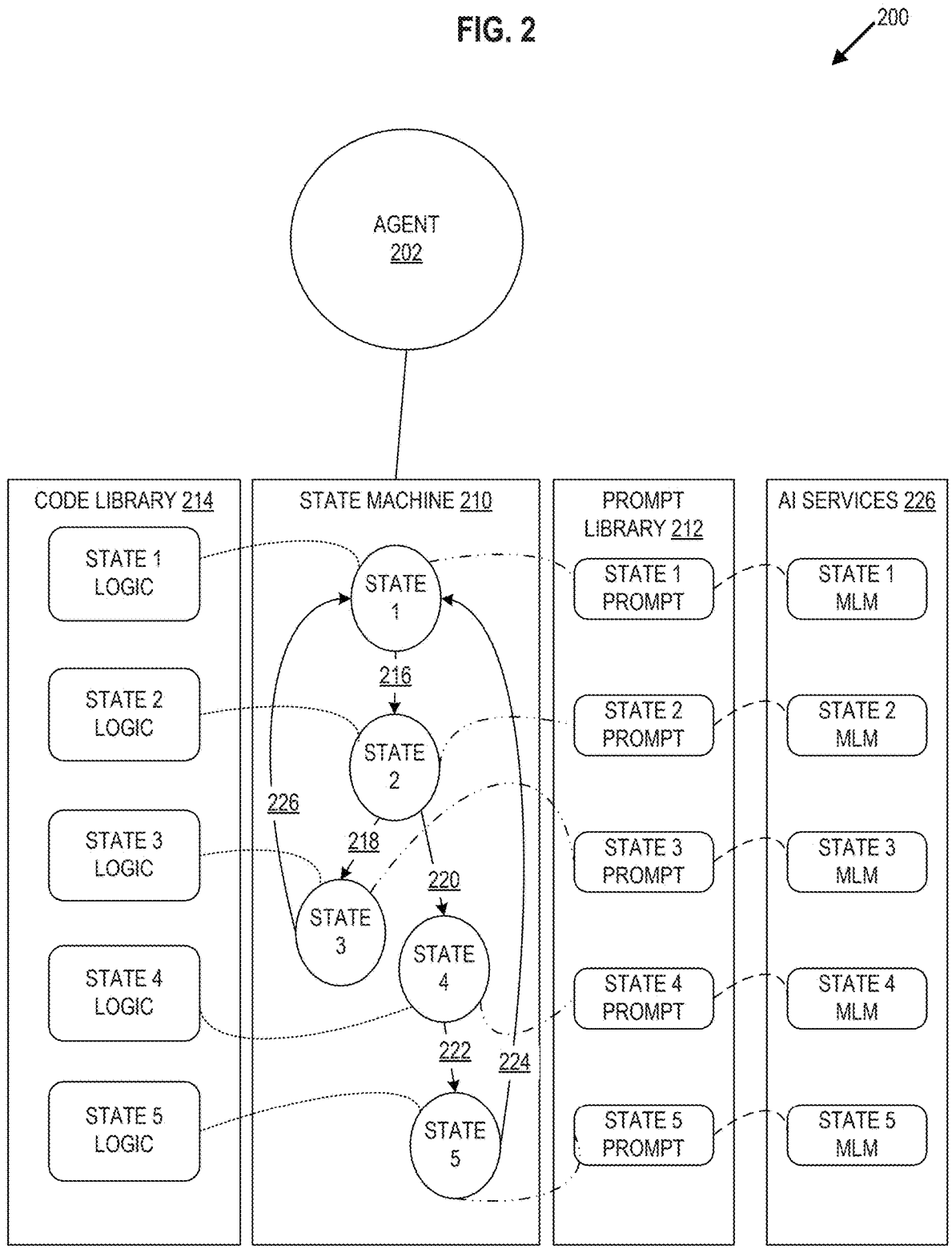
FIG. 2 is a block diagram of an example agent in accordance with some embodiments of the present disclosure.

FIG. 2 is a block diagram of an example agent in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of an application system, including, in some embodiments, components or flows shown in FIG. 2 that may not be specifically shown in other figures and/or including, in some embodiments, components or flows shown in other figures that may not be specifically shown in FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 2, an agent system 200 includes at least one agent 202. The agent 202 has an associated state machine 210. The state machine 210 includes an ordered series or sequence of states (e.g., state 1, state 2, state 3, state 4, state 5) and state transitions (e.g., transitions 216, 218, 220, 222). In the example of FIG. 2, the state machine 210 is represented as a directed graph, decision tree, workflow, or task flow, in which nodes represent states and state transitions are represented as directed connections between the states. The state machine 210 associated with the agent 202 is a finite state machine in that it has a finite number of states, transitions, and actions. However, embodiments are not limited to the number and arrangement of states and transitions shown in FIG. 2, which are provided for illustration purposes only.

Each state of the state machine 210 has associated state logic, prompt, and machine learning model. Collectively, the state machine 210 and its associated state logic, prompts, and machine learning models can define the functionality or task of the agent. For example, the state machine 210 can represent a dialog or user interface navigation flow typically associated with one or more tasks. For instance, if the agent 202 is associated with a search task, the state machine 210 and associated state logic, prompts, and machine learning models can be defined or configured differently than if the agent 202 is associated with an assessment task, a navigation task, or some other type of task.

In the example of FIG. 2, state logic are stored in a code library 214. The code library 214 is maintained in a memory structure such a real-time data store; e.g., memory that is accessible by the state machine 210 with low latency at execution time. As shown in FIG. 2 by the dotted connections between states and state logic, each state of the state machine 210 has its own associated state logic. The state logic can include task logic (e.g., programming code) executable by the agent to cause the agent 202 to perform a portion of the task associated with the agent 202 (e.g., executing a search, retrieving data from memory, generating embeddings, etc.).

The state logic can also or alternatively include state transition logic executable by the agent to determine whether and when to move from the current state to a different state, or from the current agent to a different agent. State transition logic can determine whether to transition from one state to another state, or from one agent to a different agent, by, for example, comparing input to threshold values or criteria or by applying one or more operations to input and comparing output of the one or more operations to threshold values or criteria.

In the example of FIG. 2, state prompts are stored in a prompt library 212. The prompt library 212 is maintained in a memory structure such a real-time data store; e.g., memory that is accessible by the state machine 210 with low latency at execution time. As shown in FIG. 2 by the dash-dot-dot connections between states and prompts, each state of the state machine 210 has its own associated state prompt. The state prompt includes one or more instructions that can be input to a machine learning model to cause the machine learning model to perform a portion of the task associated with the agent 202. For example, a state prompt can be configured as a COTRO prompt configured to cause a machine learning model to generate output using the in-prompt hallucination management approach described.

In the example of FIG. 2, machine learning models are accessible to the agent 202 via one or more AI services 226. AI services 226 can be implemented, for example, as a local model store or a cloud-based model library. The AI services 226 can include one or more different types of machine learning models, e.g., one or more different types of generative models, one or more types of discriminative models, etc. For example, one or more of the machine learning models can be general purpose large language models while one or more others of the machine learning models can be smaller language models or classifiers that are fine tuned for a specific portion of the task (e.g., entity extraction, output summarization, hallucination classification, etc.).

Each prompt is configured for its associated machine learning model. For example, if the portion of the agent's task (e.g., a first sub-task) performed at state 1 involves the use of a first type of large language model, the associated state 1 prompt is configured for input to that first type of large language model (e.g., an LLM that does not have reasoning capabilities). If the portion of the agent's task (e.g., a second sub-task) performed at state 2 involves the use of a second type of large language model (e.g., an LLM that does have reasoning capabilities), the associated state 2 prompt is configured for input to that second type of large language model.

Thus, as shown in FIG. 2, prompts and state logic can be customized according to the requirements of their associated states of the state machine 210. Also or alternatively, the respective machine learning models can be selected and/or customized according to the requirements of their associated states of the state machine 210.

The examples shown in FIG. 2 and the accompanying description, above are provided for illustration purposes. This disclosure is not limited to the described examples. Additional or alternative details and implementations are described herein.

Figure 3:
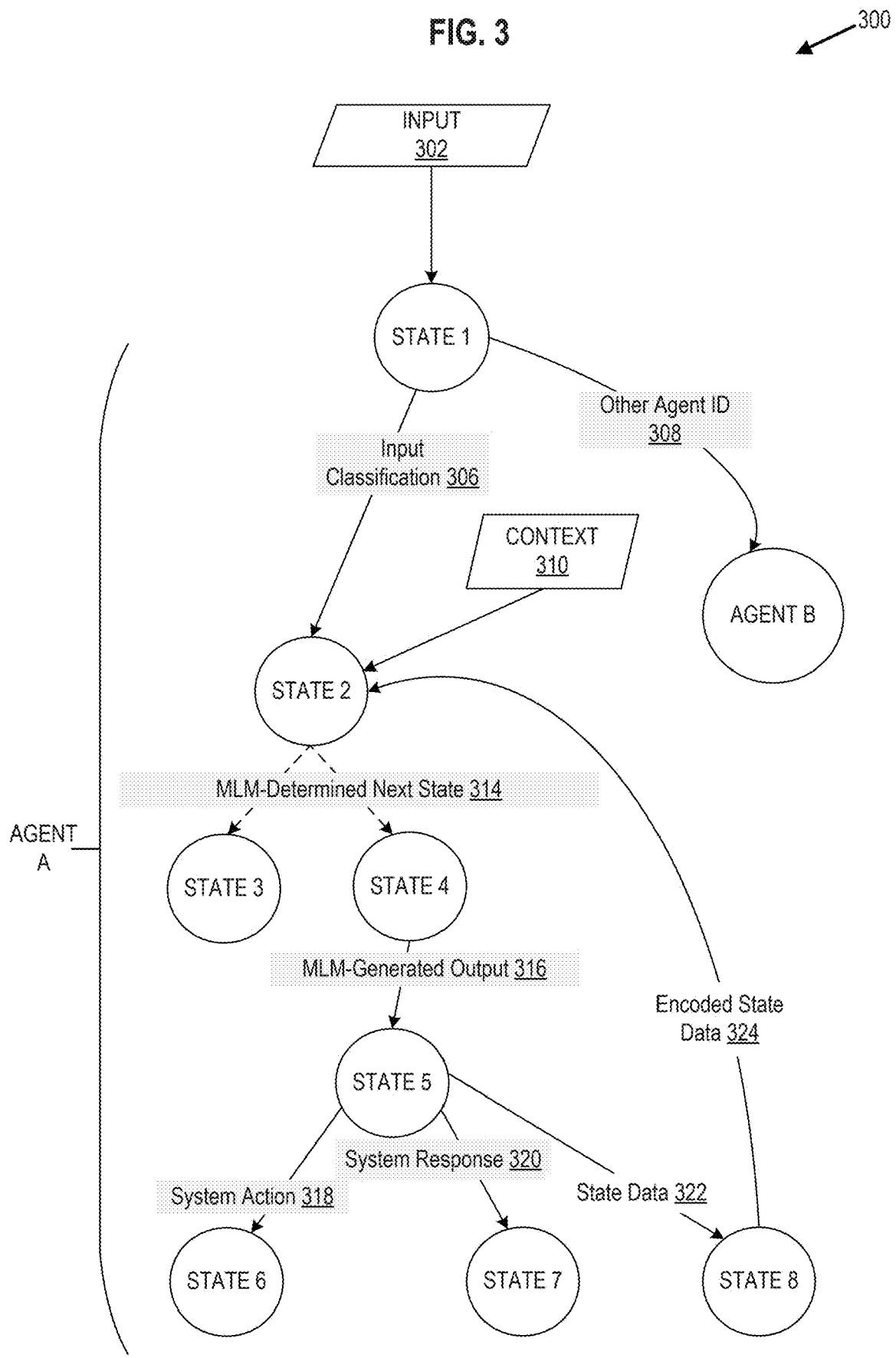
FIG. 3 is a flow diagram of an example state machine for an agent in accordance with some embodiments of the present disclosure.

FIG. 3 is a flow diagram of an example state machine for an agent in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of distributed multi-agent system 105, including, in some embodiments, components or flows shown in FIG. 3 that may not be specifically shown in other figures and/or including, in some embodiments, components or flows shown in other figures that may not be specifically shown in FIG. 3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 3, the method 300 represents a dialog or user interface navigation flow designed to cause an agent A to perform a task assigned to the agent (e.g., search, assessment, etc.) in response to input using a state machine associated with the agent A (e.g., a state machine 210). At state 1, input 302 is received. Input 302 can include, for example, a login signal, a user selection of a user interface element, and/or user-provided or user-selected digital content (e.g., unstructured natural language text, digital imagery, or multimodal content).

Using a state machine architecture such as described with reference to FIG. 2, state 1 applies a machine learning model to input 302 to generate an input classification 306. The machine learning model used by state 1 can be, for example, a classification model or a large language model configured to perform a classification task (e.g., an LLM that does not have reasoning capabilities). State 1 executes transition logic to determine whether to proceed to state 2 of agent A or transition to a different agent, e.g., agent B. For example, if the input classification 306 matches a criterion, category or type that is related to the task that agent A is configured to perform, the state 1 transition logic initiates a transition to state 2 of agent A and passes the input classification 306 to state 2. If the input classification 306 does not match a criterion, category, or type related to the agent A task, the state 1 transition logic identifies an agent that matches the input classification 306 and initiates a transition to that agent, e.g., agent B.

State 2 applies a machine learning model to the input classification 306 and context 310. Context 310 can include, for example, output generated at N most recent previous states, where N is a positive integer, input received from the user at N most recent previous states, and/or information retrieved from one or more data sources, such as a database of user profiles, a database of job postings, a log of user interactions with an agent or online system, etc.

The machine learning model used by state 2 can be the same machine learning model as used by state 1 or a different machine learning model. For example, the machine learning model used by state 2 can be a large language model that has reasoning capabilities that enable the COTRO prompting technique to be used to manage hallucination during response generation.

In the example of FIG. 3, state 2 generates and outputs one or more machine learning model-determined next states 314. For example, using a machine learning model, state 2 combines the input classification 306 with the context 310 and estimates the similarity between the combination of the input 302 and context 310, on the one hand, and a plurality of potential next states (e.g., state 3 and state 4). If state 2 determines for example, that a matching score representing a comparison of the input 302 and context 310 to state 3 is higher than a matching score representing a comparison of the input 302 and context 310 to state 4, state 2 transition logic initiates a transition to state 3.

If state 2 determines for example, that a matching score representing a comparison of the input 302 and context 310 to state 4 is higher than a matching score representing a comparison of the input 302 and context 310 to state 4, state 2 transition logic initiates a transition to state 4. If a difference between the matching scores for state 3 and state 4 is smaller than a threshold difference amount or criteria, state 2 can generate and output selectable options representing the functionality of state 3 and state 4, respectively, and request a user selection of one of the selectable options.

In the example of FIG. 3, state 2 initiates a transition to state 4 of agent A. State 4 uses a machine learning model to generate machine learning model (MLM)-generated output 316. The machine learning model used at state 4 can be the same or different as the model(s) used at state 1 and/or state 2. For example, state 4 applies an LLM to a COTRO prompt to cause the LLM to produce the MLM-generated output 316. The MLM-generated output 316 can include, for example, a response to the input 302, e.g., a summary of search results, a narrative description of a job assessment, or a conversational dialog turn. Using the COTRO prompt at state 4 can help manage hallucination in the MLM-generated output 316 without the need for a separate evaluation model or human in the loop feedback process.

In the example of FIG. 3, the completion of the MLM-generated output 316 at state 4 triggers the state 4 transition logic to initiate a transition to state 5. State 5 applies a machine learning model, and/or one or more other tools, to the MLM-generated output 316 to produce one or more of a system action 318 or a system response 320. For example, state 5 can initiate a system action 318 such as calling a query system to execute a query to complete a job search or calling an entity matching system to generate a matching score representing a similarity between the MLM-generated output 316 and one or more other digital content. State 6 can return one or more results of the system action 318 to state 5.

In response to receiving the one or more results of the system action 318, state 5 can initiate a transition to state 7. State 7 applies a machine learning model to the MLM-generated output 316 and the results of the system action 318 to produce a system response 320. Any machine learning model used at states 5, 6, and 7 can be the same or different as the model(s) used at any other states. For example, state 7 can apply an LLM to a COTRO prompt to cause the LLM to produce the system response 320. The system response 320 can include, for example, a combination of a response to the input 302 and one or more predicted next actions. For example, the system response 320 can include a list of search results and one or more selectable options, where the content of each selectable option includes MLM-generated content that is generated by a machine learning module using the input classification 306 and context 310.

In some embodiments, the one or more selectable options are customized and generated dynamically based on the user's current input classification 306, context 310, and current state. In other words, the selectable options are not pre-created or standardized user interface elements but rather are generated dynamically based on the user's current input classification 306, context 310, and current state. Using the COTRO prompt approach at state 7 can help manage hallucination in the system response 320 without the need for a separate evaluation model or human in the loop feedback process.

In the example of FIG. 3, the completion of the system response 320 at state 7 triggers the state 5 transition logic to initiate a transition to state 8. The state 5 transition logic passes state data 322 to state 8. State data 322 contains an identifier or flag value that indicates that the agent A state machine has completed. State data 322 also includes or references data received or generated during execution of the agent A state machine, such as input 302, context 310, input classification 306, MLM-determined next state 314, MLM-generated output 316, one or more results of system action 318, and/or system response 320.

State 8 encodes the state data 322. For example, state 8 invokes a machine learning model or tool to generate an encoded or compressed representation of state data 322 (e.g., a vector or embedding), which state 8 returns as encoded state data 324 to state 2 and/or stores in a data store, e.g., a vector store, that is accessible to state 2. State 2 uses the encoded state data 324 to determine the next state as described with reference to state 2. In this way, the state machine enables agent A to retain and maintain information collected, machine-learned, and output during previous and subsequent iterations of the state machine, which can further help manage hallucination. For instance, the encoded state data 324 can be included along with the context 310 and input classification 306 in subsequent next state determinations by the state 2 machine learning model.

The examples shown in FIG. 3 and the accompanying description, above are provided for illustration purposes. This disclosure is not limited to the described examples. Additional or alternative details and implementations are described herein.

FIG. 4A1, FIG. 4A2, FIG. 4A3 is a screen capture of an example user interface for a conversational agent in accordance with some embodiments of the present disclosure.

In the user interface elements shown in FIG. 4A1, FIG. 4A2, FIG. 4A3, certain data that would normally be displayed may be anonymized for the purpose of this disclosure. In a live example, the actual data and not the anonymized version of the data would be displayed. For instance, the text "CompanyName" would be replaced with a name of an actual company and "FirstName LastName" would be replaced with a user's actual name.

The user interface elements shown in FIG. 4A1, FIG. 4A2, FIG. 4A3 are presented to a user by an application system, such as a conversational agent. In some implementations, portions of the user interface elements are implemented as one or more web pages that are stored, e.g., at a user device, a server or in a cache of a user device, and then loaded into a display of a user device via the user device sending a page load request to the server or fetching data from the cache.

The graphical user interface control elements (e.g., fields, boxes, buttons, etc.) shown in the screen captures are implemented via software used to construct the user interface screens. While the screen captures illustrate examples of user interface components, e.g., visual displays, buttons, input boxes, etc., this disclosure is not limited to the illustrated embodiments, or to visual displays, or to graphical user interfaces.

In FIG. 4A1, FIG. 4A2, FIG. 4A3, a user interface 400 of an application system includes input boxes 402, 404 and a search execution option 407. The input boxes 402, 406 can prompt the user to input structured search term such as job title, skill, company name, or geographic location. Once the user has input one or more structured search terms via one or more of the input boxes 402, 406, the user can select the search execution option 407 to cause the application system to execute a search query on, e.g., one or more databases or other corpus of digital content.

In the example of FIG. 4A1, FIG. 4A2, FIG. 4A3, the application system has generated and presented via the user interface 400 a scrollable list of suggested job postings 406. For example, the application system executed a search query entered by the user or proactively generated the list 406 based on, e.g., aspects of the user's online profile and/or previous search history.

In the example of FIG. 4A1, FIG. 4A2, FIG. 4A3, one of the job postings in the list 406 is presented in more detail in panel 410. The panel 410 also includes machine learning model (MLM)-generated selectable options 416, 418, an apply option 412 and a save option 414. The apply option 412 and the save option 414 are static options in that the content of the selectable options 412, 414 is fixed (e.g., the apply option 412 always presents the word "Apply" and the save option 414 always presents the word "Save" as part of the selectable option, irrespective of the user, the user input, state history, or context).

In contrast, the content presented in connection with the MLM-generated options 416 (e.g., "Am I a good fit for this job?"), 418 is generated dynamically by a machine learning model using, e.g., current application state data, user input, interaction history, user profile data, and the COTRO-based content generation techniques described herein. For instance, the application system or a navigation agent of the application system detects a user selection of the Principal Product Manager job posting in the listing 406. The application system or navigation agent passes the user selection of that job posting, the current application state data (e.g., detailed job posting view), and context data if available to a COTRO prompt generator. The COTRO prompt generator generates and outputs a COTRO prompt for navigation option generation using approaches described, e.g., with reference to FIG. 1A and FIG. 1B. The application system or navigation agent passes the COTRO prompt to a machine learning model, and the machine learning model generates and outputs the selectable options 416, 418 as described, e.g., with reference to FIG. 1C and FIG. 1D. As a result, the content of the MLM-generated options 416, 418 changes in response to changes in the user input, application state, and/or context. Because the context is one of the inputs to the content generation prompt, the MLM-generated options 416, 418 can be customized according to user preferences such as language, style and tone.

The user interface 400 also includes a conversational agent panel 420. The conversational agent panel 420 provides a conversational dialog-based format for interacting with the application system, which does not require the user to input structured search terms. In the example of FIG. 4A1, FIG. 4A2, FIG. 4A3, the user has input a conversational natural language (i.e., unstructured) request 422 ("Am I a good fit for this job?") or the user has selected the selectable option 416 and in response to the user's selection of the option 416, the application system has opened the conversational agent panel 420 and presented the request 422. In response to the request 422, the conversational agent initiates a job analysis process using a state machine as described, e.g., with reference to FIG. 2 and FIG. 3. For instance, the conversational agent or a state thereof formulates a COTRO prompt for job assessment generation using the request 422, the current application state (e.g., conversational agent panel 420 is open), context data, and the techniques described herein, and passes the COTRO prompt for job assessment generation to a machine learning model. The machine learning model processes the COTRO prompt for job assessment generation and outputs the job analysis 424. The MLM-generated job analysis includes highlighted portions 426, 428, 430. Highlighted portion 426 includes a machine learning model-generated summary of or conclusion regarding the extent to which the user's online profile matches the job description. Highlighted portions 428 and 430 indicate machine learning model-generated reasoning supporting the MLM-generated job assessment conclusion presented via highlighted portion 426.

The examples shown in FIG. 4A1, FIG. 4A2, FIG. 4A3 and the accompanying description are provided for illustration purposes. For example, while the examples may be illustrated as user interface screens for a smaller form factor such as smart phones, tablet computers, or wearable devices, the user interfaces can be configured for other forms of electronic devices, such as desktop computers and/or laptop devices, or vice versa. This disclosure is not limited to the described examples. Additional or alternative details and implementations are described herein.

FIG. 4B1, FIG. 4B2 is a screen capture of an example user interface for a conversational agent in accordance with some embodiments of the present disclosure.

In the user interface elements shown in FIG. 4B1, FIG. 4B2, certain data that would normally be displayed may be anonymized for the purpose of this disclosure. In a live example, the actual data and not the anonymized version of the data would be displayed. For instance, the text "CompanyName" would be replaced with a name of an actual company and "FirstName LastName" would be replaced with a user's actual name.

The user interface elements shown in FIG. 4B1, FIG. 4B2 are presented to a user by an application system, such as a conversational agent. In some implementations, portions of the user interface elements are implemented as one or more web pages that are stored, e.g., at a user device, a server or in a cache of a user device, and then loaded into a display of a user device via the user device sending a page load request to the server or fetching data from the cache.

The graphical user interface control elements (e.g., fields, boxes, buttons, etc.) shown in the screen captures are implemented via software used to construct the user interface screens. While the screen captures illustrate examples of user interface components, e.g., visual displays, buttons, input boxes, etc., this disclosure is not limited to the illustrated embodiments, or to visual displays, or to graphical user interfaces.

In FIG. 4B1, FIG. 4B2, a user interface 440 is a continuation of the user interface 400 described with reference to FIG. 4A1, FIG. 4A2, FIG. 4A3. In the user interface 440, a conversational agent panel 442 is a continuation of the conversational agent panel 420, described with reference to FIG. 4A1, FIG. 4A2, FIG. 4A3. For example, the conversational agent panels 442 contains digital content that is presented when the user scrolls the conversational agent panel 420.

Conversational panel 442 contains MLM-generated selectable options 446, 448, 450. The content presented in connection with each of the MLM-generated options 446, 448, 450 is generated dynamically by a machine learning model using, e.g., current application state data, user input, interaction history, user profile data, and the COTRO-based content generation techniques described herein. For instance, the application system or a navigation agent of the application system detects that the user has viewed the job analysis 424. The application system or navigation agent passes the information about the user's content viewing history, the current application state data (e.g., job analysis view, scrolling action), and context data if available to a COTRO prompt generator. The COTRO prompt generator generates and outputs a COTRO prompt for navigation option generation using approaches described, e.g., with reference to FIG. 1A and FIG. 1B. The application system or navigation agent passes the COTRO prompt to a machine learning model, and the machine learning model generates and outputs the selectable options 446, 448, 450 as described, e.g., with reference to FIG. 1C and FIG. 1D. As a result, the content of the MLM-generated options 446, 448, 450 changes in response to changes in the user input, dialog history, application state, and/or context. Because the context is one of the inputs to the content generation prompt, the MLM-generated options 416 can be customized according to user preferences such as language, style and tone.

Selectable option 446 includes MLM-generated conversational natural language, unstructured content, e.g., "How can I highlight my experience with strategy and operations to align with this job's requirements?" In generating selectable option 446, the application system or agent has included information from the user's online profile (e.g., experience with strategy and operations) and/or online activity (e.g., posts the user has made that talk about strategy and operations) as input to the machine learning model with the COTRO prompt.

Selectable option 448 includes MLM-generated conversational natural language, unstructured content, e.g., "Could my global collaboration experience be an asset for this role at the Company?" In generating selectable option 448, the application system or agent has included information from the user's online profile (e.g., collaboration experience) and/or online activity (e.g., posts the user has made that talk about collaboration) and/or connections network (e.g., statistics, distributions, or aggregate information about the user's connections network that indicate the user has at least a threshold number of first-degree collaborative connections) as input to the machine learning model, along with the COTRO prompt.

Selectable option 450 includes MLM-generated conversational natural language, unstructured content, e.g., "What additional skills or certifications could I pursue to strengthen my application for this position?" In generating selectable option 450, the application system or agent has invoked a matching system to determine that information contained in the job posting is missing from the user's online profile, online activity, and/or connections network and included this information about the gap between the user's information and the job posting as input to the machine learning model, along with the COTRO prompt.

Each of the MLM-generated options 446, 448, 450 is capable of being selected by the user. Selection of an MLM-generated option 446, 448, 450 initiates a state transition to a subsequent state of the conversational agent or to a different agent, for example as described with reference to FIG. 2 and FIG. 3.

The examples shown in FIG. 4B1, FIG. 4B2 and the accompanying description are provided for illustration purposes. For example, while the examples may be illustrated as user interface screens for a smaller form factor such as smart phones, tablet computers, or wearable devices, the user interfaces can be configured for other forms of electronic devices, such as desktop computers and/or laptop devices, or vice versa. This disclosure is not limited to the described examples. Additional or alternative details and implementations are described herein.

FIG. 5A1, FIG. 5A2, FIG. 5A3 is a screen capture of an example user interface for a conversational agent in accordance with some embodiments of the present disclosure.

In the user interface elements shown in FIG. 5A1, FIG. 5A2, FIG. 5A3, certain data that would normally be displayed may be anonymized for the purpose of this disclosure. In a live example, the actual data and not the anonymized version of the data would be displayed. For instance, the text "CompanyName" would be replaced with a name of an actual company and "FirstName LastName" would be replaced with a user's actual name.

The user interface elements shown in FIG. 5A1, FIG. 5A2, FIG. 5A3 are presented to a user by an application system, such as a conversational agent. In some implementations, portions of the user interface elements are implemented as one or more web pages that are stored, e.g., at a user device, a server or in a cache of a user device, and then loaded into a display of a user device via the user device sending a page load request to the server or fetching data from the cache.

The graphical user interface control elements (e.g., fields, boxes, buttons, etc.) shown in the screen captures are implemented via software used to construct the user interface screens. While the screen captures illustrate examples of user interface components, e.g., visual displays, buttons, input boxes, etc., this disclosure is not limited to the illustrated embodiments, or to visual displays, or to graphical user interfaces.

In FIG. 5A1, FIG. 5A2, FIG. 5A3, a user interface 500 of an application system includes a search input box 502 and a job post selectable option 506. The user interface element 502 can prompt the user to input structured search term such as job title, skill, company name, or geographic location. Once the user has input one or more structured search terms via one or more of the input boxes 402, 406, the application system can execute a search query on, e.g., one or more databases or other corpus of digital content.

The job post selectable option 506 is a static option in that the content of the selectable option 506 is fixed (e.g., the job post selectable option 506 always presents the text "Post a free job" regardless of the user, the user input, state history, or context).

In the example of FIG. 5A1, FIG. 5A2, FIG. 5A3, the application system has generated and presented via the user interface 500 scrollable lists of suggested job postings 508, 510. For example, the application system has proactively executed search queries that the application system has formulated using a machine learning model, one or more COTRO prompts, and information about the user, such as aspects of the user's online profile and/or previous search history. The lists of suggested job postings 508, 510 are grouped by criteria. For example, the list 508 includes search results returned by a query including search terms extracted from the user's profile and sorted by relevance while the list 510 highlights search results that have a social connection to the user.

In the example of FIG. 5A1, FIG. 5A2, FIG. 5A3, the user interface 500 also includes a conversational agent panel 512. The conversational agent panel 512 provides a conversational dialog-based format for interacting with the application system, which does not require the user to input structured search terms. In the example of FIG. 5A1, FIG. 5A2, FIG. 5A3, the user is invited to ask a question in a natural language format or select an option. The user has input a conversational natural language (i.e., unstructured) request 516 ("Find some jobs in SF").

In response to the request 516, the conversational agent initiates a job search process using a state machine as described, e.g., with reference to FIG. 2 and FIG. 3. For instance, the conversational agent or a state thereof formulates a COTRO prompt for job search using the request 516, the current application state (e.g., conversational agent panel 512 is open and the first dialog turn includes search terms input by the user), context data, and the techniques described herein, and passes the COTRO prompt for job search to a machine learning model.

Because conversational, natural language, unstructured queries such as the request 516 can contain ambiguities, embodiments of the conversational agent incorporate a query disambiguation technique into the job search process. Embodiments perform the job search by performing query disambiguation and then executing the job search on the disambiguated query.

For example, embodiments of the conversational agent include a first state that formulates a first COTRO prompt for query disambiguation and a second state that invokes a query system to execute the disambiguated query. In the first state, the conversational agent uses the request 516, the current application state (e.g., conversational agent panel 512 is open and the first dialog turn includes search terms input by the user), context data, one or more instructions to disambiguate the request using a disambiguation scheme or rubric, and the techniques described herein, to formulate the first COTRO prompt for query disambiguation.

The query disambiguation scheme or rubric is used to instruct the machine learning model to prioritize, rank, or order potential sources of information that can be used for query disambiguation. The order of precedence of information sources can be defined statically (e.g., pre-determined and stored in memory) or dynamically (e.g., determined at execution time by the machine learning model using context data). An example of a query disambiguation scheme or rubric is shown in Table 1.

TABLE 1

Example of Query Disambiguation Scheme.

| Rank/Order/Priority | Disambiguation Source |
| --- | --- |
| 1 | User's most recent request |
| 2 | User's most recent dialog history with conversational agent (e.g., last N turns) |
| 3 | User's most recent interaction history with application system (e.g., last N interactions) |
| 4 | User's online profile |

In the example of Table 1, in the first column, a lower number indicates a higher priority for the associated disambiguation source. For example, using the disambiguation scheme of Table 1, a machine learning model may generate a first query to search the user's most recent request, a second query to search the user's most recent dialog history with the conversational agent, a third query to search the user's most recent interaction history with the application system (e.g., aspects of the online system other than the conversational agent) a fourth query to search the user's online profile, and then weight each of the first, second, third, and fourth queries according to the order of priority.

For instance, the disambiguation scheme can cause the machine learning model to weight disambiguation information retrieved via the first query higher than disambiguation information retrieved via the second query, weight the disambiguation information retrieved via the second query higher than the disambiguation information retrieved via the third query but lower than the disambiguation information retrieved via the first query, weight the disambiguation information retrieved via the third query higher than the disambiguation information retrieved via the fourth query but lower than the disambiguation information retrieved via the first and second queries, and weight the disambiguation information retrieved via the fourth query lower than the disambiguation information retrieved via the first, second, and third queries.

The machine learning model can then use the weightings to organize and formulate the disambiguated query (not shown to the user) in accordance with those weightings before the query is executed. For example, based on the weightings, the machine learning model can formulate the disambiguated to include information retrieved via the user's most recent request but not include information retrieved via the user's interaction history with the application system. As another example, if a query retrieves no disambiguation information or too much disambiguation information, the machine learning model can disregard those results and instead use disambiguation results obtained via one or more of the other sources of disambiguation information.

The disambiguation scheme can be passed to the machine learning model with or as part of the query disambiguation prompt. The machine learning model processes the COTRO prompt for query disambiguation and generates an executable search query. For example, the machine learning model generates a disambiguated executable search query that includes search terms from the user's recent search result viewing history, such as "Principal Product Manager" and expands "SF" to "San Francisco Bay Area" based on the user's online profile.

After execution of the MLM-generated disambiguated search query, the job search results 522 are presented along with an MLM-generated result summary 514. The MLM-generated result summary 514 includes highlighted portions

518 (Principal Product Manager job title) and 520 (geographic location is San Francisco Bay Area). These highlighted portions 518, 520 indicate to the user how the user's request 516 has been interpreted and disambiguated by the machine learning model to produce the search results 522.

The examples shown in FIG. 5A1, FIG. 5A2, FIG. 5A3 and the accompanying description are provided for illustration purposes. For example, while the examples may be illustrated as user interface screens for a smaller form factor such as smart phones, tablet computers, or wearable devices, the user interfaces can be configured for other forms of electronic devices, such as desktop computers and/or laptop devices, or vice versa. This disclosure is not limited to the described examples. Additional or alternative details and implementations are described herein.

FIG. 5B1, FIG. 5B2, FIG. 5B3 is a screen capture of an example user interface for a conversational agent in accordance with some embodiments of the present disclosure.

In the user interface elements shown in FIG. 5B1, FIG. 5B2, FIG. 5B3, certain data that would normally be displayed may be anonymized for the purpose of this disclosure. In a live example, the actual data and not the anonymized version of the data would be displayed. For instance, the text "CompanyName" would be replaced with a name of an actual company and "FirstName LastName" would be replaced with a user's actual name.

The user interface elements shown in FIG. 5B1, FIG. 5B2, FIG. 5B3 are presented to a user by an application system, such as a conversational agent. In some implementations, portions of the user interface elements are implemented as one or more web pages that are stored, e.g., at a user device, a server or in a cache of a user device, and then loaded into a display of a user device via the user device sending a page load request to the server or fetching data from the cache.

The graphical user interface control elements (e.g., fields, boxes, buttons, etc.) shown in the screen captures are implemented via software used to construct the user interface screens. While the screen captures illustrate examples of user interface components, e.g., visual displays, buttons, input boxes, etc., this disclosure is not limited to the illustrated embodiments, or to visual displays, or to graphical user interfaces.

In FIG. 5B1, FIG. 5B2, FIG. 5B3, a user interface 530 is a continuation of the user interface 500 described with reference to FIG. 5A1, FIG. 5A2, FIG. 5A3. In the user interface 530, a conversational agent panel 534 is a continuation of the conversational agent panel 512, described with reference to FIG. 5A1, FIG. 5A2, FIG. 5A3. For example, the conversational agent panel 534 contains digital content that is presented when the user scrolls the conversational agent panel 512.

Conversational agent panel 534 contains selectable feedback options 536 by which the user can provide feedback, e.g., feedback on the search results provided in response to the request 516. In the conversational agent panel 534, the user has input a conversational natural language (i.e., unstructured) request 538 ("Can you find designer jobs in Seattle that make 100$k$ plus?").

In response to the request 538, the conversational agent initiates a job search process using a state machine as described, e.g., with reference to FIG. 2 and FIG. 3. For instance, the conversational agent or a state thereof formulates a COTRO prompt for job search using the request 538, the current application state (e.g., conversational agent panel 534 is open, there is one previous dialog turn, and the second dialog turn includes new search terms input by the user), context data, and the techniques described herein, and passes the COTRO prompt for job search to a machine learning model.

For instance, the conversational agent passes the request 538, the current application state data, state history (e.g., the previous request 516), and context data (potentially including a disambiguation scheme such as the example shown in Table 1) to a COTRO query disambiguation prompt generator. The COTRO query disambiguation prompt generator generates and outputs a COTRO prompt for query disambiguation using approaches described, e.g., with reference to FIG. 1A and FIG. 1B. The conversational agent passes the COTRO query disambiguation prompt to a machine learning model, and the machine learning model generates and outputs a disambiguated executable query as described, e.g., with reference to FIG. 1C and FIG. 1D. For example, using the query disambiguation scheme, the machine learning model prioritizes the location information provided in the current request 538 over the location information in the request 516 but also prioritizes the application context information from the previous round of dialog (e.g., product designer) over the more general/ambiguous search term "designer" in the current request 538.

After execution of the MLM-generated disambiguated search query, the job search results summary 539 are presented via the conversational agent panel 534. The MLM-generated results summary 539 includes highlighted portions 535 (designer) and 537 (geographic location is Seattle, Washington, United States). These highlighted portions 535, 537 indicate to the user how the user's request 538 has been interpreted and disambiguated by the machine learning model to produce the result summary 539.

The examples shown in FIG. 5B1, FIG. 5B2, FIG. 5B3 and the accompanying description are provided for illustration purposes. For example, while the examples may be illustrated as user interface screens for a smaller form factor such as smart phones, tablet computers, or wearable devices, the user interfaces can be configured for other forms of electronic devices, such as desktop computers and/or laptop devices, or vice versa. This disclosure is not limited to the described examples. Additional or alternative details and implementations are described herein.

FIG. 5C1, FIG. 5C2, FIG. 5C3 is a screen capture of an example user interface for a conversational agent in accordance with some embodiments of the present disclosure.

In the user interface elements shown in FIG. 5C1, FIG. 5C2, FIG. 5C3, certain data that would normally be displayed may be anonymized for the purpose of this disclosure. In a live example, the actual data and not the anonymized version of the data would be displayed. For instance, the text "CompanyName" would be replaced with a name of an actual company and "FirstName LastName" would be replaced with a user's actual name.

The user interface elements shown in FIG. 5C1, FIG. 5C2, FIG. 5C3 are presented to a user by an application system, such as a conversational agent. In some implementations, portions of the user interface elements are implemented as one or more web pages that are stored, e.g., at a user device, a server or in a cache of a user device, and then loaded into a display of a user device via the user device sending a page load request to the server or fetching data from the cache.

The graphical user interface control elements (e.g., fields, boxes, buttons, etc.) shown in the screen captures are implemented via software used to construct the user interface screens. While the screen captures illustrate examples of user interface components, e.g., visual displays, buttons, input boxes, etc., this disclosure is not limited to the illustrated embodiments, or to visual displays, or to graphical user interfaces.

In FIG. 5C1, FIG. 5C2, FIG. 5C3, a user interface 540 is a continuation of the user interface 530 described with reference to FIG. 5B1, FIG. 5B2, FIG. 5B3. In the user interface 540, a conversational agent panel 542 is a continuation of the conversational agent panel 534, described with reference to FIG. 5B1, FIG. 5B2, FIG. 5B3. For example, the conversational agent panel 543 contains digital content that is presented when the user scrolls the conversational agent panel 534.

Conversational agent panel 542 presents a search result 544 and contains selectable feedback options 546 by which the user can provide feedback, e.g., feedback on the search results provided in response to the request 548. In the conversational agent panel 542, the user has input a conversational natural language (i.e., unstructured) request 548 ("How about remote jobs in Boston?").

In response to the request 548, the conversational agent initiates a job search process using a state machine as described, e.g., with reference to FIG. 2 and FIG. 3. For instance, the conversational agent or a state thereof formulates a COTRO prompt for job search using the request 548, the current application state (e.g., conversational agent panel 542 is open, there are two previous dialog turns, and the third dialog turn includes new search terms input by the user), context data, and the techniques described herein, and passes the COTRO prompt for job search to a machine learning model.

For instance, the conversational agent passes the request 548, the current application state data, state history (e.g., the previous request 538), and context data (potentially including a disambiguation scheme such as the example shown in Table 1) to a COTRO query disambiguation prompt generator. The COTRO query disambiguation prompt generator generates and outputs a COTRO prompt for query disambiguation using approaches described, e.g., with reference to FIG. 1A and FIG. 1B.

The conversational agent passes the COTRO query disambiguation prompt to a machine learning model, and the machine learning model generates and outputs a disambiguated executable query as described, e.g., with reference to FIG. 1C and FIG. 1D. For example, using the query disambiguation scheme, the machine learning model prioritizes the location information provided in the current request 548 over the location information in the requests 516 and 538, but also prioritizes the application context information from the previous rounds of dialog (e.g., product designer) over the more general/ambiguous search term "jobs" in the current request 548 and interprets the term "remote" of the current request 548 as a workplace type.

After execution of the MLM-generated disambiguated search query, the job search results summary 554 are presented via the conversational agent panel 542. The MLM-generated results summary 554 includes highlighted portions 550 (designer) and 552 (geographic location is Boston). These highlighted portions 550, 552 indicate to the user how the user's request 548 has been interpreted and disambiguated by the machine learning model to produce the result summary 554.

The examples shown in FIG. 5C1, FIG. 5C2, FIG. 5C3 and the accompanying description are provided for illustration purposes. For example, while the examples may be illustrated as user interface screens for a smaller form factor such as smart phones, tablet computers, or wearable devices, the user interfaces can be configured for other forms of electronic devices, such as desktop computers and/or laptop devices, or vice versa. This disclosure is not limited to the described examples. Additional or alternative details and implementations are described herein.

The examples shown in FIG. 5C1, FIG. 5C2, FIG. 5C3 and the accompanying description are provided for illustration purposes. For example, while the examples may be illustrated as user interface screens for a smaller form factor such as smart phones, tablet computers, or wearable devices, the user interfaces can be configured for other forms of electronic devices, such as desktop computers and/or laptop devices, or vice versa. This disclosure is not limited to the described examples. Additional or alternative details and implementations are described herein.

FIG. 5D1, FIG. 5D2, FIG. 5D3 is a screen capture of an example user interface for a conversational agent in accordance with some embodiments of the present disclosure.

In the user interface elements shown in FIG. 5D1, FIG. 5D2, FIG. 5D3, certain data that would normally be displayed may be anonymized for the purpose of this disclosure. In a live example, the actual data and not the anonymized version of the data would be displayed. For instance, the text "CompanyName" would be replaced with a name of an actual company and "FirstName LastName" would be replaced with a user's actual name.

The user interface elements shown in FIG. 5D1, FIG. 5D2, FIG. 5D3 are presented to a user by an application system, such as a conversational agent. In some implementations, portions of the user interface elements are implemented as one or more web pages that are stored, e.g., at a user device, a server or in a cache of a user device, and then loaded into a display of a user device via the user device sending a page load request to the server or fetching data from the cache.

The graphical user interface control elements (e.g., fields, boxes, buttons, etc.) shown in the screen captures are implemented via software used to construct the user interface screens. While the screen captures illustrate examples of user interface components, e.g., visual displays, buttons, input boxes, etc., this disclosure is not limited to the illustrated embodiments, or to visual displays, or to graphical user interfaces.

In FIG. 5D1, FIG. 5D2, FIG. 5D3, a user interface 560 is a continuation of the user interface 540 described with reference to FIG. 5C1, FIG. 5C2, FIG. 5C3. In the user interface 560, a conversational agent panel 564 is a continuation of the conversational agent panel 642, described with reference to FIG. 5C1, FIG. 5C2, FIG. 5C3. For example, the conversational agent panel 564 contains digital content that is presented when the user scrolls the conversational agent panel 542.

In the conversational agent panel 564, the user has input a conversational natural language (i.e., unstructured) request 566 ("What jobs do you recommend that can meet my skills and experience?").

In response to the request 566, the conversational agent initiates a job search process using a state machine as described, e.g., with reference to FIG. 2 and FIG. 3. For instance, the conversational agent or a state thereof formulates a COTRO prompt for job search using the request 566, the current application state (e.g., conversational agent panel 564 is open, there are three previous dialog turns, and the fourth dialog turn includes new search terms input by the user), context data, and the techniques described herein, and passes the COTRO prompt for job search to a machine learning model.

For instance, the conversational agent passes the request 566, the current application state data, state history (e.g., the previous request 548), and context data (potentially including a disambiguation scheme such as the example shown in Table 1) to a COTRO query disambiguation prompt generator. The COTRO query disambiguation prompt generator generates and outputs a COTRO prompt for query disambiguation using approaches described, e.g., with reference to FIG. 1A and FIG. 1B.

The conversational agent passes the COTRO query disambiguation prompt to a machine learning model, and the machine learning model generates and outputs a disambiguated executable query as described, e.g., with reference to FIG. 1C and FIG. 1D. For example, using the query disambiguation scheme, the machine learning model prioritizes the skills and experience information contained in the user's online profile over the search criteria provided in the previous requests 548, 538, 516, and prioritizes the location information provided in the most recent previous request 548 over the location information in the requests 516 and 538.

After execution of the MLM-generated disambiguated search query, the job search results summary 568 are presented via the conversational agent panel 564. The MLM-generated results summary 568 includes highlighted portions (designer is the job title and geographic location is Boston, Massachusetts, United States). These highlighted portions indicate to the user how the user's request 566 has been interpreted and disambiguated by the machine learning model to produce the result summary 568. A search result 570 retrieved in response to the request 566 is also presented via conversational agent panel 564.

The examples shown in FIG. 5D1, FIG. 5D2, FIG. 5D3 and the accompanying description are provided for illustration purposes. For example, while the examples may be illustrated as user interface screens for a smaller form factor such as smart phones, tablet computers, or wearable devices, the user interfaces can be configured for other forms of electronic devices, such as desktop computers and/or laptop devices, or vice versa. This disclosure is not limited to the described examples. Additional or alternative details and implementations are described herein.

FIG. 6A is a flow diagram of an example method for generating digital content using a prompt in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of an application system, including, in some embodiments, components or flows shown in FIG. 6A that may not be specifically shown in other figures and/or including, in some embodiments, components or flows shown in other figures that may not be specifically shown in FIG. 6A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 6A, the example method 600 can be performed by an application system, e.g., by one or more agents, such as a conversational agent, search agent, assessment agent, or another type of agent.

At operation 602, a processing device determines first data associated with a use of an application system or agent. The first data can include user input, context data, current state data associated with an agent or state machine, dialog history of a conversational agent, user interaction history, etc. The processing device can determine the first data via, e.g., a user interface and/or a query system. For example, the first data can be obtained or determined using the approach described with reference to FIG. 1A.

At operation 604, the processing device provides a prompt to a first machine learning model. The prompt can be, for example, a navigation option generation prompt, a search prompt, an assessment prompt, a query disambiguation prompt, a content generation prompt, or another type of prompt. The first machine learning model can be implemented using, e.g., a pre-trained large language model, a fine-tuned language model, or another type of generative machine learning model.

The prompt includes at least one instruction. The at least one instruction is to cause the first machine learning model to use at least the first data to generate first output. The first output includes at least second data and reasoning. The at least one instruction can be configured using the COTRO approach described herein. For example, using chain of thought reasoning on the output as described herein, the second data is determined by the first machine learning model using the first data, and the reasoning includes an explanation of how the first machine learning model determined the second data. The second data includes preliminary output, e.g., machine learning model-generated output that is not presented to the user, such as a preliminary set of selectable options, a preliminary assessment narrative, preliminary search results, or a preliminary version of another type of machine learning model-generated output.

The at least one instruction can be configured to cause the first machine learning model to use the first output including the reasoning to generate a first version of a second output. For example, using the COTRO approach described herein, the first version of the second output is generated by applying the first machine learning model to input that includes the reasoning and the second data.

The first version of the second output is, for example, a hallucination-managed version of the second data that is produced using the COTRO approach. In some embodiments, the first version of the second output can be presented to the user, in which case operations 606 and 608 can be skipped. In other embodiments, the first machine learning model is used to further refine the first version of the second output, e.g., to customize the format, tone, or style of the first version of the second output according to the preferences of a user.

At operation 606, the processing device uses the first machine learning model to generate a second version of the second output. The second version of the second output includes, for example, a further refined the first version of the second output, e.g., to customize the format, tone, or style of the first version of the second output according to the preferences of a user. Alternatively or in addition, the second version of the second output includes one or more multi-modal elements (e.g., hyperlinks, digital images, video, audio, etc.) in combination with the first version of the second output.

At operation 606, the processing device provides the second version of the second output for presentation via the application system. For example, the processing device passes the second version of the second output produced via operation 606 to, e.g., a user interface of an application system, e.g., a conversational agent.

The examples shown in FIG. 6A and the accompanying description, above are provided for illustration purposes. This disclosure is not limited to the described examples. Additional or alternative details and implementations are described herein.

FIG. 6B is a flow diagram of an example method for generating digital content using a prompt in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of an application system, including, in some embodiments, components or flows shown in FIG. 6B that may not be specifically shown in other figures and/or including, in some embodiments, components or flows shown in other figures that may not be specifically shown in FIG. 6B. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 6B, the example method 620 can be performed by an application system, e.g., by one or more agents, such as a conversational agent, search agent, assessment agent, or another type of agent.

At operation 622, the processing device determines a first state of a conversational system. For example, operation 622 includes determining an intent classification as described with reference to FIG. 1D or determining an input classification as described with reference to FIG. 3. The first state determination performed via operation 622 can include identifying or selecting an agent from a group of available agents and/or selecting or identifying a state from a group of available states. The conversational system can be implemented, for example, using a conversational agent, e.g., a search agent, a navigation agent, an assessment agent, a content generation agent, or another type of agent.

At operation 624, the processing device provides a prompt associated with the first state to a first machine learning model. The prompt can be, for example, a navigation option generation prompt or an assessment prompt, or another type of prompt. The first machine learning model can be implemented using, e.g., a pre-trained large language model, a fine-tuned language model, or another type of generative machine learning model.

The prompt includes at least one instruction. The at least one instruction is to cause the first machine learning model to use at least the first state determined at operation 622 to generate first output. The first output includes at least one second state and reasoning. The at least one second date includes a machine learning model-determined second state, such as MLM-determined next state 314 described with reference to FIG. 3.

The at least one instruction can be configured using the COTRO approach described herein. For example, using chain of thought reasoning on the output as described herein, the second state is determined by the first machine learning model using the first state, and the reasoning includes an explanation of how the first machine learning model determined the second state. The second state includes preliminary output, e.g., machine learning model-generated output that is not presented to the user, such as a preliminary set of navigation options or a preliminary version of another type of machine learning model-generated output.

The at least one second state is selected or determined by the first machine learning model using the first state. The reasoning includes an explanation of how the first machine learning model selected or determined the at least one second state.

The at least one instruction can be configured to cause the first machine learning model to use the first output including the reasoning to generate second output. For example, using the COTRO approach described herein, the second output is generated by applying the first machine learning model to input that includes the reasoning and the at least one second state.

The second output is, for example, a hallucination-managed version of the second state that is produced using the COTRO approach. In some embodiments, the second output can be presented to the user. In other embodiments, the first machine learning model is used to further refine the second output, e.g., to customize the format, tone, or style of the first version of the second output according to the preferences of a user. Alternatively or in addition, the second version of the second output includes one or more multimodal elements (e.g., user interface elements, hyperlinks, digital images, video, audio, etc.) in combination with the first version of the second output.

At operation 626, the processing device receives the second output generated via operation 624 using the first machine learning model and the prompt. At operation 628, the processing device provides at least two options for presentation via the conversational system. The at least two options include digital content generated using the first machine learning model and the second output. Examples of MLM-generated options are described with reference to FIG. 4A1, FIG. 4A2, FIG. 4A3 and FIG. 4B1, FIG. 4B2. The processing device passes or otherwise makes the at least two options available for presentation via a user interface of an application system, e.g., a conversational agent.

In some implementations, the method 620 includes receiving a user selection of an option of the at least two options, and providing the user selection of the option to the first machine learning model. In some implementations, the method 620 includes receiving at least one user input via an agent of the conversational system, using a second machine learning model and the at least one user input, determining a user intent, and using the user intent and the first machine learning model to determine the at least one second state.

In some implementations, the method 620 includes receiving at least one user input via a first agent of the conversational system; using a second machine learning model and the at least one user input, determining a user intent; using the user intent, a decision tree, and the first machine learning model, determining that a second state selected by the first machine learning model is associated with a second agent of the conversational system; and initiating a transition from the first agent to the second agent. In some implementations, the method 620 includes receiving at least one user input via an agent of the conversational system; using a second machine learning model and the at least one user input, determining a user intent; using the user intent, a state graph associated with the agent, and the first machine learning model, determining that a second state selected by the first machine learning model is associated with the agent; and initiating a transition to the second state associated with the agent.

In some implementations, the first state comprises at least one input, at least one output, at least one operation capable of being performed by the first machine learning model using the at least one input, and at least one transition, wherein a transition identifies a second state of the conversational system. In some implementations, the method 620 include at least one of: the first state is associated with a user input received via a job search interface of the conversational system; the second output comprises a comparison of user credentials to job requirements; or the at least two options are generated using the comparison of user credentials to job requirements. In some implementations, a user input includes a selection of a first option associated with the first state, wherein the first option comprises natural language generated by the first machine learning model using at least the first state; and the at least two options are generated using the selection of the first option.

The examples shown in FIG. 6B and the accompanying description, above are provided for illustration purposes. This disclosure is not limited to the described examples. Additional or alternative details and implementations are described herein.

Figure 6C:
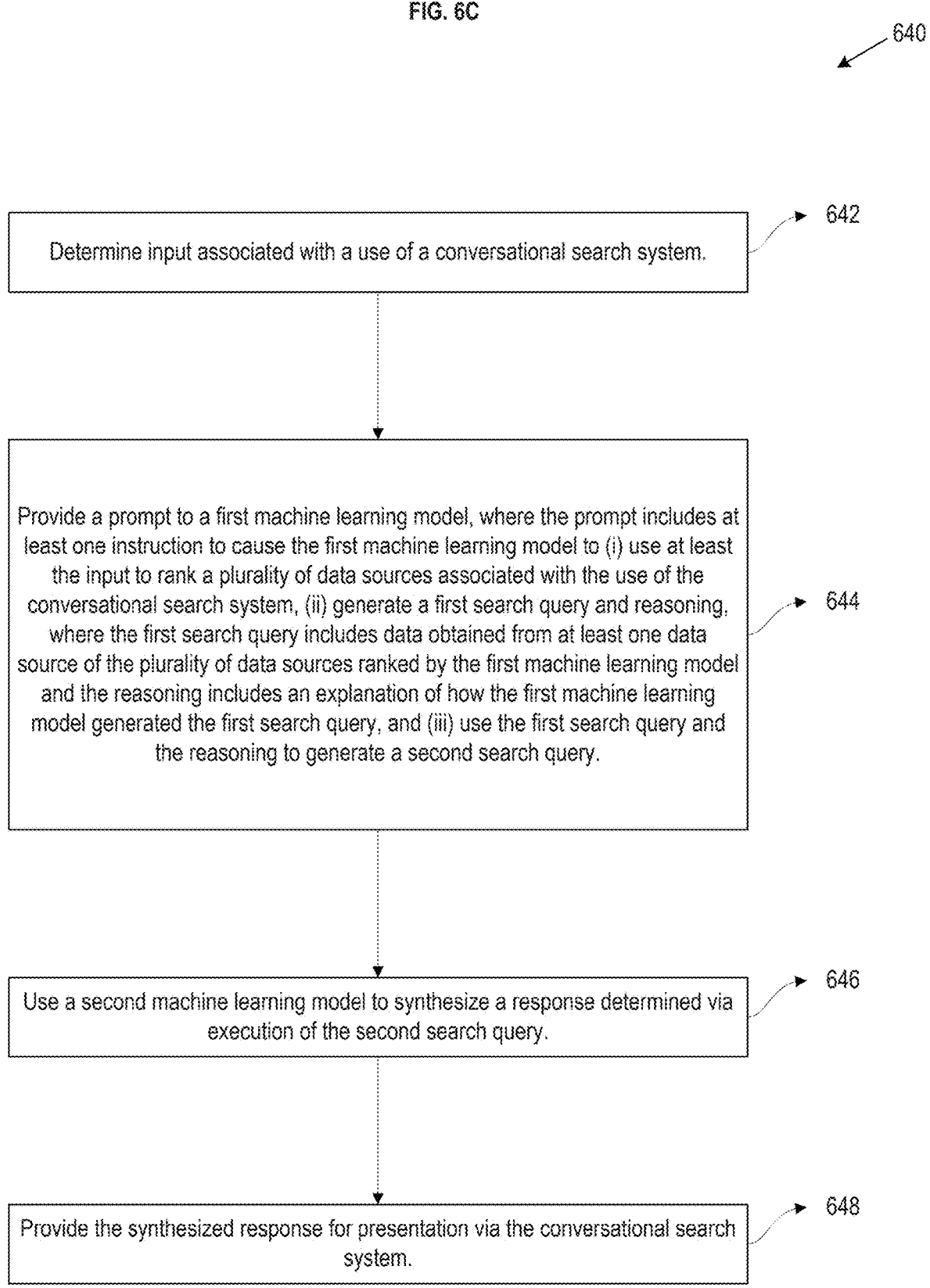
FIG. 6C is a flow diagram of an example method for generating digital content using a prompt in accordance with some embodiments of the present disclosure.

FIG. 6C is a flow diagram of an example method for generating digital content using a prompt in accordance with some embodiments of the present disclosure.

The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of an application system, including, in some embodiments, components or flows shown in FIG. 6C that may not be specifically shown in other figures and/or including, in some embodiments, components or flows shown in other figures that may not be specifically shown in FIG. 6C. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 6C, the example method 640 can be performed by an application system, e.g., by one or more agents, such as a conversational agent, search agent, assessment agent, or another type of agent.

At operation 642, the processing device determines input associated with a use of a conversational search system. The first input can include user input, such as one or more conversational natural language (e.g., unstructured) requests or queries, context data, current state data associated with an agent or state machine, dialog history of a conversational agent, user interaction history, etc. The processing device can determine the input via, e.g., a user interface and/or a query system. For example, the first data can be obtained or determined using the approaches described with reference to FIG. 1A.

At operation 644, the processing device provides a prompt to a first machine learning model. The prompt includes at least one instruction configured using the COTRO approach described herein. The at least one instruction is to cause the first machine learning model to use at least the input to rank a plurality of data sources associated with the use of the conversational search system. For example, the at least one instruction includes a query disambiguation scheme such as described with reference to FIG. 5A1, FIG. 5A2, FIG. 5A3, FIG. 5B1, FIG. 5B2, FIG. 5B3, FIG. 5C1, FIG. 5C2, FIG. 5C3, and FIG. 5D1, FIG. 5D2, FIG. 5D3.

The at least one instruction is to cause the first machine learning model to generate a first search query and reasoning. The first search query includes data obtained from at least one data source of the plurality of data sources ranked by the first machine learning model. For example, the first search query is a machine learning model-generated search query that is a preliminary disambiguated version of a user's natural language (unstructured) request, which is not presented to the user. The plurality of data sources can include sources of disambiguation, e.g., a state history, context data, dialog history, etc. The plurality of data sources can be identified by a disambiguation scheme such as described with reference to Table 1. The first search query can be machine learning model-generated using the disambiguation scheme. The reasoning includes an explanation of how the first machine learning model generated the first search query.

The at least one instruction is to cause the first machine learning model to use the first search query and the reasoning to generate a second search query. For example, the second search query includes a second or subsequent disambiguated version of the first search query. The second search query is, for example, a hallucination-managed version of the first search query, which is produced using the COTRO approach.

At operation 646, the processing device uses a second machine learning model to synthesize a response determined via execution of the second search query. For example, a query system is invoked to execute the second search query on one or more data sources, and results of the execution of the second search query are passed as input to the second machine learning model. The synthesized response is produced by the second machine learning model using the COTRO approach described herein. The synthesized response includes, for example, a further refined version of the search results obtained via execution of the second search query. For example, to produce the synthesized response, the second machine learning model is used to customize the format, tone, or style of the first version of the second output according to the preferences of a user. Alternatively or in addition, the synthesized response includes one or more multimodal elements (e.g., hyperlinks, digital images, video, audio, etc.) in combination with the search results.

At operation 648, the processing device provides the synthesized response for presentation via the conversational search system. For example, the processing device passes or otherwise makes the synthesized response available to, e.g., a user interface of the conversational search system.

In some implementations, the method 640 includes using the ranked plurality of data sources and the first natural language input, selecting a first data source; searching the first data source for the data; determining that the first data source does not contain the data; selecting a second data source of the ranked plurality of data sources; obtaining the data from the second data source; and including the data in the first search query.

In some implementations, the method 640 includes using the first natural language input, selecting a first data source of the ranked plurality of data sources; obtaining a first portion of the data from the first data source; using the first portion of the data and the first natural language input, selecting a second data source of the ranked plurality of data sources; obtaining a second portion of the data from the second data source; and including the first portion of the data and the second portion of the data in the first search query. In some implementations, the plurality of data sources comprises at least one of: second natural language input associated with the use of the conversational search system and received during a first time interval prior to the first natural language input; a historical sequence of natural language inputs and responses associated with the use of the conversational search system; or a user profile associated with the first natural language input.

In some implementations, the prompt is to cause the first machine learning model to search the second natural language input for the data before searching the historical sequence or the user profile. In some implementations, the prompt is to cause the first machine learning model to search the historical sequence before searching the user profile. In some implementations, the prompt is to cause the first machine learning model use at least one entity extracted from the first natural language input to formulate the first search query. In some implementations, the prompt is to cause the first machine learning model to identify at least one query term missing from the first natural language input, obtain the at least one missing query term from at least one of the ranked plurality of data sources, and include the at least one missing query term in the first search query.

The examples shown in FIG. 6C and the accompanying description, above are provided for illustration purposes. This disclosure is not limited to the described examples. Additional or alternative details and implementations are described herein.

Figure 7:
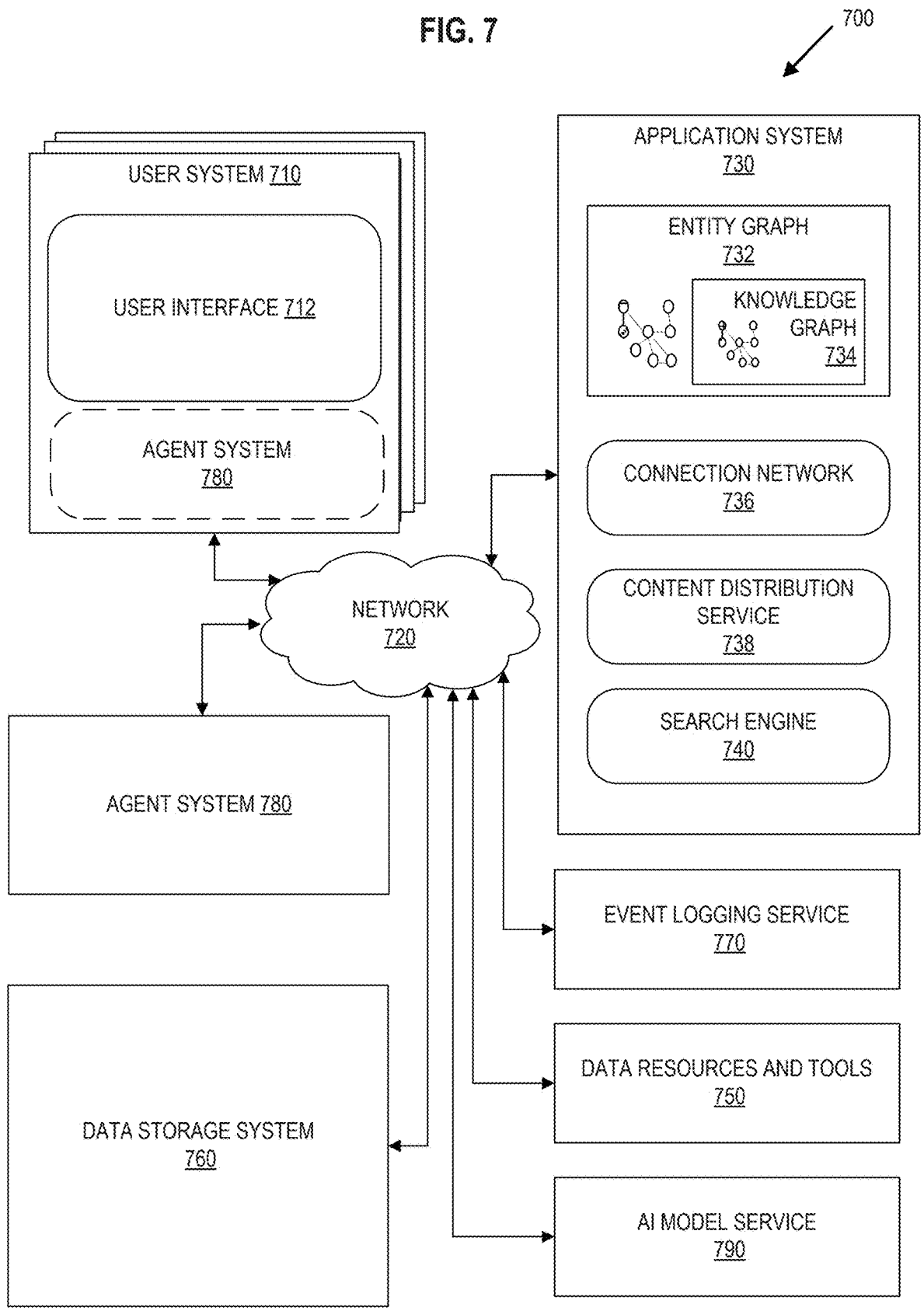
FIG. 7 is a block diagram of a computing system that includes an agent system in accordance with some embodiments of the present disclosure.

FIG. 7 is a block diagram of a computing system that includes an agent system in accordance with some embodiments of the present disclosure.

In the embodiment of FIG. 7, a computing system 700 includes one or more user systems 710, a network 720, an application system 730, data resources and tools 750, an agent system 780, a data storage system 760, an event logging service 770, and an AI model service 790.

All or at least some components of agent system 780 are implemented at the user system 710, in some implementations. For example, portions of agent system 780 are implemented directly upon a single client device such that communications involving applications running on user system 710 and agent system 780 occur on-device without the need to communicate with, e.g., one or more servers, over the Internet. Dashed lines are used in FIG. 7 to indicate that all or portions of agent system 780 can be implemented directly on the user system 710, e.g., the user's client device. In other words, both user system 710 and agent system 780 can be implemented on the same computing device, in some implementations. In other implementations, all or portions of agent system 780 are implemented on one or more servers and in communication with user systems 710 via network 720.

A user system 710 includes at least one computing device, such as a personal computing device, a server, a mobile computing device, a wearable electronic device, or a smart appliance, and at least one software application that the at least one computing device is capable of executing, such as an operating system or a front end of an online system. Many different user systems 710 can be connected to network 720 at the same time or at different times. Different user systems 710 can contain similar components as described in connection with the illustrated user system 710. For example, many different end users of computing system 700 can be interacting with many different instances of application system 730 through their respective user systems 710, at the same time or at different times.

User system 710 includes a user interface 712. User interface 712 is installed on user system 710 or accessible to user system 710 via network 720. Embodiments of user interface 712 can include a front end portion of an application system or and/or agent system 780.

User interface 712 includes, for example, a graphical display screen that includes graphical user interface elements such as at least one input box or other input mechanism and at least one slot. A slot as used herein refers to a space on a graphical display such as a web page or mobile device screen, into which output, e.g., digital content such as search results, feed items, chat boxes, or threads, can be loaded for display to the user. For example, user interface 712 may be configured with a scrollable arrangement of variable-length slots that simulates an online chat or instant messaging session and/or a scrollable arrangement of slots that contain content items or search results. The locations and dimensions of a particular graphical user interface element on a screen are specified using, for example, a markup language such as HTML (Hypertext Markup Language). On a typical display screen, a graphical user interface element is defined by two-dimensional coordinates. In other implementations such as virtual reality or augmented reality implementations, a slot may be defined using a three-dimensional coordinate system. Example screen captures of user interface screens that can be included in user interface 712 are shown in the drawings and described herein.

User interface 712 can be used to interact with the agent system 780 and/or one or more application systems 730. For example, user interface 712 enables the user of a user system 710 to interact with an application system to create, edit, send, view, receive, process, and organize requests, search queries, search results, content items, news feeds, and/or portions of online dialogs. In some implementations, user interface 712 enables the user to input requests (e.g., queries) for various different types of information, to initiate user interface events, and to view or otherwise perceive output such as data and/or digital content produced by, e.g., an application system 730, agent system 780, content distribution service 738 and/or search engine 740. For example, user interface 712 can include a graphical user interface (GUI), a conversational voice/speech interface, a virtual reality, augmented reality, or mixed reality interface, and/or a haptic interface. User interface 712 can include a mechanism for entering search queries and/or selecting search criteria (e.g., facets, filters, etc.), selecting GUI user input control elements, and interacting with digital content such as search results, entity profiles, posts, articles, feeds, and online dialogs. Examples of user interface 712 include web browsers, command line interfaces, and mobile app front ends. User interface 712 as used herein can include application programming interfaces (APIs).

Network 720 includes an electronic communications network. Network 720 can be implemented on any medium or mechanism that provides for the exchange of digital data, signals, and/or instructions between the various components of computing system 700. Examples of network 720 include, without limitation, a Local Area Network (LAN), a Wide Area Network (WAN), an Ethernet network or the Internet, or at least one terrestrial, satellite or wireless link, or a combination of any number of different networks and/or communication links.

Application system 730 can include, for example, one or more online systems that provide social network services, general-purpose search engines, specific-purpose search engines, messaging systems, content distribution platforms, e-commerce software, enterprise software, or any combination of any of the foregoing or other types of software. Application system 730 can include any type of application system that provides or enables the retrieval of and interactions with at least one form of digital content, including machine-generated content via user interface 712. In some implementations, portions of agent system 780 are components of application system 730. An application system 730 can include one or more of an entity graph 732 and/or knowledge graph 734, a user connection network 15315, a content distribution service 738, and/or a search engine 740. In other embodiments, application system 730 can interact with agent system 780 to control a physical machine or device, such as a vehicle or a robot.

In some implementations, a front end portion of application system 730 can operate in user system 710, for example as a plugin or widget in a graphical user interface of a web application, mobile software application, or as a web browser executing user interface 712. In an embodiment, a mobile app or a web browser of a user system 710 can transmit a network communication such as an HTTP request over network 720 in response to user input that is received through a user interface provided by the web application, mobile app, or web browser, such as user interface 712. A server running application system 730 can receive the input from the web application, mobile app, or browser executing user interface 712, perform at least one operation using the input, and return output to the user interface 712 using a network communication such as an HTTP response, which the web application, mobile app, or browser receives and processes at the user system 710.

In the example of FIG. 7, an application system 730 includes an entity graph 732 and/or a knowledge graph 734. Entity graph 732 and/or knowledge graph 734 include data organized according to graph-based data structures that can be traversed via queries and/or indexes to determine relationships between entities. For instance, entity graph 732 and/or knowledge graph 734 can be used to compute various types of relationship weights, affinity scores, similarity measurements, and/or statistics between, among, or relating to entities.

Entity graph 732, knowledge graph 734 includes a graph-based representation of data stored in data storage system 760, described herein. For example, entity graph 732, knowledge graph 734 represents entities, such as users, organizations (e.g., companies, schools, institutions), content items (e.g., job postings, announcements, articles, comments, and shares), and computing resources (e.g., databases, models, applications, and services), as nodes of a graph. Entity graph 732, knowledge graph 734 represents relationships, also referred to as mappings or links, between or among entities as edges, or combinations of edges, between the nodes of the graph. In some implementations, mappings between different pieces of data used by an application system 730 are represented by one or more entity graphs. In some implementations, the edges, mappings, or links indicate relationships, online interactions, or activities relating to the entities connected by the edges, mappings, or links. For example, if a user clicks on a search result, an edge may be created connecting the user entity with the search result entity in the entity graph, where the edge may be tagged with a label such as "viewed." If a user viewing a list of search results skip over a search result without clicking on the search result, an edge may not be created between the user entity and the search result entity in the entity graph.

Portions of entity graph 732, knowledge graph 734 can be automatically re-generated or updated from time to time based on changes and updates to the stored data, e.g., updates to entity data and/or activity data. Also, entity graph 732, knowledge graph 734 can refer to an entire system-wide entity graph or to only a portion of a system-wide graph. For instance, entity graph 732, knowledge graph 734 can refer to a subset of a system-wide graph, where the subset pertains to a particular user or group of users of application system 730.

Knowledge graph 734 includes a graph-based representation of data stored in data storage system 760. Knowledge graph 734 represents relationships, also referred to as links or mappings, between entities or concepts as edges, or combinations of edges, between the nodes of the graph. In some implementations, mappings between different pieces of data used by application system 730 or across multiple different application systems are represented by the knowledge graph 734.

In some implementations, knowledge graph 734 is a subset or a superset of entity graph 732. For example, in some implementations, knowledge graph 734 includes multiple different entity graphs 732 that are joined by cross-application or cross-domain edges. For instance, knowledge graph 734 can join entity graphs 732 that have been created across multiple different databases or across different software products. In some implementations, the entity nodes of the knowledge graph 734 represent concepts, such as product surfaces, verticals, or application domains. In some implementations, knowledge graph 734 includes a platform that extracts and stores different concepts that can be used to establish links between data across multiple different software applications. Examples of concepts include topics, industries, and skills. As with other portions of entity graph 732, knowledge graph 734 can be used to compute various types of relationship weights, affinity scores, similarity measurements, and/or statistical correlations between or among entities and/or concepts.

In the example of FIG. 7, application system 730 includes a user connection network 736. User connection network 736 includes, for instance, a social network service, professional social network system and/or other social graph-based applications. Content distribution service 738 includes, for example, a feed, chatbot or chat-style system, or a messaging system, such as a peer-to-peer messaging system that enables the creation and exchange of messages between users of application system 730 and the application system 730. Search engine 740 includes a search engine that enables users of application system 730 to input and execute search queries to retrieve information from one or more sources of information, such as user connection network 736, entity graph 732, knowledge graph 734, one or more data stores of data storage system 760, or one or more data resources and tools 750.

In the example of FIG. 7, application system 730 includes a content distribution service 738. The content distribution service 738 can include a data storage service, such as a web server, which stores digital content items, and transmits digital content items to users via user interface 712. In some embodiments, content distribution service 738 processes requests from, for example, application system 730 and/or agent system 780, and distributes digital content items to user systems 710 in response to requests.

A request includes, for example, a network message such as an HTTP (HyperText Transfer Protocol) request for a transfer of data from an application front end to the application's back end, or from the application's back end to the front end, or, more generally, a request for a transfer of data between two different devices or systems, such as data transfers between servers and user systems. A request is formulated, e.g., by a browser or mobile app at a user device, in connection with a user interface event such as a login, click on a graphical user interface element, an input of a search query, or a page load. In some implementations, content distribution service 738 is part of application system 730. In other implementations, content distribution service 738 interfaces with application system 730 and/or agent system 780, for example, via one or more application programming interfaces (APIs).

In the example of FIG. 7, application system 730 includes a search engine 740. Search engine 740 includes a software system designed to search for and retrieve information by executing queries on one or more data stores, such as databases, connection networks, and/or graphs. The queries are designed to find information that matches specified criteria, such as keywords and phrases contained in user input and/or system-generated queries. For example, search engine 740 is used to retrieve data in response to user input and/or system-generated queries, by executing queries on various data stores of data storage system 760 and/or data resources and tools 750, or by traversing entity graph 732, knowledge graph 734.

Data resources and tools 750 include computing resources, such as data stores, databases, embedding-based retrieval mechanisms, code generators, etc., that can be used to operate an agent or agent system. Data resources and tools 750 can include computing resources that are internal to application system 730 or external to application system 730. Examples of data resources and tools 750 include entity graphs, knowledge graphs, indexes, databases, networks, applications, models (e.g., large language models and/or other artificial intelligence models or machine learning models), taxonomies, data services, web pages, vectors (e.g., data stores that store embeddings), and searchable digital catalogs. Each data resource or tool 750 enables an agent or agent system to access the data resource or tool, for example by providing an application programming interface (API). Each data resource or tool 750 can include a monitoring service that periodically generates, publishes, or broadcasts availability and/or other performance metrics associated with the data resource. For example, a data resource or tool 750 can provide a set of APIs that can be used by an agent or agent system to access the data resource or tool, obtain output from the data resource, and/or obtain performance metrics for the data resource or tool.

Data storage system 760 includes data stores and/or data services that store digital data received, used, manipulated, and produced by application system 730 and/or agent system 780, including contextual data, state data, prompts and/or prompt templates for generative artificial intelligence models or large language models, user inputs, system-generated outputs, metadata, attribute data, activity data. Examples of databases or data stores that can be used in embodiments include vector databases, graph databases, relational databases, and key-value stores.

In the example of FIG. 7, data storage system 760 includes various data stores that store, for example, entity data, context data, prompts, embeddings, etc. A data store can include a volatile memory such as a form of random access memory (RAM) and/or persistent memory, which can be available on user system 710 or another device (e.g., one or more servers) for storing state data generated at the user system 710 or an application system 730. As another example, in some implementations, a separate, personalized version of each or any data store is created for each user such that data is not shared between or among the separate, personalized versions of the data stores.

In some embodiments, data storage system 760 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine. Data stores of data storage system 760 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

Data storage system 760 resides on at least one persistent and/or volatile storage device that can reside within the same local network as at least one other device of computing system 700 and/or in a network that is remote relative to at least one other device of computing system 700. Thus, although depicted as being included in computing system 700, portions of data storage system 760 can be part of computing system 700 or accessed by computing system 700 over a network, such as network 720.

Event logging service 770 captures and records activity data generated during operation of application system 730 and/or agent system 780, including user interface events generated at user systems 710 via user interface 712, in real time, and formulates the user interface events and/or other network activity data into a data stream that can be consumed by, for example, a stream processing system. Examples of network activity data include logins, page loads, dialog inputs, input of search queries or query terms, selections of facets or filters, clicks on search results or graphical user interface control elements, scrolling lists of search results, and social action data such as likes, shares, comments, and social reactions (e.g., "insightful," "curious," "like," etc.). For instance, when a user of application system 730 via a user system 710 enters input or clicks on a user interface element, such as a workflow element, or a user interface control element such as a view, comment, share, or reaction button, or uploads a file, or inputs a query, or scrolls through a feed, etc., event logging service 770 fires an event to capture and store log data including an identifier, such as a session identifier, an event type, a date/timestamp at which the user interface event occurred, and possibly other information about the user interface event, such as the impression portal and/or the impression channel involved in the user interface event. Examples of impression portals and channels include, for example, device types, operating systems, and software platforms, e.g., web applications and mobile applications.

For instance, when a user enters input or reacts to system-generated output, such as a list of search results, event logging service 770 stores the corresponding event data in a log. Event logging service 770 generates a data stream that includes a record of real-time event data for each user interface event that has occurred. Event data logged by event logging service 770 can be pre-processed and anonymized as needed so that it can be used as context data to, for example, configure one or more instructions for one or more artificial intelligence models (e.g., large language models), or to modify weights, affinity scores, or similarity measurements that are assigned by the agent system to search results or data resources.

Agent system 780 includes any one or more of the components, features, or functions described herein with respect to an application system, agent, or agent system, e.g., a conversational agent, navigation agent, assessment agent, search agent, or other type of agent.

AI model service 790 includes one or more artificial intelligence-based models, such as large language models and/or other types of machine learning models including discriminative and/or generative models, neural networks, probabilistic models, statistical models, transformer-based models, and/or any combination of any of the foregoing. AI model service 790 enables application systems, agents, and agent systems to access to these models, for example by providing one or more application programming interfaces (APIs). AI model service 790 can include a monitoring service that periodically generates, publishes, or broadcasts latency and/or other performance metrics associated with the models. For example, AI model service 790 can provide a set of APIs that can be used by an agent or agent system to obtain performance metrics for large language models and/or other machine learning models.

While not specifically shown, it should be understood that any of user system 710, application system 730, data resources and tools 750, data storage system 760, event logging service 770, agent system 780, and AI model service 790 includes an interface embodied as computer programming code stored in computer memory that when executed causes a computing device to enable bidirectional communication with any other of user system 710, application system 730, data resources and tools 750, data storage system 760, event logging service 770, agent system 780, and AI model service 790 using a communicative coupling mechanism. Examples of communicative coupling mechanisms include network interfaces, inter-process communication (IPC) interfaces and application program interfaces (APIs).

Each of user system 710, application system 730, data resources and tools 750, data storage system 760, event logging service 770, agent system 780, and AI model service 790 is implemented using at least one computing device that is communicatively coupled to electronic communications network 720. Any of user system 710, application system 730, data resources and tools 750, data storage system 760, event logging service 770, agent system 780, and AI model service 790 can be bidirectionally communicatively coupled by network 720. User system 710 as well as other different user systems (not shown) can be bidirectionally communicatively coupled to application system 730 and/or agent system 780.

A typical user of user system 710 can be an administrator or end user of application system 730 or agent system 780. User system 710 is configured to communicate bidirectionally with any of application system 730, data resources and tools 750, data storage system 760, event logging service 770, agent system 780, and AI model service 790 over network 720.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 710, application system 730, data resources and tools 750, data storage system 760, event logging service 770, agent system 780, and AI model service 790 are implemented using computer software, hardware, or software and hardware, and can include combinations of automated functionality, data structures, and digital data, which are represented schematically in the figures. User system 710, application system 730, data resources and tools 750, data storage system 760, event logging service 770, agent system 780, and AI model service 790 are shown as separate elements in FIG. 7 for ease of discussion but, except as otherwise described, the illustration is not meant to imply that separation of these elements is required. The illustrated systems, services, and data stores (or their functionality) of each of user system 710, application system 730, data resources and tools 750, data storage system 760, event logging service 770, agent system 780, and AI model service 790 can be divided over any number of physical systems, including a single physical computer system, and can communicate with each other in any appropriate manner.

Figure 9:
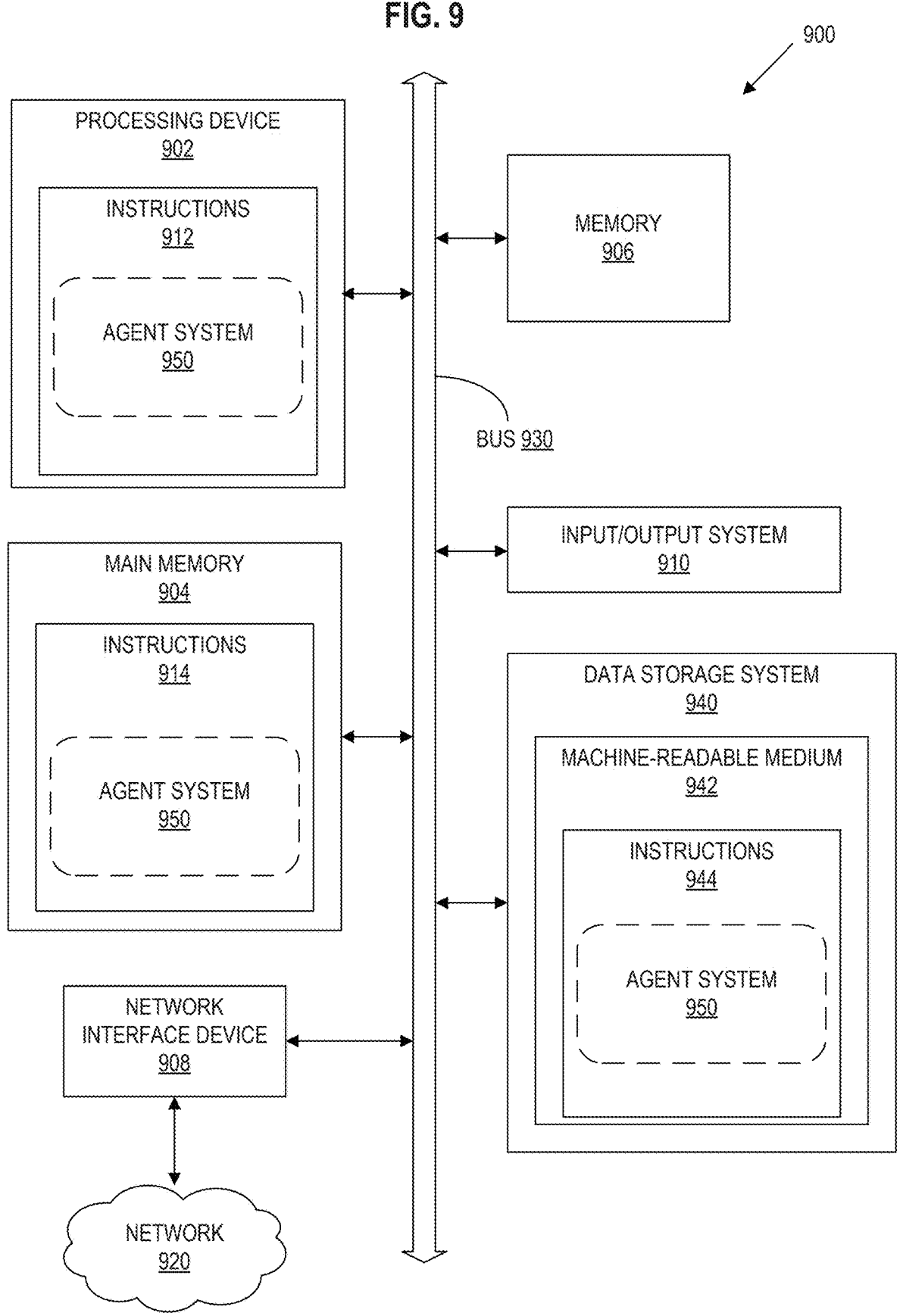
FIG. 9 is a block diagram of an example computer system including components of an agent system in accordance with some embodiments of the present disclosure.

In the embodiment of FIG. 9, portions of agent system 780 that may be implemented on a front end system, such as one or more user systems, and portions of agent system 780 that may be implemented on a back end system such as one or more servers, are collectively represented as agent system 950 for ease of discussion only. For example, portions of agent system 780 are not required to be implemented all on the same computing device, in the same memory, or loaded into the same memory at the same time. For instance, access to portions of agent system 780 can be limited to different, mutually exclusive sets of user systems and/or servers. For instance, in some implementations, a separate, personalized version of agent system 780 is created for each user of the agent system 780 such that data is not shared between or among the separate, personalized versions of the agent system 780. Additionally, certain portions of agent system 780 typically may be implemented on user systems while other portions of agent system 780 typically may be implemented on a server computer or group of servers. In some embodiments, however, one or more portions of agent system 780 are implemented on user systems. For example, agent system 780 is entirely implemented on user systems, e.g., client devices, in some implementations. For instance, a version of agent system 780 can be embedded in a client device's operating system or stored at the client device and loaded into memory at execution time.

The examples shown in FIG. 7 and the accompanying description, above are provided for illustration purposes. This disclosure is not limited to the described examples. Additional or alternative details and implementations are described herein.

Figure 8A:
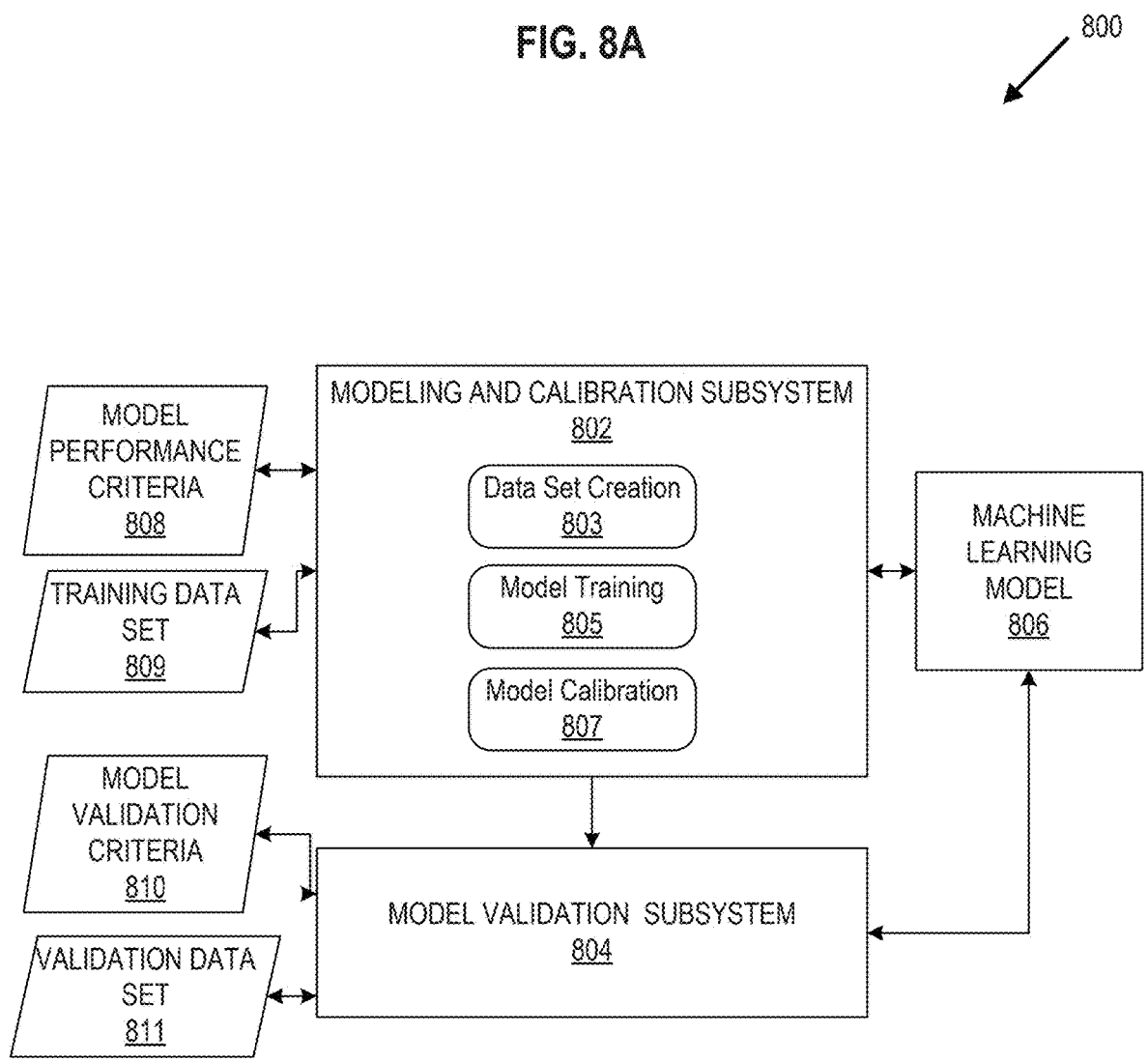
FIG. 8A is a block diagram of a machine learning model that can be used by and/or included in an agent system in accordance with some embodiments of the present disclosure.

FIG. 8A is a block diagram of a machine learning model that can be used by and/or included in an agent system in accordance with some embodiments of the present disclosure.

Machine learning models are computer-implemented structures that are capable of generating predictive output in response to raw input. A machine learning model includes a probabilistic or statistical algorithm that is configured to perform a specific predictive function through a training process that involves iteratively exposing the models to many samples of data and adjusting one or more model parameters until the models achieve a satisfactory prediction accuracy and reliability. The predictive accuracy and reliability of a machine learning model in relation to a particular task is dependent upon the training process and the data used in the training.

Machine learning systems include components and processes that perform data generation, model training, model evaluation (e.g., calibration and validation), and application. Data preparation includes obtaining and aggregating model input data. The preparation of training data can include labeling the aggregated data. Training data can include structured data, unstructured data, text, multimodal data, or any combination of any of the foregoing. Model training can include configuring hyperparameters, determining performance metrics, and applying the machine learning model to the training data, evaluating the performance metrics, and parameter tuning. Application includes applying the trained machine learning model to the real-world environment, e.g., in a specific use case using data not included in the training data (e.g., unlabeled data). The application phase can be referred to as inferencing or inference time.

In FIG. 8A, a machine learning modeling system 800 includes a machine learning model 806, a modeling and calibration subsystem 802, and a model validation subsystem 804. The machine learning model 806 can be or include any type or combination of one or more machine learning models, such as any of the types of machine learning models shown in FIG. 8B, FIG. 8C, FIG. 8D, and FIG. 8E and/or any other types or combinations of machine learning models.

The modeling and calibration subsystem 802 receives model input, such as input feature sets, embeddings, digital content, or prompts. The model input can be engineered to train the machine learning model 806 to perform one or more tasks, such as discriminative tasks like classification or scoring and/or generative tasks such as content generation tasks. Modeling and calibration subsystem 802 includes a data set creation component 803, a model training component 805, and a model calibration component 807.

Data set creation component 803 can divide the model input, e.g., input feature sets, into one or more training data sets and one or more validation data sets, e.g., training data set 809 and validation data set 811. Model training component 805 and model calibration component 807 cooperatively execute a training process. In some embodiments, the training process causes the machine learning model 806 to develop, by iterative adjustments to weights or coefficients, a mathematical representation of the relationships between different items of data, such as relationships between different inputs (e.g., similarity estimates or estimates of user preferences), or relationships between inputs and categorical data such as classification labels, or relationships between inputs and outputs. The resulting trained model can be used to generate predictive output (e.g., scores, labels, or other output) based on subsequent model input.

One or more different approaches can be used to train the machine learning model 806, for example, supervised machine learning, semi-supervised machine learning, or unsupervised machine learning. In supervised machine learning, the set of training data includes indications of expected model output coupled with respective model input; for example, ground-truth labeled data samples. For example, an instance of training data for supervised learning can include a model input (e.g., a set of features) and an associated expected output (e.g., a classification label), where the expected output can be human curated or machine-generated. For example, an instance of training data for supervised machine learning can include a digital image and a title or caption for the image that describes the contents of the image. In unsupervised machine learning, the training examples are unlabeled. In unsupervised machine learning, a clustering algorithm can be used to identify similarities among data samples and create clusters or groupings of similar data using one or more similarity criteria. For example, unsupervised learning can be used to group digital content items, such as images, articles, or videos, into topics, where the topics are determined based on the features of the content items themselves rather than supplied by labels. Semi-supervised machine learning combines supervised and unsupervised machine learning, using both labeled and unlabeled data to train machine learning models.

Model training component 805 applies machine learning model 806 to training data set 809 iteratively and adjusts the value of one or more model parameters and/or feature coefficients of the machine learning model 806 based on the processing of the training data set 809 by the model 806 until the difference between the predicted model output generated by the machine learning model 806 and the expected model output evidenced by the training data set 809 satisfies (e.g., meets or exceeds) model performance criteria 808. When the model performance criteria 808 are satisfied, modeling and calibration subsystem 802 ends the model training process and produces a trained machine learning model 806.

Model validation subsystem 804 applies a model validation process to the trained machine learning model 806 produced by modeling and calibration subsystem 802. Model validation subsystem 804 uses the validation data set 811 to determine whether model validation criteria 810 are satisfied (e.g., met or exceeded). For example, the validation data set 811 can be created by setting aside a portion of the training data set 809 until after training, such that the validation data set 811 can be used to compare and evaluate the difference between the predictive output produced by the trained model to the expected model output evidenced by the set-aside portion of the training data set 809.

A validated machine learning model 806 can be used for inferencing, e.g., to generate predictive output, e.g., labels, scores, or other content, in response to model input. Alternatively or in addition, the output produced by the validated machine learning model 806 can be stored for future use (e.g., for access or lookup by one or more downstream processes, systems, or services).

There are many different types and configurations of machine learning models. Illustrative, nonlimiting examples of some of the different types of machine learning models are shown in FIG. 8B, FIG. 8C, FIG. 8D, and FIG. 8E, described below. The AIs, models, and AI model services described herein can include or use any of the various types of machine learning models, including but not limited to one or more of the types of models shown in FIG. 8B, FIG. 8C, FIG. 8D, and FIG. 8E.

The examples shown in FIG. 8A and the accompanying description, above are provided for illustration purposes. This disclosure is not limited to the described examples. Additional or alternative details and implementations are described herein.

FIG. 8B is a block diagram of a machine learning model that can be used by and/or included in an agent system in accordance with some embodiments of the present disclosure.

In the example of FIG. 8B, a machine learning system 812 includes a machine learning model 815. Machine learning model 815 is or includes a probabilistic or statistical machine learning model that uses a modeling function 816 to model the relationship between model input 814 (e.g., input feature set X) and model output (e.g., Y, P (Y|X)).

In some embodiments, the machine learning model 815 is configured as a discriminative model such that the machine learning model 815 produces output that indicates the probabilistic or statistical likelihood of an output Y given an input X. Some embodiments of the machine learning model 815 can be alternatively or additionally configured as a generative model. For example, in some embodiments, a machine learning model can perform both discriminative and generative tasks.

One illustrative example of a discriminative model is a logistic regression function. Mathematically, a simplified form of the logistic function can be expressed $$P(X) = f(x) = \frac{1}{1 + e^{-(\beta_0 + \beta_1 x)}},$$

where e is the exponential constant and $\beta_0$ and $\beta_1$ are feature coefficients. During training of the logistic regression model 815, logistic regression estimates the values of the coefficients in the linear combination based on the feature values in the training data set. The machine learning model 815 can be configured via training, calibration, and validation processes such as those described with reference to FIG. 8A.

The machine learning model 815 includes a modeling function 816. The modeling function 816 includes feature coefficients 817. The values of one or more of the feature coefficients 817 can be established via machine learning model training, calibration, and validation processes based on training data sets and/or validation data sets.

In the logistic regression example, the feature coefficients 817 can include a regression coefficient β for each feature input x (e.g., $f(i) = \beta_0 + \beta_1 x_{1,i} + \ldots \beta_m x_{m,i}$), where $x_i$ is a particular item of the feature set and m is the number of feature inputs x in the input feature set X 814. The regression coefficient indicates the relative effect of the particular feature input x of the feature set X on the predicted outcome P(Y|X), e.g., a predicted label or score, based on the values of the feature inputs x in the feature set X 814. The values of the feature coefficients are initialized and adjusted during model training and calibration.

The machine learning model 815 also includes model hyperparameters 818. The values of hyperparameters 818 are selected or tuned at a global level and generally are not modified based on specific instances of training data. In the logistic regression example, model hyperparameters 818 can include a penalty or regularization parameter (e.g., L1 or L2) and the C or regularization strength parameter. The penalty or regularization parameter is tunable to adjust model generalization error and regulate overfitting. The C or regularization strength parameter regulates overfitting in conjunction with the penalty. The model hyperparameters 818 can be tuned using, for example, a hyperparameter tuning tool or hyperparameter optimization method.

Some embodiments of the machine learning model 815 can be configured as a binary classifier or as a scoring model. In a binary classification mode, the output of the machine learning model 815 indicates whether the model input is or is not associated with a certain output (e.g., either 0 if the input is not mathematically likely to be associated with the output or 1 if the input is mathematically likely to be associated with the output), for a given set of input features. In a scoring mode, the output of the machine learning model 815 includes a score, which corresponds to a probability of the predicted output (e.g., a numerical value between zero and 1, inclusive).

The model input 814 (e.g., input feature set X) can include numerical features, categorical features, quantitative values, qualitative values, raw features, compressed representations of raw features (e.g., vector representations or embeddings, and/or other forms of digital content.

In response to an instance of features of feature set X, machine learning model 815 computes and outputs an estimated output P (Y|X) 819. The estimated output produced by machine learning model 815 based on an instance of features of feature set X 814 can be in the form of a binary output or a score. The output can be stored in a data storage for subsequent lookup or provided to one or more downstream systems, processes, devices, frameworks, and/or services.

The machine learning model 815 can be configured and implemented as a network service. For example, the machine learning model 815 can be configured using a machine learning library and an application programming interface (API), e.g., via an API call such as ML_library-.model(p1, p2, . . . pn), where p indicates a parameter or argument of the call, such as a model hyperparameter or an input feature set identifier. Once configured, the machine learning model 815 and/or its output can be hosted on one or more servers and/or data storage devices for accessibility to one or more requesting processes, systems, devices, frameworks, or services.

The examples shown in FIG. 8B and the accompanying description, above are provided for illustration purposes. This disclosure is not limited to the described examples. Additional or alternative details and implementations are described herein.

FIG. 8C is a block diagram of a machine learning model that can be used by and/or included in an agent system in accordance with some embodiments of the present disclosure.

A generative artificial intelligence (GAI) model or generative model uses artificial intelligence technology, e.g., machine learning, neural networks, to machine-generate digital content based on model inputs and the previously existing data with which the model has been trained. Whereas discriminative models are based on conditional probabilities P (y|x), that is, the probability of an output y given an input x, generative models capture joint probabilities P (x, y), that is, the likelihood of x and y occurring together. A generative language model is a particular type of GAI model that is capable of generating content in response to model input. The model input includes a task description, also referred to as a prompt. The task description can include instructions (e.g., natural language instructions such as "please generate a summary of these search results") and/or examples of digital content (e.g., examples of summaries written using a particular writing style or tone). Portions of the task description can be in the form of natural language text, such as a question or a statement. Alternatively or in addition, a task description or prompt can include non-text forms of content, such as digital imagery and/or digital audio.

In the example of FIG. 8C, a machine learning system 820 includes a machine learning model 824. Machine learning model 824 is or includes a probabilistic or statistical machine learning model that uses a modeling function to model the likelihood of cooccurrence of input feature set X and output Y; e.g., the likelihood of X and Y occurring together. The machine learning model 824 can be configured via training, calibration, and validation processes such as those described with reference to FIG. 8A. Some embodiments of the machine learning model 824 can be alternatively or additionally configured as a discriminative model. For example, in some embodiments, a machine learning model can perform both discriminative and generative tasks.

The machine learning model 824 includes a modeling function 825. The modeling function 825 includes feature coefficients or weights 826. The values of one or more of the feature coefficients can be established via machine learning model training, calibration, and validation processes based on training data sets and/or validation data sets. The machine learning model 824 also includes model hyperparameters 827. The values of model hyperparameters 827 are selected or tuned at a global level and generally are not modified based on specific instances of training data.

The model input 822 (e.g., input feature set X) can include numerical features, categorical features, quantitative values, qualitative values, raw features, compressed representations of raw features (e.g., vector representations or embeddings), and/or other forms of digital content.

In response to an instance of model input 822 (e.g., instance of feature set X), machine learning model 824 computes and outputs an estimated output P (X,Y) 828. The estimated output produced by machine learning model 824 based on a model input 822 can be in the form of an input-output pair and a score or can simply include the highest scoring input-output pair. The output can be stored in a data storage for subsequent lookup or provided to one or more downstream systems, processes, devices, frameworks, and/or services.

The machine learning model 824 can be configured and implemented as a network service. For example, the machine learning model 824 can be configured using a machine learning library and an application programming interface (API), e.g., via an API call such as ML_library-.model(p1, p2, . . . pn), where p indicates a parameter or argument of the call, such as a model hyperparameter or an input feature set identifier. Once configured, the machine learning model 824 and/or its output can be hosted on one or more servers and/or data storage devices for accessibility to one or more requesting processes, systems, devices, frameworks, or services.

The examples shown in FIG. 8C and the accompanying description, above are provided for illustration purposes. This disclosure is not limited to the described examples. Additional or alternative details and implementations are described herein.

Figure 8D:
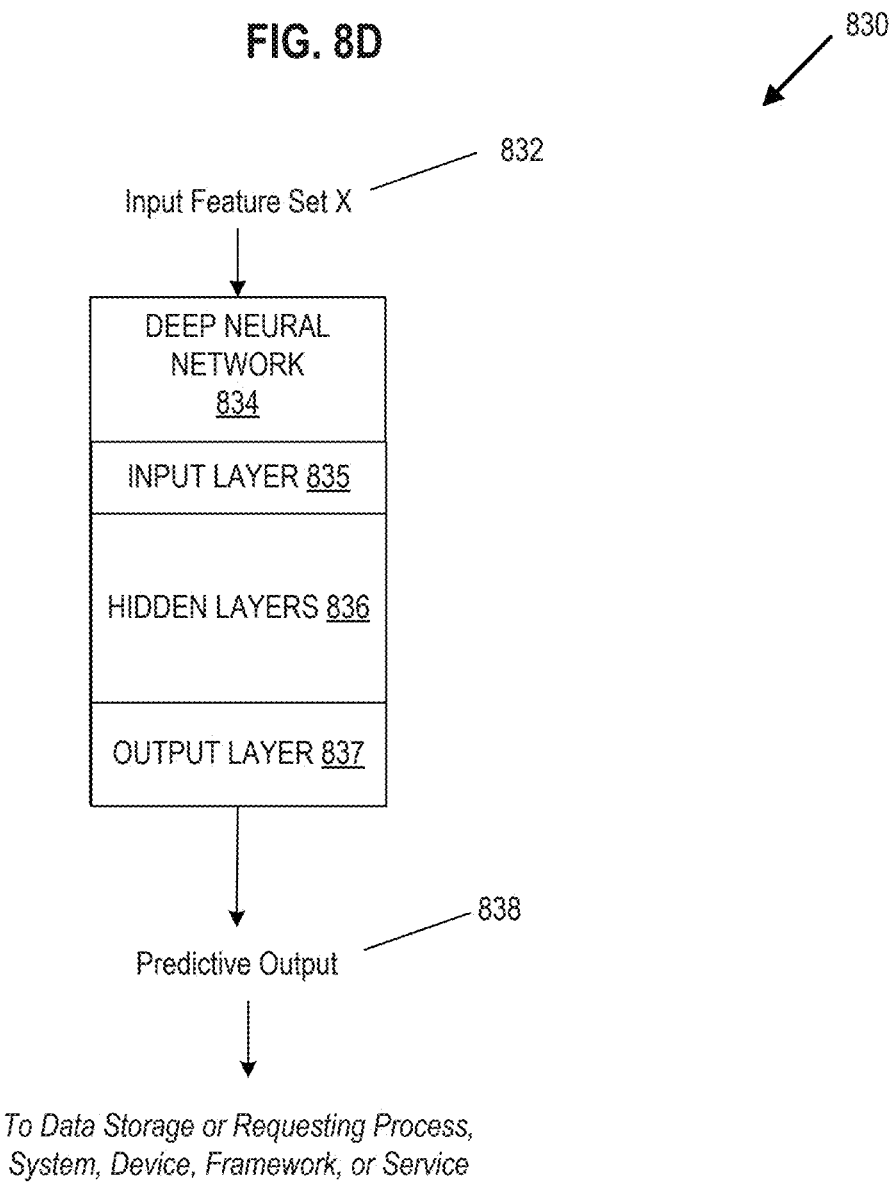
FIG. 8D is a block diagram of a machine learning model that can be used by and/or included in an agent system in accordance with some embodiments of the present disclosure.

FIG. 8D is a block diagram of a machine learning model that can be used by and/or included in an agent system in accordance with some embodiments of the present disclosure.

A specific example of a machine learning model is a deep neural network. Some machine learning models, such as multi-task models, can include multiple interconnected deep neural networks. In the example of FIG. 8D, a machine learning system 830 includes a deep neural network 834. The deep neural network 834 can be configured via training, calibration, and validation processes such as those described with reference to FIG. 8A. Some embodiments of the deep neural network 834 can be configured as a discriminative model and/or a generative model. For example, in some embodiments, a deep neural network 834 can perform both discriminative and generative tasks.

In computer science, deep learning refers to a class of machine learning that uses computer-implemented neural networks to generate predictive output, where the neural networks have one or more internal (or hidden) layers between and in addition to an input layer and an output layer. Each layer in a deep neural network (or deep learning model) performs a set of computational operations on the input to that layer.

Each layer of the neural network includes a set of nodes that each apply an activation function to one or more portions of the input to that layer to produce an output. The activation function performs a nonlinear transformation of the input and sends its output to the next layer of the network. For example, if the output of the activation function is equal to or exceeds a threshold value, the node passes its output to the next layer, but if the output is less than the threshold value, the output passed to the next layer is zero or a null value. The type of activation function used at a node or layer is selected based on the particular predictive task for which the model is configured and/or based on the model architecture. Examples of activation functions include the SoftMax function (for multi-class classification), the sigmoid function (for internal layers), and rectifier (e.g., ramp, ReLU (Rectified Linear Unit)) functions.

The input layer of a deep neural network receives and processes the model input, which can include raw data and/or pre-processed data such as aggregations, derivations, embeddings or vector representations of raw data. The output of a layer of the neural network can be connected to and used as the input to another layer, such that each layer of the deep learning model creates a different (e.g., progressively more highly processed) set of information relating to the original, raw input (e.g., producing a different representation of the raw input at each layer). Weights are applied to the output of each node of each layer before the output is propagated to the next layer. The weight values can be adjusted so that the outputs of some nodes or layers influences the final output more or less than the outputs of other nodes or layers. The output layer of the neural network produces the final predictive output, which can be made accessible to one or more downstream models, applications, systems, operations, processes or services.

Backpropagation is an example of a method that can be used to train a neural network model. In a feedforward step, the training data is propagated from the input layer through the internal layers to the final output by computing each successive layer's outputs up to and including the final output. A loss function (or cost function, such as cross-entropy, log loss, or squared error loss, or a logistic function) is used to compute error for the final output, for example, based on a comparison of the difference between the output predicted by the model and the expected or target output to the error computed on a previous iteration. The model weights (or parameters or coefficients) are adjusted to reduce the error, iteratively, until the error falls within an acceptable range or the error stops changing by more than a threshold amount (e.g., the model converges). In backpropagation, these iterative weight adjustments are propagated backward from the output layer through the internal layers. The gradient of the loss function or gradient descent (e.g., stochastic gradient descent) may be used in backpropagation.

Recommendation systems, for example, can apply deep learning models to generate predictive output and use the predictive output to configure one or more downstream operations. For example, recommendation systems compute statistical or probabilistic predictions that can be used to select, rank, or sort digital content items for presentation to users via electronic devices. Examples of downstream operations that can use the predictive output of deep learning recommendation systems include news feeds, automated product recommendations, and automated connection (e.g., friend, follower, or contact) recommendations for online platforms such as social networks. Other examples include systems that support human decision making, such as systems that use artificial intelligence to generate recommendations for health care, financial services, training, education, and/or other fields or topics. Still other examples include control systems that use artificial intelligence to recommend courses of action to other components of automated systems in operational environments, such as "smart" vehicles, appliances, robots, and other automated devices.

In the example of FIG. 8D, the deep neural network 834 includes an input layer 835, one or more hidden layers 836, and an output layer 837. The input layer 835 receives one or more batches of model input 823 (e.g., input feature sets X). For example, the input layer 835 can include a number of nodes that corresponds to the number of input features in a given input feature set X. The output of the input layer 835 becomes the input to the one or more hidden layers 836. The output of the one or more hidden layers 836 becomes the input to the output layer 837. The output layer 837 outputs the final predictive output 838. In some embodiments, each of the layers of the deep neural network 834 is fully connected in the sense that the output of each node of each layer is connected to the input of each node of the next subsequent layer. In other embodiments, the deep neural network 834 can include portions that are not fully connected.

The deep neural network 834 can be configured and implemented as a network service. For example, the deep neural network 834 can be configured using a machine learning library and an application programming interface (API), e.g., via an API call such as ML_library.model(p1, p2, . . . pn), where p indicates a parameter or argument of the call, such as a model hyperparameter or an input feature set identifier. Once configured, the deep neural network 834 and/or its output can be hosted on one or more servers and/or data storage devices for accessibility to one or more requesting processes, systems, devices, frameworks, or services.

The input feature set X can include numerical features, categorical features, quantitative values, qualitative values, raw features, compressed representations of raw features (e.g., vector representations or embeddings), natural language, and/or other forms of digital content. Embedding as used herein may refer to a numerical representation of a set of features. An embedding can encode information, e.g., a set of features associated with an entity and/or attribute, relative to an embedding space. Embeddings and embedding spaces can be generated by artificial intelligence (AI) models. An embedding can be expressed as a vector, where each dimension of the vector includes a numerical value that can be an integer or a real number. The numerical value assigned to a given dimension of the vector conveys information about the data represented by the embedding, relative to the embedding space, also referred to as a vector space. The embedding space (or vector space) includes all of the possible values of each dimension of the vector. The embedding space is defined by the way in which the AI model used to generate the vector has been trained and configured, including the training data used to train the AI model. In some implementations, train as used herein refers to an iterative process of applying an AI algorithm to one or more sets of training data, analyzing the output of the AI model in comparison to expected model output using a loss function (also referred to as a cost function or error function), adjusting values of one or more parameters and/or coefficients of the AI model, and repeating the process until the difference between the actual model output and the expected model output falls within an acceptable range of error or tolerance.

Embedding-based retrieval (EBR) is a method of searching for similar digital content, such as documents or portions of documents. Embedding-based retrieval involves converting digital data, e.g., sets of features, to embeddings and then using a similarity algorithm, such as nearest-neighbor search or cosine similarity, to identify embeddings that are similar to one another. Similarly, match or map as used herein can refer to an exact match or an inexact match. For example, match or map can refer to a machine-determined predicted or estimated degree of relevance, similarity or compatibility between entities or data items that satisfies (e.g., meets or exceeds) a threshold level of relevance, similarity or compatibility, where the threshold level of relevance, similarity or compatibility is variable based on the requirements of a particular design or implementation. The threshold level of similarity may be set lower or higher for different types of matching or mapping.

In response to an instance of feature set X, deep neural network 834 computes and outputs a predictive output 838. The predictive output 838 can be stored in a data storage for subsequent lookup or provided to one or more downstream systems, processes, devices, frameworks, and/or services.

The deep neural network 834 can be configured and implemented as a network service. For example, the deep neural network 834 can be configured using a machine learning library and an application programming interface (API), e.g., via an API call such as ML_library.model(p1, p2, . . . pn), where p indicates a parameter or argument of the call, such as a model hyperparameter or an input feature set identifier. Once configured, the machine learning model and/or its output can be hosted on one or more servers and/or data storage devices for accessibility to one or more requesting processes, systems, devices, frameworks, or services.

The examples shown in FIG. 8D and the accompanying description, above are provided for illustration purposes. This disclosure is not limited to the described examples. Additional or alternative details and implementations are described herein.

Figure 8E:
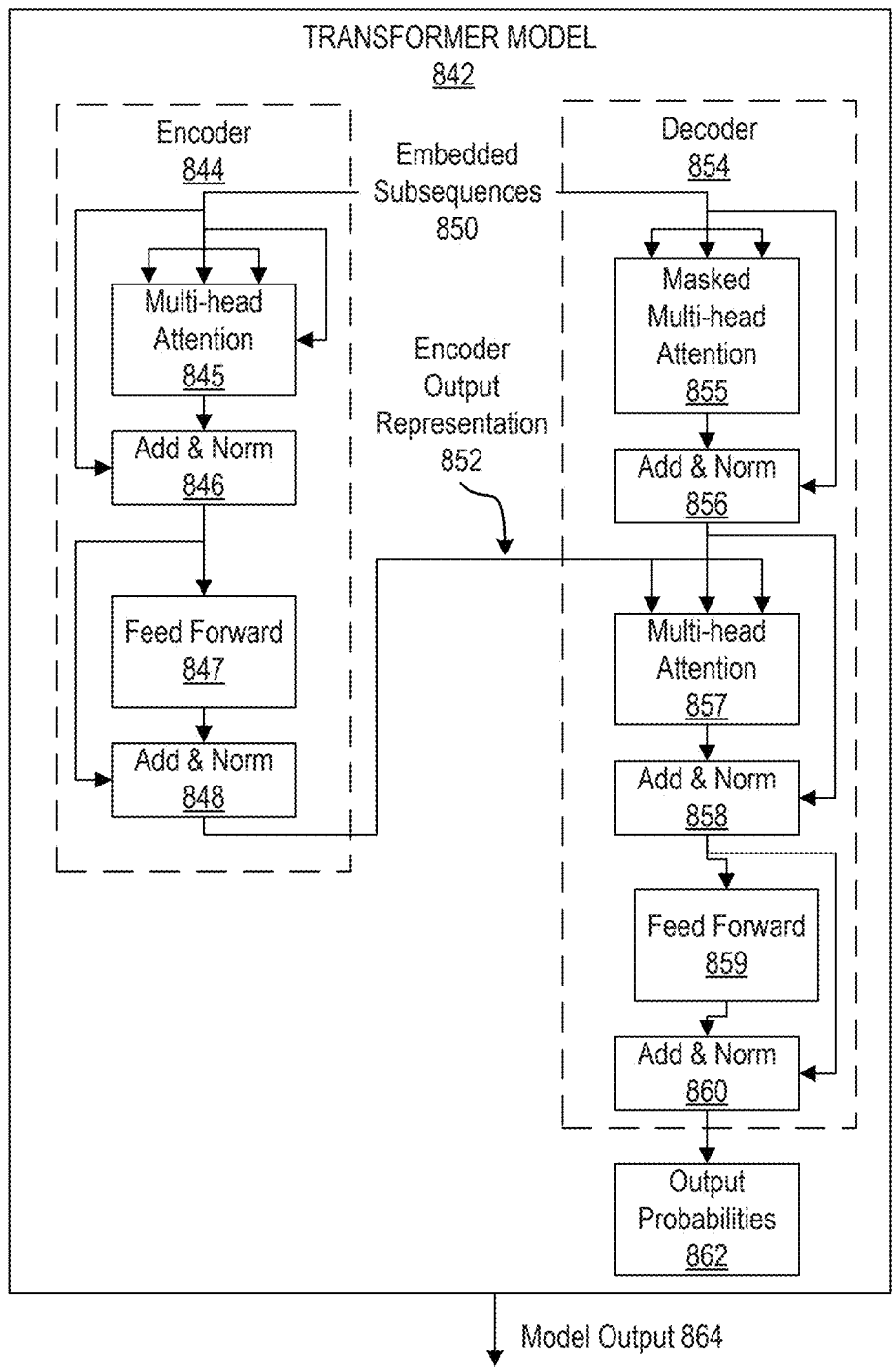
FIG. 8E is a block diagram of a machine learning model that can be used by and/or included in an agent system in accordance with some embodiments of the present disclosure.

FIG. 8E is a block diagram of a machine learning model that can be used by and/or included in an agent system in accordance with some embodiments of the present disclosure.

A specific example of a deep neural network is a sequence to sequence model, which takes sequential data such as words, phrases, or images (sequences of characters, tokens, or pixel values) or time series data as input and outputs sequential data. An example of a sequence to sequence model is an encoder-decoder model. In an encoder-decoder model, a first neural network known as an encoder transforms the model input into an encoded version of the model input, e.g., an embedding or vector. For example, an encoder can transform a sentence or an image into a sequence of numbers. A second neural network known as the decoder takes the output of the encoder (e.g., the encoded version of the model input) and decodes it. For example, a decoder can transform the sequence of numbers created by the encoder into a translated sentence or another form of output. The encoder-decoder model is suitable for sequence-to-sequence problems such as computer vision and natural language processing (NLP) tasks such as machine translation.

A specific example of an encode-decoder model is a transformer model. A transformer model is a deep neural network encoder-decoder model that uses a technique called attention or self-attention to detect relationships and dependencies among data elements in a sequence. Transformer models can be applied to various NLP tasks and other machine learning tasks, such as generating content based on input attributes or tokens. For example, the attention mechanism can facilitate the detection of semantic relationships and contextual dependencies between words and phrases.

In the example of FIG. 8E, a machine learning system 840 includes a transformer model 842. The transformer model 842 is constructed using a neural network-based machine learning model architecture. In some embodiments, the neural network-based architecture includes one or more self-attention layers (e.g., multi-head attention layer 845, masked multi-head attention layer 855, and multi-head attention layer 857) that allow the model to assign different weights to different features included in the model input. Alternatively, or in addition, the neural network architecture includes feed-forward layers (e.g., feed-forward layer 847 and feed-forward layer 859) and residual connections (e.g., add & norm layer 846, add & norm layer 848, add & norm layer 856, add & norm layer 858, add & norm layer 860) that allow the model to machine-learn complex data patterns including relationships between different states, actions, and rewards in multiple different contexts. In some embodiments, transformer model 842 is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the user trajectory processing system.

As shown in FIG. 8E, transformer model 842 feeds embedded subsequences 850 into encoder 844 and decoder 854. For example, transformer model 842 feeds inputs of embedded subsequences 850 into multi-head attention layer 845 of encoder 844. In some embodiments, inputs of embedded subsequences 850 are a series of tokens and the output of the encoder (e.g., encoder output representation 852), is a fixed-dimensional representation for each of the tokens of embedded subsequences 850 including an embedding for inputs of embedded subsequences 850. Transformer model 842 feeds encoder output representation 852 and outputs of embedded subsequences 850 into decoder 854 which generates a sequence of tokens based on encoder output representation 852 and the input embeddings. While a specific architecture of encoder 844 and decoder 854 is shown for simplicity, as explained above, the exact number and arrangement of layers of each type as well as the hyperparameter values used to configure the model are determined based on the requirements of a particular design or implementation. Transformer model 842 can therefore include different numbers, arrangements, and types of layers, such that each input token of embedded subsequences 850 is fed through the layers of transformer model 842 and is dependent on other input tokens of embedded subsequences 850.

Transformer model 842 illustrates a generic encoder/decoder model for simplicity. In such a model, encoder 844 encodes the input into a fixed-length vector (e.g., encoder output representation 852) and decoder 854 decodes the fixed-length vector into an output sequence. Encoder 844 and decoder 854 are trained together to maximize the conditional log-likelihood of the output given the input. For example, once trained, encoder 844 and decoder 854 can generate an output given an input sequence or can score a pair of input/output sequences based on their probability of coexistence.

As shown in FIG. 8E, encoder 844 includes multi-head attention layer 845, add & norm layer 604, feed-forward layer 606, and add & norm layer 608. Multi-head attention layer 845 receives inputs of embedded subsequences 850 and computes output representations for each of the input tokens of embedded subsequences 850 based on the inputs of embedded subsequences 850. For example, multi-head attention layer 845 converts each input token of embedded subsequences 850 into queries, keys, and values using query, key, and value matrices. Multi-head attention layer 845 computes the output representation of the input tokens of embedded subsequences 850 as the weighted sum of the values of all of the input tokens of embedded subsequences 850. Multi-head attention layer 845 computes the weights for the weighted sum by applying a compatibility function to the corresponding key and query for the value. For example, multi-head attention layer 845 uses a scaled dot product on the key and query of an input token to determine a weight to apply to a value of the input token. Multi-head attention layer 845 includes multiple attention blocks which each compute an output representation for the input token. Multi-head attention layer 845 aggregates the output representations of these attention blocks to generate a final output representation for multi-head attention layer 845.

Inputs of embedded subsequences 850 includes the state of the online system at a given timestamp and the action taken at that state. For example, inputs of embedded subsequences 850 includes the state features and actions of embedded subsequences 850. Transformer model 842 feeds the output representation generated by multi-head attention layer 845 and residual connections from the inputs of embedded subsequences 850 into add & norm layer 604. By including these residual connections, transformer model 842 ensures that it does not "forget" features of embedded subsequences 850 during training. Forgetting in the context of machine learning can mean that as the model continues to be sequentially trained on different datasets, the model continually adjusts the values of feature coefficients based on the most recent datasets, thereby losing or diluting the effect on those coefficient values of the datasets used earlier in training.

Add & norm layer 846 sums the output representation generated by multi-head attention layer 845 and the residual connections from inputs of embedded subsequences 850 and applies a layer normalization to the result. In some embodiments, the add & normal layers also apply a SoftMax function to generate action probabilities for the inputs of embedded subsequences 850. For example, add & norm layer 846 generates estimated probabilities $\hat{p}(a_k|s)$, where ax is the action policy and s is the state features.

Transformer model 842 feeds the normalized output of add & norm layer 846 into feed-forward layer 847. Feed-forward layer 847 is a feed-forward network that receives the normalized output, feeds it through the hidden layers of feed-forward layer 847, and then feeds the output of feed-forward layer 847 into add & norm layer 848. Feed-forward layer 847 processes the information received from add & norm layer 846 and can update the hidden layers of feed-forward layer 847 based on the information (e.g., during training) and/or generate an output based on the hidden layers processing the information (e.g., during evaluation and/or inference). For example, during training, transformer model 842 updates the weights of the hidden layers of feed-forward layer 847 based on the inputs and the loss of the transformer system. Further details with regard to the loss of the transformer system as well as training objectives and metrics are discussed below. As an alternative example, during evaluation and/or inference, the weights of the hidden layers of feed-forward layer 847 are used to determine the output representation 852 of each of the input tokens of embedded subsequences 850.

Transformer model 842 feeds the output of feed-forward layer 847 into add & norm layer 848 as well as residual connections from the output of add & norm layer 846. Add & norm layer 848 sums the output of feed-forward layer 847 with the residual connections from add & norm layer 846 and applies a layer normalization to the result to generate encoder output representation 852. Transformer model 842 feeds encoder output representation 852 into multi-head attention layer 857 of decoder 854 as explained below.

Masked multi-head attention layer 855 receives outputs of embedded subsequences 850 and computes representations for each of the output tokens of embedded subsequences 850 based on masked outputs of embedded subsequences 850. For example, masked multi-head attention layer 855 computes representations for each of the output tokens of embedded subsequences 850 based on previous output tokens while masking future output tokens. Masked multi-head attention layer 855 therefore only computes representations using tokens that come before the token masked multi-head attention layer 855 is trying to predict.

Transformer model 842 feeds the representation generated by masked multi-head attention layer 855 and residual connections from the outputs of embedded subsequences 850 into add & norm layer 856. Add & norm layer 856 sums the representation generated by masked multi-head attention layer 855 and the residual connections from outputs of embedded subsequences 850 and applies a layer normalization to the result.

Transformer model 842 feeds the normalized output of add & norm layer 856 into multi-head attention layer 857. Multi-head attention layer 857 receives the normalized output of add & norm layer 856 as well as encoder output representation 852 from encoder 844 and generates a representation based on both.

Transformer model 842 feeds the representation generated by multi-head attention layer 857 and residual connections from the output of add & norm layer 856 into add & norm layer 858. Add & norm layer 858 sums the representation generated by multi-head attention layer 857 and the residual connections from the output of add & norm layer 856 and applies a layer normalization to the result.

Transformer model 842 feeds the normalized output of add & norm layer 858 into feed-forward layer 859. Feed-forward layer 859 is a feed-forward network that receives the normalized output, feeds it through the hidden layers of feed-forward layer 859, and then feeds the output of feed-forward layer 859 into add & norm layer 869. Feed-forward layer 859 processes the information received from add & norm layer 858 and can update the hidden layers of feed-forward layer 859 based on the information (e.g., during training) and/or generate an output based on the hidden layers processing the information (e.g., during evaluation and/or inference). For example, during training, transformer model 842 updates the weights of the hidden layers of feed-forward layer 859 based on the inputs and the loss of the transformer system. Further details with regard to the loss of the transformer system as well as training objectives and metrics are discussed below. As an alternative example, during evaluation and/or inference, the weights of the hidden layers of feed-forward layer 859 are used to determine the output of feed-forward layer 859.

Transformer model 842 feeds the output of feed-forward layer 859 into add & norm layer 860 as well as residual connections from the output of add & norm layer 858. Add & norm layer 860 sums the output of feed-forward layer 859 with the residual connections from add & norm layer 858 and applies a layer normalization to the result to generate an output.

Transformer model 842 generates output probabilities 862 from the output of add & norm layer 860. For example, transformer model 842 applies a linear transformation and a SoftMax function to the output of add & norm layer 860 to generate a normalized vector of output probabilities 862.

In some embodiments, such as during training, transformer model 842 determines a loss for the system based on output probabilities 862. For example, transformer model 842 uses deep quantile regression for training. In such an example, output probabilities 862 includes a mean prediction probability and estimations for the upper and lower bounds of the range of prediction such that output probabilities 626 includes an uncertainty range. In one embodiment, the loss function of transformer model 842 using deep quantile regression is represented by the following equation:

$$\mathcal{L}(\xi_i|\alpha) = \begin{cases} \alpha\xi_i & \text{if } \xi_i \geq 0, \\ (\alpha-1)\xi_i & \text{if } \xi_i < 0, \end{cases}$$

where $\alpha$ is the required quantile (a value between 0 and 1 representing the desired quantile) and $\xi_i = y_i - f(x_i)$, where $f(x_i)$ is the mean predicted by output probabilities 862, $y_i$ are the outputs of embedded subsequences 850 and $x_i$ are the inputs of embedded subsequences 850. The loss over the entirety of a dataset of embedded subsequences 850 where embedded subsequences 850 has a length of N can be represented by the following equation:

$$\mathcal{L}(y, f|\alpha) = \frac{1}{N} \sum_{i=1}^{N} \mathcal{L}(y_i - f(x_i)|\alpha).$$

In such embodiments, output probabilities 862 includes three values: a mean prediction, a lower bound quantile, and an upper bound quantile. In some embodiments, transformer model 842 uses upper confidence bound or Thompson sampling. For example, transformer model 842 can determine model output 864 based on the mean prediction, the lower bound quantile, and the upper bound quantile based on upper confidence bound and/or Thompson sampling.

In some embodiments, transformer model 842 is trained to optimize the model parameters with trajectory-specific normalizations using cross-entropy loss. For example, transformer model 842 uses a loss function represented by the following equation:

$$L(\theta) = \frac{1}{N_{traj}} \sum_{i}^{N_{traj}} \sum_{t=1}^{T_i} W_i \sum_{k} \log(\hat{p}(a_k^{(it)}|s^{(it)})),$$

where $N_{traj}$ is the trajectory count, $w_i$ is the normalization weight, $a_k^{(it)}$ is the predicted action for the trajectory i at timestep t, and $s^{(it)}$ is the state of the online system for the trajectory i at timestep t. In some embodiments, transformer model 842 uses trajectory-wise normalization. For example, the add & norm layers of transformer model 842 normalize the weights according to the following equation:

$$w_i = \frac{1}{T_i},$$

where $T_i$ is the length of trajectory i. In some embodiments, transformer model 842 uses global normalization. For example, the add & norm layers of transformer model 842 normalize the weights according to the following equation: $w_i=c$, where c is a positive scalar. In some embodiments, the scalar c is predetermined.

Language models, including large language models and other generative models, can be implemented using transformer models. A generative model can be constructed using a neural network-based machine learning model architecture. In some implementations, the neural network-based architecture includes one or more input layers that receive task descriptions (or prompts), generate one or more embeddings based on the task descriptions, and pass the one or more embeddings to one or more other layers of the neural network. In other implementations, the one or more embedding are generated based on the task description by a pre-processor, the embeddings are input to the generative language model, and the generative language model outputs digital content, e.g., natural language text or a combination of natural language text and non-text output, based on the embeddings.

The neural network-based machine learning model architecture of the generative model can include one or more self-attention layers that allow the model to assign different weights to different portions of the model input (e.g., different words or phrases included in the model input). Alternatively or in addition, the neural network architecture includes feed-forward layers and residual connections that allow the model to machine-learn complex data patterns including relationships between different words or phrases in multiple different contexts. The language model or other type of generative model can be constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation.

In some examples, the neural network-based machine learning model architecture of a generative model includes or is based on one or more generative transformer models, one or more generative pre-trained transformer (GPT) models, one or more bidirectional encoder representations from transformers (BERT) models, one or more large language models (LLMs), one or more XLNet models, and/or one or more other natural language processing (NL) models that significantly advance the state-of-the-art in various linguistic tasks such as machine translation, sentiment analysis, question answering and sentence similarity. In some examples, the neural network-based machine learning model architecture includes or is based on one or more predictive content neural models that can receive digital content input and generate one or more outputs based on processing the digital content with one or more neural network models. Examples of predictive neural models include, but are not limited to, Generative Pre-Trained Transformers (GPT), BERT, and/or Recurrent Neural Networks (RNNs). In some examples, one or more types of neural network-based machine learning model architecture includes or is based on one or more multimodal neural networks capable of outputting different modalities (e.g., text, image, sound, etc.) separately and/or in combination based on digital content input. Accordingly, in some examples, a multimodal neural network is capable of outputting digital content that includes a combination of two or more of text, images, video or sound.

A generative language model can be trained on a large dataset of natural language text. For example, training samples of natural language text extracted from publicly available data sources can be used to train a generative language model. The size and composition of the dataset used to train the generative language model can vary according to the requirements of a particular design or implementation. In some implementations, the dataset used to train the generative language model includes hundreds of thousands to millions or more different natural language text training samples. In some embodiments, a generative language model includes multiple generative language models trained on differently sized datasets. For example, a generative language model can include a comprehensive but low capacity model that is trained on a large data set and used for generating examples, and the same generative language model also can include a less comprehensive but high capacity model that is trained on a smaller data set, where the high capacity model is used to generate outputs based on examples obtained from the low capacity model. In some implementations, reinforcement learning is used to further improve the output of the generative language model. In reinforcement learning, ground-truth examples of desired model output are paired with respective prompts, and these prompt-output pairs are used to train or fine tune the generative language model.

Prompt engineering is a technique used to optimize the structure and/or content of a prompt input to a generative model. Some prompts can include examples of outputs to be generated by the generative model (e.g., few-shot prompts), while other prompts can include no examples of outputs to be generated by the generative model (e.g., zero-shot prompts). Chain of thought prompting is a prompt engineering technique where the prompt includes a request that the model explain reasoning in the output. For example, the generative model performs the task described in the prompt using a series of steps and outputs reasoning as to each step performed.

Supervised learning is a method of training (or fine-tuning) a machine learning model given input-output pairs, where the output of the input-output pair is known (e.g., an expected output, a labeled output, a ground truth). Other training methods including semi-supervised learning or federated learning can be used to train a machine learning model or to fine-tune a pretrained machine learning model.

To train or fine tune a language model, a prompt is provided as input to the machine learning model. The prompt can include natural language instructions, queries, examples, etc. The machine learning model generates output by applying the weights and nodes of the machine learning model to the prompt. Error can be determined by comparing the model output to a reference or expected output. For example, the similarity between the model output and the expected output is evaluated using a similarity metric or model performance metric. The error is used to adjust the value of weights in a weight matrix included in the machine learning model and/or the number of layers and/or arrangement of layers included in the machine learning model.

A machine learning model can be trained using a backpropagation algorithm. The backpropagation algorithm operates by propagating the error through each of the algorithmic weights of the machine learning model such that the algorithmic weights are adjusted based on the amount of error. The error can be calculated at each iteration, batch, and/or epoch. The error is computed using a loss function. An example loss function includes the cross-entropy error function. After a number of training iterations, the machine learning model iteratively converges, e.g., adjusts weight values over time until the model output achieves an acceptable level of accuracy or reliability (e.g., accuracy satisfies a defined tolerance or confidence level). The values of the weights of the trained model (e.g., after convergence) are stored such that the machine learning model can be deployed during inference time.

The machine learning model 842 can be configured and implemented as a network service. For example, the machine learning model 832 can be configured using a machine learning library and an application programming interface (API), e.g., via an API call such as ML_library.model(p1, p2, . . . pn), where p indicates a parameter or argument of the call, such as a model hyperparameter or an input feature set identifier. Once configured, the machine learning model 842 and/or its output can be hosted on one or more servers and/or data storage devices for accessibility to one or more requesting processes, systems, devices, frameworks, or services.

The examples shown in FIG. 8E and the accompanying description, above are provided for illustration purposes. This disclosure is not limited to the described examples. Additional or alternative details and implementations are described herein.

FIG. 9 is a block diagram of an example computer system including components of an agent system in accordance with some embodiments of the present disclosure.

In FIG. 9, an example machine of a computer system 900 is shown, within which a set of instructions for causing the machine to perform any of the methodologies discussed herein can be executed. In some embodiments, the computer system 900 can correspond to a component of a networked computer system (e.g., as a component of the computer system 700 of FIG. 7) that includes, is coupled to, or utilizes a machine to execute an operating system to perform operations corresponding to one or more components of the agent system 780 of FIG. 7. For example, computer system 900 corresponds to a portion of computing system 100 or computing system 700 when the computing system is executing a portion of an application system, agent, or agent system 780.

The machine is connected (e.g., networked) to other machines in a network, such as a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a memory 903 (e.g., flash memory, static random access memory (SRAM), etc.), an input/output system 910, and a data storage system 940, which communicate with each other via a bus 930.

Processing device 902 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be at least one special-purpose processing device such as an application specific integrated circuit (ASIC), a field programmable gate array (FPGA), a digital signal processor (DSP), network processor, or the like. The processing device 902 is configured to execute instructions 912 for performing the operations and steps discussed herein.

In some embodiments of FIG. 9, agent system 950 represents portions of an application system, agent, or agent system 780 while the computer system 900 is executing those portions of the application system, agent, or agent system 780. Instructions 912 include portions of agent system 950 when those portions of the agent system 950 are being executed by processing device 902. Thus, the agent system 950 is shown in dashed lines as part of instructions 912 to illustrate that, at times, portions of the agent system 950 are executed by processing device 902. For example, when at least some portion of the agent system 950 is embodied in instructions to cause processing device 902 to perform the method(s) described herein, some of those instructions can be read into processing device 902 (e.g., into an internal cache or other memory) from main memory 904 and/or data storage system 940. However, it is not required that all of the agent system 950 be included in instructions 912 at the same time and portions of the agent system 950 are stored in at least one other component of computer system 900 at other times, e.g., when at least one portion of the agent system 950 are not being executed by processing device 902.

The computer system 900 further includes a network interface device 908 to communicate over the network 920. Network interface device 908 provides a two-way data communication coupling to a network. For example, network interface device 908 can be an integrated-services digital network (ISDN) card, cable modem, satellite modem, or a modem to provide a data communication connection to a corresponding type of telephone line. As another example, network interface device 908 can be a local area network (LAN) card to provide a data communication connection to a compatible LAN. Wireless links can also be implemented. In any such implementation network interface device 908 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 900.

Computer system 900 can send messages and receive data, including program code, through the network(s) and network interface device 908. In the Internet example, a server can transmit a requested code for an application program through the Internet and network interface device 908. The received code can be executed by processing device 902 as it is received, and/or stored in data storage system 940, or other non-volatile storage for later execution.

The input/output system 910 includes an output device, such as a display, for example a liquid crystal display (LCD) or a touchscreen display, for displaying information to a computer user, or a speaker, a haptic device, or another form of output device. The input/output system 910 can include an input device, for example, alphanumeric keys and other keys configured for communicating information and command selections to processing device 902. An input device can, alternatively or in addition, include a cursor control, such as a mouse, a trackball, or cursor direction keys for communicating direction information and command selections to processing device 902 and for controlling cursor movement on a display. An input device can, alternatively or in addition, include a microphone, a sensor, or an array of sensors, for communicating sensed information to processing device 902. Sensed information can include voice commands, audio signals, geographic location information, haptic information, and/or digital imagery, for example.

The data storage system 940 includes a machine-readable storage medium 942 (also known as a computer-readable medium) on which is stored at least one set of instructions 944 or software embodying any of the methodologies or functions described herein. The instructions 944 can also reside, completely or at least partially, within the main memory 904 and/or within the processing device 902 during execution thereof by the computer system 900, the main memory 904 and the processing device 902 also constituting machine-readable storage media. In one embodiment, the instructions 944 include instructions to implement functionality corresponding to an application system, agent, or agent system (e.g., portions of agent system 780 of FIG. 7).

Dashed lines are used in FIG. 9 to indicate that it is not required that the agent system be embodied entirely in instructions 912, 914, and 944 at the same time. In one example, portions of the agent system are embodied in instructions 914, which are read into main memory 904 as instructions 914, and portions of instructions 912 are read into processing device 902 as instructions 912 for execution. In another example, some portions of the agent system are embodied in instructions 944 while other portions are embodied in instructions 914 and still other portions are embodied in instructions 912.

While the machine-readable storage medium 942 is shown in an example embodiment to be a single medium, the term "machine-readable storage medium" should be taken to include a single medium or multiple media that store the instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media.

The examples shown in FIG. 9 and the accompanying description, above are provided for illustration purposes. This disclosure is not limited to the described examples.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100 or the computing system 700, can carry out the above-described computer-implemented methods in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities.

According to the techniques described herein, users may choose to share personal data with different platforms to provide services that are more tailored to the users. In instances where the users choose not to share personal data with the platforms, the choices made by the users will not have any impact on their ability to use the services that they had access to prior to making their choice.

According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalization tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

Additionally, as used in this disclosure, phrases of the form "at least one of an A, a B, or a C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Illustrative examples of the technologies disclosed herein are provided below. An embodiment of the technologies may include any of the examples described herein, or any combination of any of the examples described herein, or any combination of any portions of any of the examples described herein.

In some aspects, the techniques described herein relate to a method including: determining first natural language input associated with a use of a conversational search system; providing a prompt to a first machine learning model, wherein the prompt includes at least one instruction to cause the first machine learning model to (i) use at least the first natural language input to rank a plurality of data sources associated with the use of the conversational search system, (ii) generate a first search query and reasoning, wherein the first search query includes data obtained from at least one data source of the plurality of data sources ranked by the first machine learning model and the reasoning includes an explanation of how the first machine learning model generated the first search query, and (iii) use the first search query and the reasoning to generate a second search query; using a second machine learning model to synthesize a response determined via execution of the second search query; and providing the synthesized response for presentation via the conversational search system.

In some aspects, the techniques described herein relate to a method, further including: using the ranked plurality of data sources and the first natural language input, selecting a first data source; searching the first data source for the data; determining that the first data source does not contain the data; selecting a second data source of the ranked plurality of data sources; obtaining the data from the second data source; and including the data in the first search query.

In some aspects, the techniques described herein relate to a method, further including: using the first natural language input, selecting a first data source of the ranked plurality of data sources; obtaining a first portion of the data from the first data source; using the first portion of the data and the first natural language input, selecting a second data source of the ranked plurality of data sources; obtaining a second portion of the data from the second data source; and including the first portion of the data and the second portion of the data in the first search query.

In some aspects, the techniques described herein relate to a method, wherein the plurality of data sources includes at least one of: a second natural language input associated with the use of the conversational search system and received during a first time interval prior to the first natural language input; a historical sequence of natural language inputs and responses associated with the use of the conversational search system; or a user profile associated with the first natural language input.

In some aspects, the techniques described herein relate to a method, wherein the prompt is to cause the first machine learning model to search the second natural language input for the data before searching the historical sequence or the user profile.

In some aspects, the techniques described herein relate to a method, wherein the prompt is to cause the first machine learning model to search the historical sequence before searching the user profile.

In some aspects, the techniques described herein relate to a method, wherein the prompt is to cause the first machine learning model use at least one entity extracted from the first natural language input to formulate the first search query.

In some aspects, the techniques described herein relate to a method, wherein the prompt is to cause the first machine learning model to identify at least one query term missing from the first natural language input, obtain the at least one missing query term from at least one of the ranked plurality of data sources, and include the at least one missing query term in the first search query.

In some aspects, the techniques described herein relate to a system including: at least one processor; and at least one memory coupled to the at least one processor, wherein the at least one memory includes at least one instruction that, when executed by the at least one processor, causes the at least one processor to be capable of performing at least one operation including: determining first natural language input associated with a use of a conversational search system; providing a prompt to a first machine learning model, wherein the prompt includes at least one instruction to cause the first machine learning model to (i) use at least the first natural language input to rank a plurality of data sources associated with the use of the conversational search system, (ii) generate a first search query and reasoning, wherein the first search query includes data obtained from at least one data source of the plurality of data sources ranked by the first machine learning model and the reasoning includes an explanation of how the first machine learning model obtained the data from the ranked plurality of data sources, and (iii) use the first search query and the reasoning to generate a second search query; using a second machine learning model to synthesize a response determined via execution of the second search query; and providing the synthesized response for presentation via the conversational search system.

In some aspects, the techniques described herein relate to a system, wherein the at least one instruction, when executed by the at least one processor, causes the at least one processor to be capable of performing at least one operation further including: using the ranked plurality of data sources and the first natural language input, selecting a first data source; searching the first data source for the data; determining that the first data source does not contain the data; selecting a second data source of the ranked plurality of data sources; obtaining the data from the second data source; and including the data in the first search query.

In some aspects, the techniques described herein relate to a system, wherein the at least one instruction, when executed by the at least one processor, causes the at least one processor to be capable of performing at least one operation further including: using the first natural language input, selecting a first data source of the ranked plurality of data sources; obtaining a first portion of the data from the first data source; using the first portion of the data and the first natural language input, selecting a second data source of the ranked plurality of data sources; obtaining a second portion of the data from the second data source; and including the first portion of the data and the second portion of the data in the first search query.

In some aspects, the techniques described herein relate to a system, wherein the plurality of data sources includes at least one of: second natural language input associated with the use of the conversational search system and received during a first time interval prior to the first natural language input; a historical sequence of natural language inputs and responses associated with the use of the conversational search system; or a user profile associated with the first natural language input, and wherein at least one of: the prompt is to cause the first machine learning model to search the second natural language input for the data before searching the historical sequence or the user profile; or the prompt is to cause the first machine learning model to search the historical sequence before searching the user profile.

In some aspects, the techniques described herein relate to a system, wherein the prompt is to cause the first machine learning model use at least one entity extracted from the first natural language input to formulate the first search query.

In some aspects, the techniques described herein relate to a system, wherein the prompt is to cause the first machine learning model to identify at least one query term missing from the first natural language input, obtain the at least one missing query term from at least one of the ranked plurality of data sources, and include the at least one missing query term in the first search query.

In some aspects, the techniques described herein relate to at least one non-transitory machine-readable storage medium including at least one instruction that, when executed by at least one processor, causes the at least one processor to: determining first natural language input associated with a use of a conversational search system; providing a prompt to a first machine learning model, wherein the prompt includes at least one instruction to cause the first machine learning model to (i) use at least the first natural language input to rank a plurality of data sources associated with the use of the conversational search system, (ii) generate a first search query and reasoning, wherein the first search query includes data obtained from at least one data source of the plurality of data sources ranked by the first machine learning model and the reasoning includes an explanation of how the first machine learning model obtained the data from the ranked plurality of data sources, and (iii) use the first search query and the reasoning to generate a second search query; using a second machine learning model to synthesize a response determined via execution of the second search query; and providing the synthesized response for presentation via the conversational search system.

In some aspects, the techniques described herein relate to an at least one non-transitory machine-readable storage medium, wherein the at least one instruction, when executed by the at least one processor, causes the at least one processor to: using the ranked plurality of data sources and the first natural language input, select a first data source; search the first data source for the data; determine that the first data source does not contain the data; select a second data source of the ranked plurality of data sources; obtain the data from the second data source; and include the data in the first search query.

In some aspects, the techniques described herein relate to an at least one non-transitory machine-readable storage medium, wherein the at least one instruction, when executed by the at least one processor, causes the at least one processor to: using the first natural language input, select a first data source of the ranked plurality of data sources; obtain a first portion of the data from the first data source; using the first portion of the data and the first natural language input, select a second data source of the ranked plurality of data sources; obtain a second portion of the data from the second data source; and include the first portion of the data and the second portion of the data in the first search query.

In some aspects, the techniques described herein relate to an at least one non-transitory machine-readable storage medium, wherein the plurality of data sources includes at least one of: second natural language input associated with the use of the conversational search system and received during a first time interval prior to the first natural language input; a historical sequence of natural language inputs and responses associated with the use of the conversational search system; or a user profile associated with the first natural language input, and wherein at least one of: the prompt is to cause the first machine learning model to search the second natural language input for the data before searching the historical sequence or the user profile; or the prompt is to cause the first machine learning model to search the historical sequence before searching the user profile.

In some aspects, the techniques described herein relate to an at least one non-transitory machine-readable storage medium, wherein the prompt is to cause the first machine learning model use at least one entity extracted from the first natural language input to formulate the first search query.

In some aspects, the techniques described herein relate to an at least one non-transitory machine-readable storage medium, wherein the prompt is to cause the first machine learning model to identify at least one query term missing from the first natural language input, obtain the at least one missing query term from at least one of the ranked plurality of data sources, and include the at least one missing query term in the first search query.

Clause 1. A method comprising: determining first natural language input associated with a use of a conversational search system; providing a prompt to a first machine learning model, wherein the prompt comprises at least one instruction to cause the first machine learning model to (i) use at least the first natural language input to rank a plurality of data sources associated with the use of the conversational search system, (ii) generate a first search query and reasoning, wherein the first search query comprises data obtained from at least one data source of the plurality of data sources ranked by the first machine learning model and the reasoning comprises an explanation of how the first machine learning model generated the first search query, and (iii) use the first search query and the reasoning to generate a second search query; using a second machine learning model to synthesize a response determined via execution of the second search query; and providing the synthesized response for presentation via the conversational search system.

Clause 2. The method of clause 1, further comprising: using the ranked plurality of data sources and the first natural language input, selecting a first data source; searching the first data source for the data; determining that the first data source does not contain the data; selecting a second data source of the ranked plurality of data sources; obtaining the data from the second data source; and including the data in the first search query.

Clause 3. The method of clause 1 or clause 2, further comprising: using the first natural language input, selecting a first data source of the ranked plurality of data sources; obtaining a first portion of the data from the first data source; using the first portion of the data and the first natural language input, selecting a second data source of the ranked plurality of data sources; obtaining a second portion of the data from the second data source; and including the first portion of the data and the second portion of the data in the first search query.

Clause 4. The method of any of clauses 1-3, wherein the plurality of data sources comprises at least one of: a second natural language input associated with the use of the conversational search system and received during a first time interval prior to the first natural language input; a historical sequence of natural language inputs and responses associated with the use of the conversational search system; or a user profile associated with the first natural language input.

Clause 5. The method of clause 4, wherein the prompt is to cause the first machine learning model to search the second natural language input for the data before searching the historical sequence or the user profile.

Clause 6. The method of clause 4, wherein the prompt is to cause the first machine learning model to search the historical sequence before searching the user profile.

Clause 7. The method of any of clauses 1-6, wherein the prompt is to cause the first machine learning model use at least one entity extracted from the first natural language input to formulate the first search query.

Clause 8. The method of any of clauses 1-7, wherein the prompt is to cause the first machine learning model to identify at least one query term missing from the first natural language input, obtain the at least one missing query term from at least one of the ranked plurality of data sources, and include the at least one missing query term in the first search query.

Clause 9. A system comprising: at least one processor; and at least one memory coupled to the at least one processor, wherein the at least one memory comprises at least one instruction that, when executed by the at least one processor, causes the at least one processor to be capable of performing at least one operation comprising: determining first natural language input associated with a use of a conversational search system; providing a prompt to a first machine learning model, wherein the prompt comprises at least one instruction to cause the first machine learning model to (i) use at least the first natural language input to rank a plurality of data sources associated with the use of the conversational search system, (ii) generate a first search query and reasoning, wherein the first search query comprises data obtained from at least one data source of the plurality of data sources ranked by the first machine learning model and the reasoning comprises an explanation of how the first machine learning model obtained the data from the ranked plurality of data sources, and (iii) use the first search query and the reasoning to generate a second search query; using a second machine learning model to synthesize a response determined via execution of the second search query; and providing the synthesized response for presentation via the conversational search system.

Clause 10. The system of clause 9, wherein the at least one instruction, when executed by the at least one processor, causes the at least one processor to be capable of performing at least one operation further comprising: using the ranked plurality of data sources and the first natural language input, selecting a first data source; searching the first data source for the data; determining that the first data source does not contain the data; selecting a second data source of the ranked plurality of data sources; obtaining the data from the second data source; and including the data in the first search query.

Clause 11. The system of clause 9 or clause 10, wherein the at least one instruction, when executed by the at least one processor, causes the at least one processor to be capable of performing at least one operation further comprising: using the first natural language input, selecting a first data source of the ranked plurality of data sources; obtaining a first portion of the data from the first data source; using the first portion of the data and the first natural language input, selecting a second data source of the ranked plurality of data sources; obtaining a second portion of the data from the second data source; and including the first portion of the data and the second portion of the data in the first search query.

Clause 12. The system of any of clauses 9-11, wherein the plurality of data sources comprises at least one of: second natural language input associated with the use of the conversational search system and received during a first time interval prior to the first natural language input; a historical sequence of natural language inputs and responses associated with the use of the conversational search system; or a user profile associated with the first natural language input, and wherein at least one of: the prompt is to cause the first machine learning model to search the second natural language input for the data before searching the historical sequence or the user profile; or the prompt is to cause the first machine learning model to search the historical sequence before searching the user profile.

Clause 13. The system of any of clauses 9-12, wherein the prompt is to cause the first machine learning model use at least one entity extracted from the first natural language input to formulate the first search query.

Clause 14. The system of any of clauses 9-12, wherein the prompt is to cause the first machine learning model to identify at least one query term missing from the first natural language input, obtain the at least one missing query term from at least one of the ranked plurality of data sources, and include the at least one missing query term in the first search query.

Clause 15. At least one non-transitory machine-readable storage medium comprising at least one instruction that, when executed by at least one processor, causes the at least one processor to: determining first natural language input associated with a use of a conversational search system; providing a prompt to a first machine learning model, wherein the prompt comprises at least one instruction to cause the first machine learning model to (i) use at least the first natural language input to rank a plurality of data sources associated with the use of the conversational search system, (ii) generate a first search query and reasoning, wherein the first search query comprises data obtained from at least one data source of the plurality of data sources ranked by the first machine learning model and the reasoning comprises an explanation of how the first machine learning model obtained the data from the ranked plurality of data sources, and (iii) use the first search query and the reasoning to generate a second search query; using a second machine learning model to synthesize a response determined via execution of the second search query; and providing the synthesized response for presentation via the conversational search system.

Clause 16. The at least one non-transitory machine-readable storage medium of clause 15, wherein the at least one instruction, when executed by the at least one processor, causes the at least one processor to: using the ranked plurality of data sources and the first natural language input, select a first data source; search the first data source for the data; determine that the first data source does not contain the data; select a second data source of the ranked plurality of data sources; obtain the data from the second data source; and include the data in the first search query.

Clause 17. The at least one non-transitory machine-readable storage medium of clause 15 or clause 16, wherein the at least one instruction, when executed by the at least one processor, causes the at least one processor to: using the first natural language input, select a first data source of the ranked plurality of data sources; obtain a first portion of the data from the first data source; using the first portion of the data and the first natural language input, select a second data source of the ranked plurality of data sources; obtain a second portion of the data from the second data source; and include the first portion of the data and the second portion of the data in the first search query.

Clause 18. The at least one non-transitory machine-readable storage medium of any of clauses 15-17, wherein the plurality of data sources comprises at least one of: second natural language input associated with the use of the conversational search system and received during a first time interval prior to the first natural language input; a historical sequence of natural language inputs and responses associated with the use of the conversational search system; or a user profile associated with the first natural language input, and wherein at least one of: the prompt is to cause the first machine learning model to search the second natural language input for the data before searching the historical sequence or the user profile; or the prompt is to cause the first machine learning model to search the historical sequence before searching the user profile.

Clause 19. The at least one non-transitory machine-readable storage medium of any of clauses 15-18, wherein the prompt is to cause the first machine learning model use at least one entity extracted from the first natural language input to formulate the first search query.

Clause 20. The at least one non-transitory machine-readable storage medium of any of clauses 15-19, wherein the prompt is to cause the first machine learning model to identify at least one query term missing from the first natural language input, obtain the at least one missing query term from at least one of the ranked plurality of data sources, and include the at least one missing query term in the first search query.

Embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   determining first natural language input associated with a use of a conversational search system;
   providing a prompt to a first machine learning model, wherein the prompt comprises at least one instruction to cause the first machine learning model to:
   (i) use at least the first natural language input to rank a plurality of data sources associated with the use of the conversational search system, wherein the plurality of data sources comprises at least one of: a second natural language input associated with the use of the conversational search system and received during a first time interval prior to the first natural language input, a historical sequence of natural language inputs and responses associated with the use of the conversational search system; or a user profile associated with the first natural language input;
   (ii) generate a first search query via a practice execution of a task and reasoning about the practice execution of the task, wherein the first search query comprises data obtained from at least one data source of the plurality of data sources ranked by the first machine learning model and the reasoning comprises an explanation of how the first machine learning model performed the practice execution of the task; and
   (iii) use the first search query and the reasoning about the practice execution of the task to generate a second search query;
   using a second machine learning model to synthesize a response determined via execution of the second search query; and
   causing presentation of the synthesized response via the conversational search system.

2. The method of claim 1, further comprising:
   using the ranked plurality of data sources and the first natural language input, selecting a first data source;
   searching the first data source for the data;
   determining that the first data source does not contain the data;
   selecting a second data source of the ranked plurality of data sources;
   obtaining the data from the second data source; and
   including the data in the first search query.

3. The method of claim 1, further comprising:
   using the first natural language input, selecting a first data source of the ranked plurality of data sources;
   obtaining a first portion of the data from the first data source;
   using the first portion of the data and the first natural language input, selecting a second data source of the ranked plurality of data sources;
   obtaining a second portion of the data from the second data source; and
   including the first portion of the data and the second portion of the data in the first search query.

4. The method of claim 1, wherein the prompt is to cause the first machine learning model to search the second natural language input for the data before searching the historical sequence or the user profile.

5. The method of claim 1, wherein the prompt is to cause the first machine learning model to search the historical sequence before searching the user profile.

6. The method of claim 1, wherein the prompt is to cause the first machine learning model to use at least one entity extracted from the first natural language input to formulate the first search query.

7. The method of claim 1, wherein the prompt is to cause the first machine learning model to identify at least one query term missing from the first natural language input, obtain the at least one missing query term from at least one of the ranked plurality of data sources, and include the at least one missing query term in the first search query.

8. A system comprising:
   at least one processor; and
   at least one memory coupled to the at least one processor, wherein the at least one memory comprises at least one instruction that, when executed by the at least one processor, causes the at least one processor to be capable of performing at least one operation comprising:
   determining first natural language input associated with a use of a conversational search system;
   providing a prompt to a first machine learning model, wherein the prompt comprises at least one instruction to cause the first machine learning model to;
   (i) use at least the first natural language input to rank a plurality of data sources associated with the use of the conversational search system, wherein the plurality of data sources comprises at least one of: a second natural language input associated with the use of the conversational search system and received during a first time interval prior to the first natural language input, a historical sequence of natural language inputs and responses associated with the use of the conversational search system; or a user profile associated with the first natural language input;
   (ii) generate a first search query via a practice execution of a task and reasoning about the practice execution of the task, wherein the first search query comprises data obtained from at least one data source of the plurality of data sources ranked by the first machine learning model and the reasoning comprises an explanation of how the first machine learning model performed the practice execution of the task; and
   (iii) use the first search query and the reasoning about the practice execution of the task to generate a second search query;
   using a second machine learning model to synthesize a response determined via execution of the second search query; and
   causing presentation of the synthesized response for presentation via the conversational search system via the conversational search system.

9. The system of claim 8, wherein the at least one instruction, when executed by the at least one processor, causes the at least one processor to be capable of performing at least one operation further comprising:
   using the ranked plurality of data sources and the first natural language input, selecting a first data source;
   searching the first data source for the data;
   determining that the first data source does not contain the data;
   selecting a second data source of the ranked plurality of data sources;
   obtaining the data from the second data source; and
   including the data in the first search query.

10. The system of claim 8, wherein the at least one instruction, when executed by the at least one processor, causes the at least one processor to be capable of performing at least one operation further comprising:

using the first natural language input, selecting a first data source of the ranked plurality of data sources;
obtaining a first portion of the data from the first data source;
using the first portion of the data and the first natural language input, selecting a second data source of the ranked plurality of data sources;
obtaining a second portion of the data from the second data source; and
including the first portion of the data and the second portion of the data in the first search query.

11. The system of claim 8,
wherein at least one of:
the prompt is to cause the first machine learning model to search the second natural language input for the data before searching the historical sequence or the user profile; or
the prompt is to cause the first machine learning model to search the historical sequence before searching the user profile.

12. The system of claim 8, wherein the prompt is to cause the first machine learning model use at least one entity extracted from the first natural language input to formulate the first search query.

13. The system of claim 8, wherein the prompt is to cause the first machine learning model to identify at least one query term missing from the first natural language input, obtain the at least one missing query term from at least one of the ranked plurality of data sources, and include the at least one missing query term in the first search query.

14. At least one non-transitory machine-readable storage medium comprising at least one instruction that, when executed by at least one processor, causes the at least one processor to:
determine first natural language input associated with a use of a conversational search system;
provide a prompt to a first machine learning model, wherein the prompt comprises at least one instruction to cause the first machine learning model to:
(i) use at least the first natural language input to rank a plurality of data sources associated with the use of the conversational search system, wherein the plurality of data sources comprises at least one of: a second natural language input associated with the use of the conversational search system and received during a first time interval prior to the first natural language input, a historical sequence of natural language inputs and responses associated with the use of the conversational search system; or a user profile associated with the first natural language input;
(ii) generate a first search query via a practice execution of a task and reasoning about the practice execution of the task, wherein the first search query comprises data obtained from at least one data source of the plurality of data sources ranked by the first machine learning model and the reasoning comprises an explanation of how the first machine learning model performed the practice execution of the task, and
(iii) use the first search query and the reasoning about the practice execution of the task to generate a second search query;

use a second machine learning model to synthesize a response determined via execution of the second search query; and
cause presentation of the synthesized response via the conversational search system via the conversational search system.

15. The at least one non-transitory machine-readable storage medium of claim 14, wherein the at least one instruction, when executed by the at least one processor, causes the at least one processor to:
using the ranked plurality of data sources and the first natural language input, select a first data source;
search the first data source for the data;
determine that the first data source does not contain the data;
select a second data source of the ranked plurality of data sources;
obtain the data from the second data source; and
include the data in the first search query.

16. The at least one non-transitory machine-readable storage medium of claim 14, wherein the at least one instruction, when executed by the at least one processor, causes the at least one processor to:
using the first natural language input, select a first data source of the ranked plurality of data sources;
obtain a first portion of the data from the first data source;
using the first portion of the data and the first natural language input, select a second data source of the ranked plurality of data sources;
obtain a second portion of the data from the second data source; and
include the first portion of the data and the second portion of the data in the first search query.

17. The at least one non-transitory machine-readable storage medium of claim 14,
wherein at least one of:
the prompt is to cause the first machine learning model to search the second natural language input for the data before searching the historical sequence or the user profile; or
the prompt is to cause the first machine learning model to search the historical sequence before searching the user profile.

18. The at least one non-transitory machine-readable storage medium of claim 14, wherein the prompt is to cause the first machine learning model use at least one entity extracted from the first natural language input to formulate the first search query.

19. The at least one non-transitory machine-readable storage medium of claim 14, wherein the prompt is to cause the first machine learning model to identify at least one query term missing from the first natural language input, obtain the at least one missing query term from at least one of the ranked plurality of data sources, and include the at least one missing query term in the first search query.

20. The method of claim 1, wherein the practice execution of the task causes the machine learning model to generate preliminary output, and wherein the preliminary output is excluded from a presentation to a user.

* * * * *